United States Patent
Awata

(10) Patent No.: US 7,053,827 B2
(45) Date of Patent: May 30, 2006

(54) GPS RECEPTION METHOD AND GPS RECEIVER

(75) Inventor: Hideki Awata, Gunma (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/047,851

(22) Filed: Jan. 31, 2005

(65) Prior Publication Data

US 2005/0168382 A1    Aug. 4, 2005

(30) Foreign Application Priority Data

Feb. 2, 2004    (JP) ............................ P2004-025178

(51) Int. Cl.
*H04B 7/185*    (2006.01)
(52) U.S. Cl. .............................. 342/357.15; 342/357.12
(58) Field of Classification Search ................ 342/356, 342/357.02, 357.06, 357.12, 357.15; 701/207, 701/213, 215
See application file for complete search history.

(56) References Cited

U.S. PATENT DOCUMENTS

| | | | |
|---|---|---|---|
| 5,917,444 A | 6/1999 | Loomis et al. | |
| 6,133,874 A | 10/2000 | Krasner | |
| 2002/0105457 A1 | 8/2002 | Dooley et al. | |
| 2003/0231704 A1* | 12/2003 | Tanaka et al. | 375/150 |

FOREIGN PATENT DOCUMENTS

EP    0 561 540    9/1993

OTHER PUBLICATIONS

Patent Abstracts of Japan vol. 016, No. 136 (P-1333), Apr. 7, 1992 & JP 03 295483 A (Pioneer Electron Corp), Dec. 26, 1991.

* cited by examiner

*Primary Examiner*—Dao Phan
(74) *Attorney, Agent, or Firm*—Frommer Lawrence & Haug LLP; William S. Frommer; Thomas F. Presson

(57) ABSTRACT

The present invention is intended to provide the synchronization acquisition of signals received from four GPS satellites in a short time and with stability by the time in which an intermediate frequency carrier error of good accuracy can be obtained at the time of power-on sequence, for example. Prerequisites are that at least one GPS satellite signal be in the synchronization hold state, its intermediate frequency carrier frequency be known, the orbit information about that GPS satellite be stored in a storage section, and the position and current time of the GPS receiver be known. Under these prerequisites, an intermediate frequency carrier error is computed from the intermediate frequency carrier frequency, the position and velocity of the GPS satellite obtained from the orbit information and the current time, and the position of the GPS receiver. The intermediate frequency carrier frequency is corrected by the computed intermediate frequency carrier error. The signals received from other GPS satellites are acquired by use of the corrected intermediate frequency carrier frequency.

10 Claims, 28 Drawing Sheets

F I G. 4
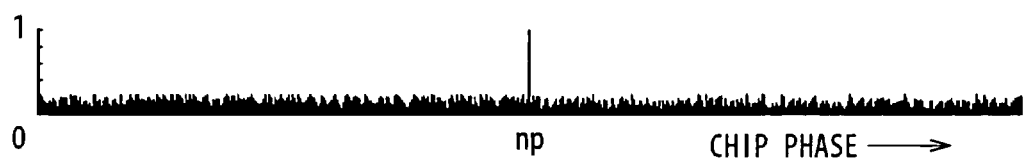
F I G. 5
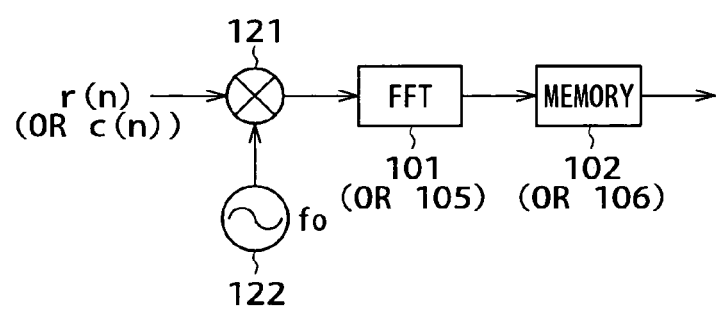
F I G. 6
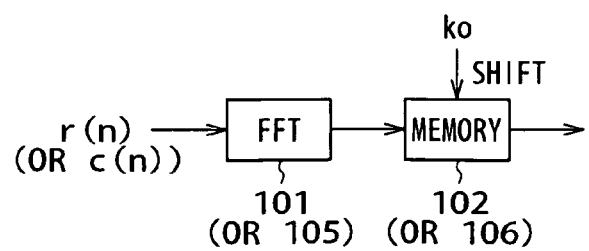

F I G. 2 5
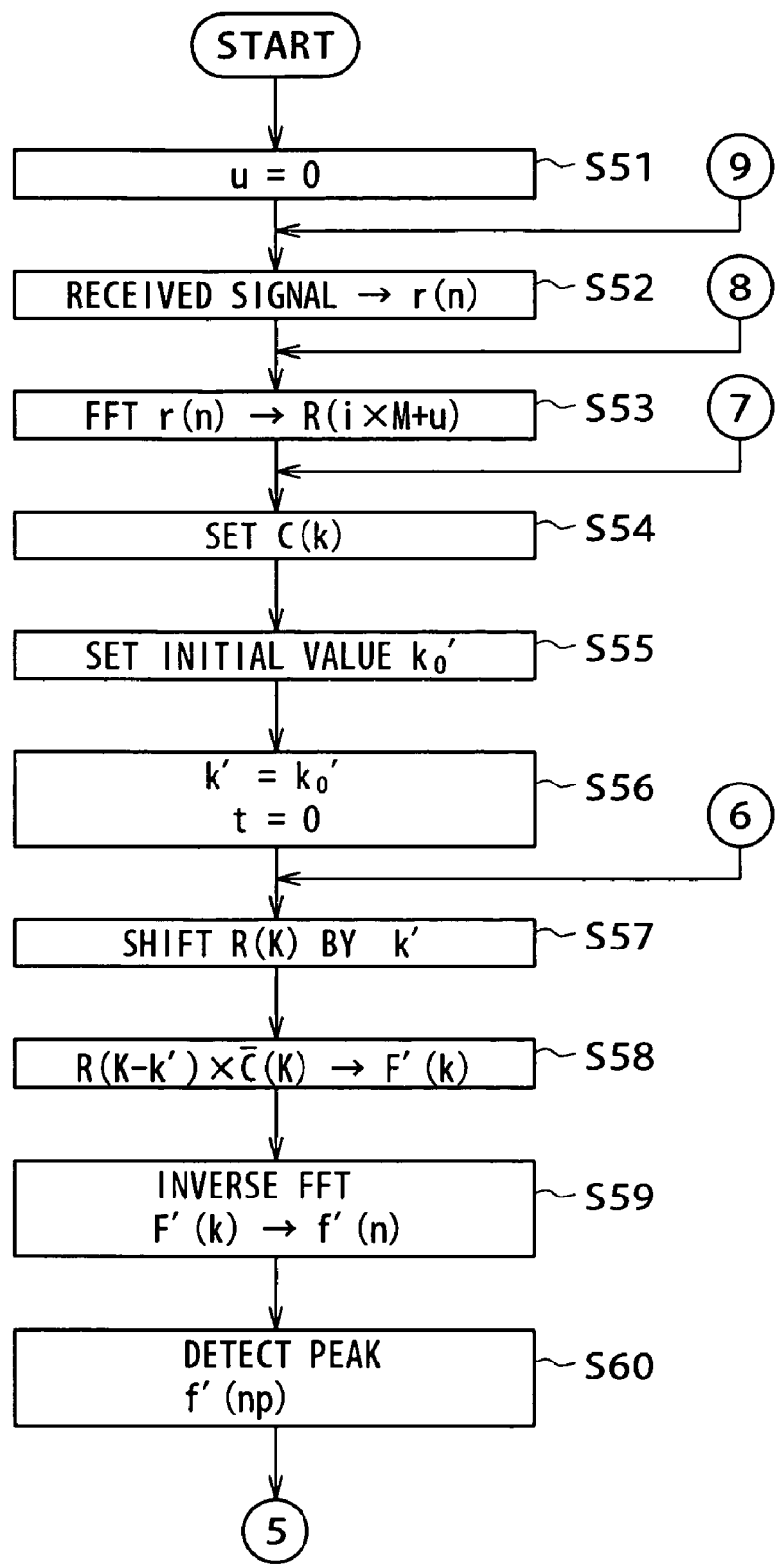

F I G. 3 2
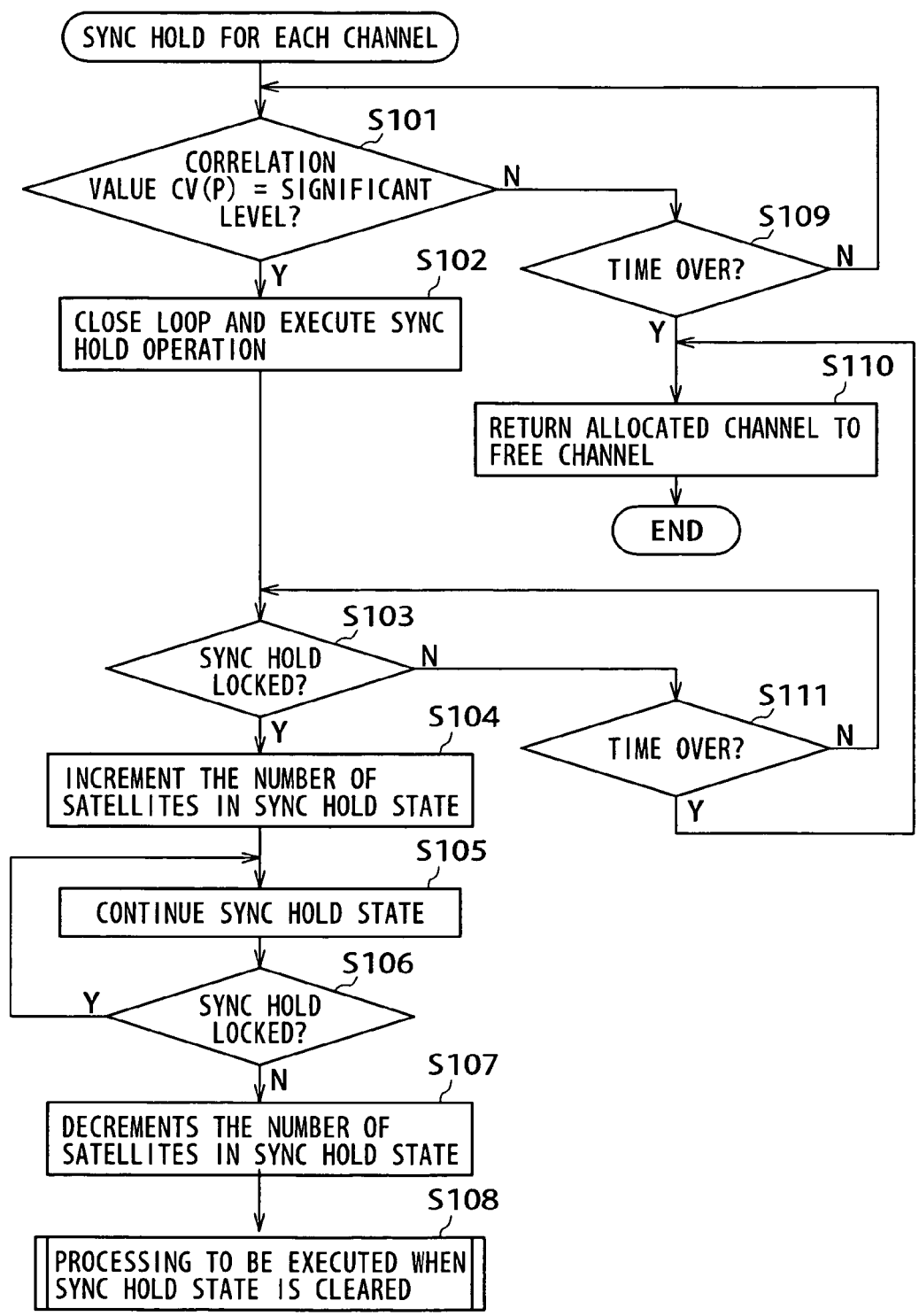

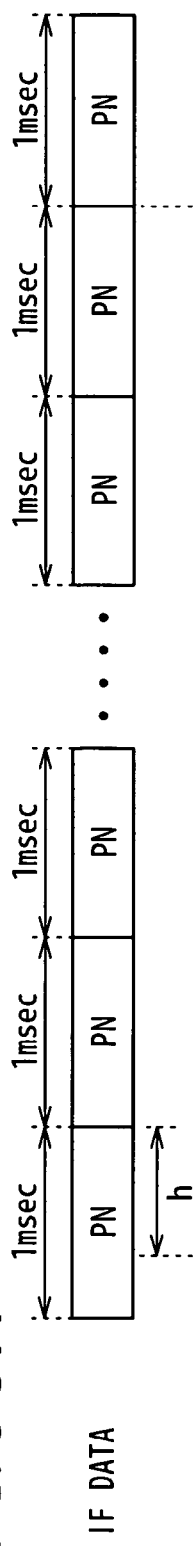
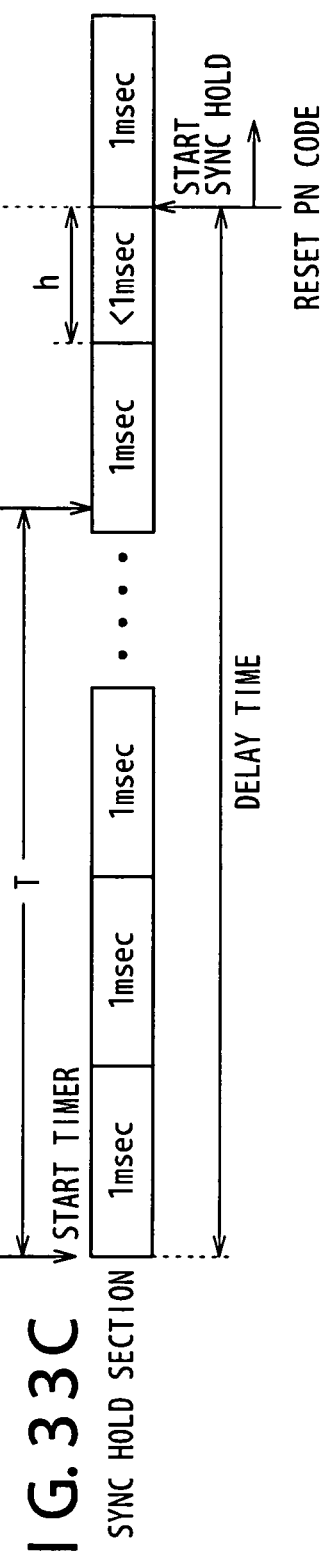
FIG. 33A IF DATA
FIG. 33B SYNC ACQUISITION SECTION
FIG. 33C SYNC HOLD SECTION

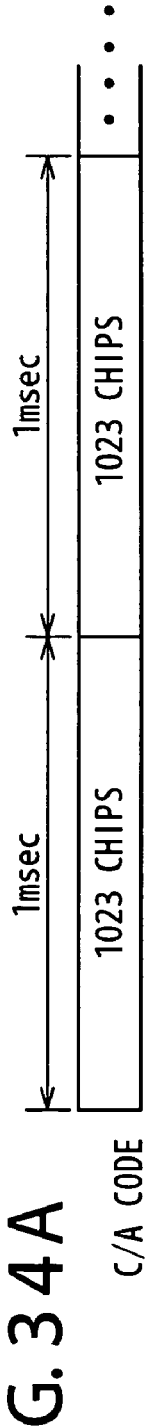
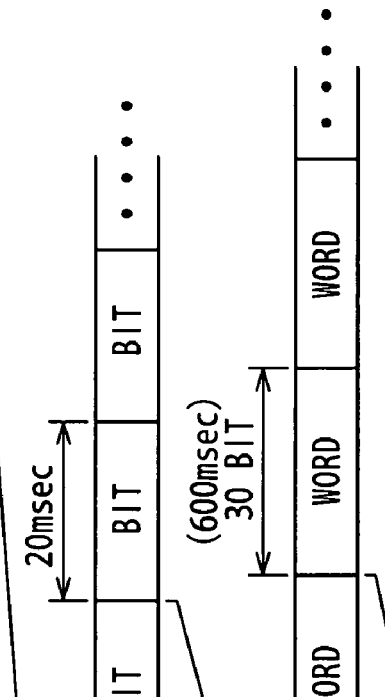
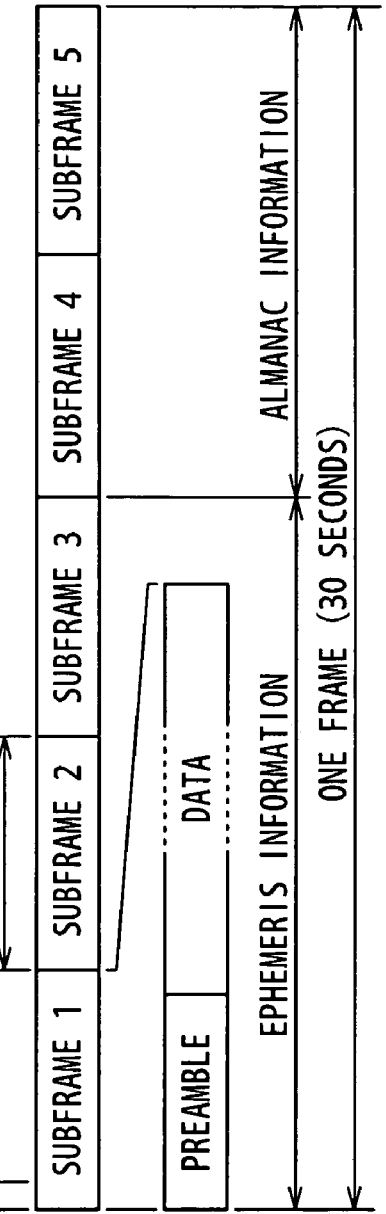
FIG. 34A
FIG. 34B
FIG. 34C
FIG. 34D
FIG. 34E

FIG. 35

[EQUATION (1)]

$$f(n) = r(n) * c(n) \iff F(k) = R(k)\overline{C}(k)$$
(WHERE $^{-}$ REPRESENTS COMPLEX CONJUGATE)

[EQUATION (2)]

$$F(k) = R(k)\overline{C}(k) \quad \text{(WHERE }^{-}\text{ REPRESENTS COMPLEX CONJUGATE)}$$

[EQUATION (3)]

$$r(n) = A \cdot d(n) \cdot c(n) \cdot \cos 2\pi n \cdot f_0 + n(n)$$

[EQUATION (4)]

$$f(n) = r(n) \cdot \exp(j 2\pi n f_0 + \Phi_0) \iff F(k) = \exp(j\Phi_0) R(k-k_0)$$

[EQUATION (5)]

$$F'(k) = R(k-k_0)\overline{C}(k)$$

[EQUATION (6)]

$$|f'(n)| = \sqrt{f_R'(n)^2 + f_I'(n)^2}$$

[EQUATION (7)]

$$\Phi = \tan^{-1}(f_I'(n)/f_R'(n))$$

[EQUATION (8)]

$$F'(k) = R(kM-k')\overline{C}(k) = R(kM-k_0)\overline{C}(k)$$

FIG. 36

[EQUATION (9)]

$$-(v-v_0) \cdot \frac{p-x_0}{|p-x_0|} \simeq fD \frac{c}{f_{RF}}$$

[EQUATION (10)]

$$fD = -v \cdot \frac{p-x_0}{|p-x_0|} \frac{f_{RF}}{c}$$

[EQUATION (11)]

$$\Delta f_{IFi} = f_{IFi} - F_{IF} + vi \cdot \frac{pi-x_0}{|pi-x_0|} \frac{f_{RF}}{c}$$

[EQUATION (12)]

$$fD = -\frac{f_{RF}}{c} |v| \cos\theta$$

[EQUATION (13)]

$$\cos(\theta \pm \Phi) - \cos\theta = \cos\theta\cos\Phi \mp \sin\theta\sin\Phi - \cos\theta$$
$$\simeq \cos\theta \mp \theta\sin\theta - \cos\theta$$
$$= \mp \Phi\sin\theta$$

[EQUATION (14)]

$$|f'D - fD| = \left| -\frac{f_{RF}}{c} |v| \cos(\theta \pm \Phi) - \left( -\frac{f_{RF}}{c} |v| \cos\theta \right) \right|$$
$$= \left| -\frac{f_{RF}}{c} |v| \cos(\theta \pm \Phi) - \cos\theta) \right|$$
$$\simeq \frac{f_{RF}}{c} |v| \Phi |\sin\theta|$$
$$\simeq \frac{1.6 \times 10^9}{3.0 \times 10^8} \times 4000 \times 0.0005 \times |\sin\theta|$$
$$\simeq 1.1 \times 10^1 \times |\sin\theta|$$
$$\leq 1.1 \times 10^1$$

GPS RECEPTION METHOD AND GPS RECEIVER

BACKGROUND OF THE INVENTION

The present invention generally relates to a GPS (Global Positioning System) reception method and a GPS receiver.

In GPS systems for obtaining positions of mobile bodies by use of artificial satellites (hereafter referred to as GPS satellites), the basic functions of each GPS receiver are that the receiver receives signals from four or more GPS satellites, computes the current position of its position from the received signals, and let the user know the computed position.

The GPS receiver demodulates the signals received from GPS satellites (hereafter, these signals are referred to as GPS satellite signals) to obtain the orbit data of the GPS satellites and, from the each GPS satellite's orbit, time information and delay time, derives the three-dimensional position of the own receiver on the basis of simultaneous equations. The signals from four GPS satellites are necessary for positioning computation because the effects of the error between the time in the GPS receiver and the time of each satellite must be eliminated.

In the case of consumer GPS receivers, the signal radio spectrum-spread by a spread code called L1 band C/A (Clear and Acquisition) transmitted from GPS satellites (Navstar) is received for positioning computation.

The C/A code is a code of a PN (pseudo random noise) sequence having a transmission signal rate (or chip rate) of 1.023 MHz and a code length of 1023, a spread code consisting of Gold codes, for example. The signals transmitted from the GPS satellites are each a signal obtained by executing BPSK (Binary Phase Shift Keying) on the carrier having a frequency of 1575.42 MHz by a signal obtained by spectrum-spreading data of 50 bps by use of a spread code. In this case, the code length is 1023, so that, in the C/A code, the PN sequence code repeats in one period of 1023 chips (therefore, 1 period=1 millisecond) as shown in FIG. 34A.

The PN sequence code of the C/A code is different from one GPS satellite to another. However, each GPS receiver can detect beforehand which PN sequence code is used by which GPS satellite. In addition, a navigation message (orbit information) to be described later allows the GPS receiver to know which GPS satellite's signal it can receive at its position and at that point of time. Therefore, in the case of three-dimensional positioning, the GPS receiver receives radio waves from four or more GPS satellites that can be acquired at that position and at that point of time, spectrum-despreads the received signals, and executes a positioning computation on the basis of the despread signals, thereby obtaining its own position.

As shown in FIG. 34B, one bit of satellite signal data (or navigation message data) is transmitted as 20 periods of the PN sequence code, namely on a 20 milliseconds basis. That is, the data transmission rate is 50 bps. The 1023 chips for one period of the PN sequence code is inverted between the bit being "1" and "0".

As shown in FIG. 34C, 30 bits (600 milliseconds) form 1 word in GPS. As shown in FIG. 34(D), 10 words form 1 subframe (6 seconds). As shown in FIG. 34(E), the start word of each subframe is always inserted with a preamble that is a predetermined bit pattern even if the data is updated. This preamble data is followed by data.

Five subframes form one main frame (30 seconds). The navigation message is transmitted in units of data of this 1 main frame. The three subframes of the data of this 1 main frame provide satellite-unique orbit information called ephemeris information. This ephemeris information is transmitted in a repetition of 1 main frame (30 seconds) and includes the parameters for obtaining the orbit of the satellite that transmits this information and the transmission time of the signal from the satellite.

Namely, the second word of the three subframes of ephemeris information includes TOW (Time Of Week) and the third word of the first subframe 1 of the main frame includes the time data called Week Number. The Week Number is the information that is counted up every week with Jan. 6 (Sunday), 1980 being week 0. Also, TOW is the information that is counted up every 6 seconds (namely, every period of subframe) with 0:00 of the Sunday being 0.

Each of the GPS satellites has an atomic clock to use the common clock data and the time at which the signal is transmitted from each GPS satellite is synchronized with the atomic clock. The absolute time is obtained by receiving the above-mentioned two clock data. Any value below 6 seconds is synchronized with the time of the satellite in the process of sync-locking to the radiowave of the satellite with the accuracy of the reference oscillator of that GPS receiver.

Also, the PN sequence code of each GPS satellite is generated as synchronized with the atomic clock. The position and velocity of the satellite for use in the positional computation in the GPS receiver are obtained from this ephemeris information.

The ephemeris information is a precision calendar that is updated comparatively and frequently under the control of the ground control station. By holding this ephemeris information in the memory, the GPS receiver can use it for positional computation. However, the service life of the ephemeris information is normally about two hours in terms of accuracy, so that the GPS receiver monitors the time from the moment at which the ephemeris information is stored in the memory and, when its service life has exceeded, updates and rewrites the ephemeris information stored in the memory.

It should be noted that it takes at least 18 seconds (equivalent to three subframes) to update the contents of the memory with the ephemeris information newly obtained from the GPS satellite and it takes consecutive 30 seconds if the data is obtained halfway between subframes.

The orbit information of the remaining two subframes of the data of one main frame is the information called almanac information that is commonly transmitted from all satellites. The 25 frames of the almanac information are required to obtain all information. The almanac information is composed of the information indicative of the approximate position of each satellite and the information indicative of which satellites are available.

This almanac information is also updated at least once every few days under the control of the ground control information. The almanac information can be stored in the memory of the GPS receiver for use. The service life of the almanac information is several months. With time, the accuracy of the position determination of the satellite lowers, but the almanac information remains useful enough for recognizing the approximate position of the satellite. Normally, the almanac information is updated while the GPS receiver is being used. Storing the almanac information in the memory of the GPS receiver allows, upon powering on the receiver, the computation for which satellite is to be allocated to which channel.

In order to obtain the above-mentioned data by receiving the GPS satellite signal by the GPS receiver, the same PN sequence signal (hereinafter, the PN sequence spread code is referred to as the PN code; the PN sequence spread code of the GPS satellite is referred to as the satellite PN code; and the corresponding PN sequence spread code of the GPS receiver is referred to as the replica PN code) as the C/A code used on the GPS satellite to be received, the PN sequence code being prepared on the GPS receiver, is used to acquire the GPS satellite signal by phase-synchronizing the C/A code for that GPS satellite signal, thereby executing spectrum despreading. When the phase synchronization with the C/A code has been successful for despreading, bit detection is executed to allow the acquisition of a navigation message including time information and so on from the GPS satellite signal.

The GPS satellite signal is captured by C/A code phase synchronization search. In this phase synchronization search, a correlation between the replica PN code of the GPS receiver and the satellite PN code of the GPS satellite is detected and, if the obtained correlation value is greater than a predetermined value, the synchronization between both is determined established. If no synchronization is found established, the phase of the replica PN code of the GPS receiver is controlled by use of some synchronization method to synchronize the replica PN code with the satellite PN code.

As described above, the GPS satellite signal is obtained by BPSK-modulating the carrier with a signal obtained by spreading data with the satellite PN code, so that, for the GPS receiver to receive the GPS satellite signal, synchronization must be established not only between the PN codes but also between the carrier and the data. However, the synchronization of the PN codes the carrier cannot be executed independently.

The GPS receiver, it is a normal practice to convert the carrier frequency of each received signal into an intermediate frequency within several MHz and execute the above-mentioned synchronization detection processing on the received signal in the state of this intermediate frequency signal. The carrier frequency of this intermediate frequency signal (namely, the intermediate frequency carrier frequency) includes a frequency error caused by the Doppler shift corresponding to mainly the moving velocity of the GPS satellite and a frequency error component of the local oscillator generated inside the GPS receiver when a received signal is converted into an intermediate frequency signal. The frequency error component of the local oscillator included in this intermediate frequency signal is hereafter referred to as an intermediate frequency carrier error.

Now, let the intermediate frequency carrier frequency of a received signal be $f_{IF}$, a predetermined intermediate frequency carrier frequency be $F_{IF}$, the Doppler shift of the GPS satellite be fD, and the intermediate frequency carrier error be $\Delta f_{IF}$, then the above-mentioned intermediate frequency carrier frequency f is expressed in equation below.

$$f_{IF}=F_{IF}+f_D+\Delta f_{IF} \quad \text{(equation a)}$$

Due to the above-mentioned frequency error factor, the carrier frequency in the intermediate frequency signal is unknown; there it is necessary to establish IF carrier synchronization by executing frequency search. Also, because the synchronized point (or the synchronized phase) of the PN code within one period depends on the positional relationship between the GPS receiver and the GPS satellite, the synchronized point is unknown, so that some synchronization method is required to establish the synchronized point as described above.

If it takes time for the synchronization between the spread code and the IF carrier, the response of the GPS receiver is delayed, thereby presenting a problem of inconvenience in the use of the GPS receiver.

With related-art GPS receivers, the synchronization between the carrier and the spread code is detected by the sliding correlation involving frequency search and, at the same time, synchronization acquisition and hold operations are executed by means of DLL (Delay Locked Loop) and Costas loop. However, the synchronization acquisition by sliding correlation and the synchronization hold by DLL and Costas loop are not suitable for a high-speed synchronization acquisition in principle, so that, with actual GPS receivers, the processing up to synchronization acquisition is shortened by use of a multi-channel configuration.

Patent Document (Japanese Patent Laid-open No. 2003-258969) discloses a configuration in which the synchronization acquisition section and the synchronization hold section are separated from each other, the synchronization acquisition section is constituted by a matched filter, and the synchronization hold section is constituted by DDL and Costas loop, thereby executing synchronization acquisition and synchronization hold operations at high speeds.

The above-mentioned patent document is as follows.

[Patent Document 1]

Japanese Patent Laid-open No. 2003-258969

Execution of positioning computation with a GPS receiver requires at least the position of the satellite and the range between the satellite and the receiver. The position of the satellite can be obtained from the ephemeris information of the orbit information described above.

The range between the GPS satellite and the GPS receiver can be computed by the GPS receiver by measuring the period of time in which a signal transmitted from the satellite at a certain time reaches the GPS receiver (namely, the signal arrival time=the difference between the time at which a spread code is originated and the time at which the spread code arrives) and multiplying the obtained time by the velocity of light ($3\times10^8$ m/s). However, the above-mentioned range computed by the GPS receiver contains an error due to a clock error for example between the GPS receiver and the GPS satellite, so that this range is generally referred to as a pseudo range.

With the GPS receiver, the amount of the influence of the clock error to the pseudo range is also unknown, so that the number of unknown values to be computed is 4, this unknown amount plus the above-mentioned unknown values three-dimensional coordinates. Therefore, the GPS receiver captures the radio waves from the four satellites to execute three-dimensional positioning. Currently, 32 GPS satellites are available for example, the GPS receiver selects a set of four satellites that are available and produces less error, thereby executing three-dimensional positioning. The following equations are used for this three-dimensional positioning:

$$r1=\{(x1-X)^2+(y1-Y)^2+(z1-Z)^2\}^{1/2}-s$$

$$r2=\{(x2-X)^2+(y2-Y)^2+(z2-Z)^2\}^{1/2}-s$$

$$r3=\{(x3-X)^2+(y3-Y)^2+(z3-Z)^2\}^{1/2}-s$$

$$r4=\{(x4-X)^2+(y4-Y)^2+(z4-Z)^2\}^{1/2}-s$$

where, ri (i=1, 2, 3, 4): pseudo range of GPS satellite i;

X, Y, Z: position of GPS receiver;

xi, yi, zi: position of GPS satellite i; and s: the amount of influence of the clock error of the GPS receiver to range.

Each of the above-mentioned equations is a quadratic having no multiplication term between different unknown values; generally, simultaneous equations are solved by a method of iteration such as Newton method with an appropriate initial value near the solution given. In Newton method, a given equation is locally linearly approximated at a point near the solution, the linear simultaneous equations are solved by use of an initial value, the result of the solution is used as a next initial value to obtain the solution, this operation is repeated until the solution falls in a certain error range, thereby obtaining the final solution.

In environment in which the received signals from four or more GPS satellites can be obtained with stability, the GPS receiver can obtain its own velocity as follows. Namely, first, for each of the four or more GPS satellites, the GPS receiver computes the satellite position and velocity from the orbit information and the origination time of the spread code. Next, by use of the position of the GPS receiver obtained as described above and the carrier frequency of the received signal from the GPS satellite obtained by synchronization hold, linear simultaneous equations are set up with the three-dimensional velocity of the GPS receiver and the intermediate frequency carrier error given as unknown values. By solving these linear simultaneous equations, the velocity of the GPS receiver can be obtained. The error of the intermediate frequency carrier obtained this time is an error good in accuracy in the receiving environment and can be used to determine the intermediate frequency carrier frequency in capturing a new GPS satellite signal.

In order to minimize the period of time from powering on of the GPS receiver to the obtaining of the position of the GPS receiver, many GPS receivers retain, in their internal memory area also when the power to them is off, the orbit information of the GPS satellite from which a signal had been received immediately before the powering off and the three-dimensional coordinates and the intermediate frequency carrier error of the GPS receiver at the time the last positioning was made.

If the intermediate frequency carrier frequency of the GPS satellite is known in acquiring the synchronization of a GPS signal, it is expected to execute synchronization acquisition in a shorter time. Intermediate frequency carrier frequency f can be obtained from (equation a) mentioned above.

In (equation a), intermediate frequency FIF is a predetermined value. Doppler shift fD of the GPS satellite can be computed from the position and velocity of the GPS receiver and the position and velocity of the GPS satellite. If the velocity of the GPS receiver is unknown, it is assumed to be 0 and an approximate value of Doppler shift fD of the GPS satellite can be obtained from the information of the internal clock (namely, the RTC (Real Time Clock)) of the GPS receiver and the three-dimensional coordinates of the GPS receiver and the orbit information of the GPS satellite stored in the internal memory area of the GPS receiver.

Consequently, if intermediate frequency carrier error $\Delta f$ is known, the intermediate frequency carrier frequency can be obtained from (equation a). Therefore, it is expected that, with the GPS receiver in the powered state and the four GPS satellites not yet in the acquired state, the synchronization acquisition can be made in a short time by use of intermediate frequency carrier error $\Delta f$ obtained immediately before the last power-off and stored in the memory of the GPS receiver.

However, the oscillator that provides reference to the local oscillation frequency that is directly involved in the intermediate frequency carrier error $\Delta f$ may vary from several tens of Hz to several hundred Hz during a period of time from several seconds to several tens seconds depending on various conditions such as ambient temperature and vibration in addition to individual specificity of the oscillator.

Hence, even if the period of time in which the power is off for several seconds to several tens of seconds, the intermediate frequency carrier error value stored in the memory area in the GPS receiver may be offset by approximately several tens of Hz to several hundred Hz until updated to the value in that use condition due to the computation of the velocity of the GPS receiver after it is powered on as described above.

Consequently, if the synchronization acquisition of the received signals from the four or more GPS satellites is attempted by use of the above-mentioned intermediate frequency carrier error without any change, stored when the power was turned off, a problem occurs that it takes time to execute the synchronization acquisition because four or more GPS satellite signals must be synchronously acquired in a frequency range considering a variation of approximately several tens of Hz to several hundred Hz depending on the above-mentioned conditions such as ambient temperature and vibration.

SUMMARY OF THE INVENTION

It is therefore an object of the present invention to provide a GPS reception method and a GPS receiver adapted to synchronously hold the received signals from four or more GPS satellites in the GPS receiver power-on state for example to compute the velocity of the GPS receiver and, during a period of time in which an intermediate frequency carrier error having a good accuracy, synchronously acquire the four GPS satellite signals in as short a time and with stability as possible.

In carrying out the invention and according to one aspect thereof, there is provided a GPS (Global Positioning System) reception method including the steps of: if a signal received from at least one GPS satellite is a synchronization hold state, an intermediate frequency carrier frequency of the signal is known, orbit information about the GPS satellite in the synchronization hold state is stored in a storage section, and a position and a current time of a receiver of the signal are known, computing an intermediate frequency carrier error as an error of the intermediate frequency carrier frequency on the basis of an oscillation frequency error of a reference oscillator of the receiver from the intermediate frequency carrier frequency of the signal, a position and a velocity of the GPS satellite in the synchronization hold state obtained from the orbit information and the current time, and the position of the receiver; correcting the intermediate frequency carrier frequency by the computed intermediate frequency carrier error; and acquiring signals received from other GPS satellites by use of the corrected intermediate frequency carrier frequency.

In this configuration described above, if the number of GPS satellites in the synchronization acquisition state and the synchronization hold state after power-on sequence is 0 for example and the signal from a first GPS satellite is synchronously acquired, the initial value of the intermediate frequency carrier frequency of the signal from the GPS satellite to be synchronously acquired is set by use of the intermediate frequency carrier error stored in the GPS satellite for example. In addition, since the stored intermediate frequency carrier error causes a large error range as mentioned, the synchronization acquisition is executed as that large frequency range.

When the signal from one GPS satellite has been synchronously held by the above-mentioned first synchronization acquisition and the intermediate frequency carrier frequency of the signal from that GPS satellite has been known and if the orbit information of the GPS satellite in the synchronization hold state is stored in a storage section and the position and current time of the receiver of that signal are known, the Doppler shift of that GPS satellite is obtained. Namely, the position and velocity of the GPS satellite is first obtained from the orbit information. Next, with the velocity of the received assumed to be 0, Doppler shift fD of that GPS satellite is obtained from the known receiver position and the obtained position and velocity of that GPS satellite.

Then, because the intermediate frequency carrier frequency is known, intermediate frequency carrier error Δf is obtained by use of obtained Doppler shift fD by deforming equation 1. This obtained intermediate frequency carrier error is obtained from the current condition and therefore has higher accuracy than that of the intermediate frequency carrier error stored when the power was turned off.

Therefore, when synchronously acquiring a second GPS satellite, the synchronization acquisition is executed by use of the intermediate frequency carrier frequency corrected by use of the obtained intermediate frequency carrier error.

Consequently, the synchronization acquisition is executed on the basis of the intermediate frequency carrier frequency corrected by the intermediate frequency carrier error having higher accuracy than that of the stored intermediate frequency carrier error, so that the time necessary for executing synchronization acquisition can be shortened.

If, as with immediately after the power-on sequence of the GPS receiver, the number of GPS satellites in the synchronization hold state is less than the number of GPS satellites (normally 4) necessary for obtaining the position and velocity of the GPS receiver but the approximate position of the receiver and the orbit information of the GPS satellite in the synchronization hold are available, the intermediate frequency carrier error that can be originally obtained with the GPS receiver velocity can be approximately computed. Namely, the intermediate frequency carrier error that cannot be updated unless the position and velocity of the GPS receiver can be computed can be approximately computed.

If the intermediate frequency carrier error can be approximately computed as described above, the intermediate frequency carrier frequency of any GPS satellite that provides its orbit information but has not been put in the synchronization acquisition state including the above-mentioned intermediate frequency carrier error can be approximately computed, thereby shortening the time necessary for synchronization acquisition.

If the time necessary for synchronization acquisition can be shortened, the time (namely, TTFF; Time to First Fix) from the power-on sequence of the GPS receiver to the first positioning can be shortened.

As described and according to the invention, if, as with immediately after the power-on sequence of the GPS receiver, the number of GPS satellites in the synchronization hold state is less than the number of GPS satellites (normally 4) necessary for obtaining the position and velocity of the GPS receiver, the intermediate frequency carrier error can be approximately computed by use of the intermediate frequency carrier frequency of the received signal, the approximate position of the receiver, and the orbit information and current time of the synchronously held GPS satellite, thereby shortening the time necessary for synchronization acquisition by use of the approximately computed intermediate frequency carrier error.

Since the time necessary for synchronization acquisition can be shortened as described above, TTFF, which is the time from the power-on sequence of the GPS receiver to the first positioning can be shortened.

BRIEF DESCRIPTION OF THE DRAWINGS

FIG. 4 illustrates an example of a PN code correlation result obtained by use of a digital matched filter;

FIG. 5 illustrates a general example of a method for taking synchronization between the carrier and PN code of a received signal;

FIG. 6 illustrates a first example of a synchronization acquisition method practiced as one embodiment of the invention;

FIG. 25 is a part of a flowchart indicative of the operation of the fourth example of the synchronization acquisition method;

FIG. 32 is a flowchart indicative of a flow of channel-to-channel synchronization hold processing;

FIGS. 33A to 33C illustrate an exemplary method of determining synchronization hold start timing in the embodiment;

FIGS. 34A to 34E illustrate a configuration of a signal received from a GPS satellite;

FIG. 35 illustrates equations for use in describing the embodiment; and

FIG. 36 illustrates other equations for use in describing the embodiment.

DESCRIPTION OF THE PREFERRED EMBODIMENT

The following describes a GPS reception method and apparatus practiced as one embodiment of the invention with reference to accompanying drawings. First, a GPS receiver for use in the embodiment will be described.

[Configuration of the GPS Receiver]

The GPS receiver of the embodiment described below has a configuration that overcomes the defects of the related-art method of synchronously acquiring and synchronously holding the carrier and the PN code by means of the sliding correlation accompanying a related-art search process and DLL (Delay Locked Loop) and Costas loop.

Namely, the related-art method of synchronously acquiring and synchronously holding the IF carrier and the satellite PN code by means of the sliding correlation accompanying frequency search and DLL and Costas loop involves a defect that it takes time for the synchronization of the spread code (PN code) and the carrier because the related-art technique based on the sliding correlation accompanying frequency search is not suitable for high-speed synchronization in principle. This defect causes the GPS receiver to delay in response, presenting inconvenience in use.

Conventionally, in order to overcome the above-mentioned defect, actual GPS receivers use a multi-channel configuration for searching for multiple synchronization points at the same time. However, the use of the multi-channel configuration with the related-art scheme makes the configuration of each GPS satellite complicated and therefore pushes up its cost. In addition, searching for the synchronous points in multiple channels at the same time increases power consumption, which is a serious problem in the case of portable GPS receivers.

In the related-art technique, the synchronization acquisition and synchronization hold of the PN code and the carrier are executed in an integrated manner by use of the sliding correlation accompanying frequency search and DLL and Costas loop, so that, if the signal from a GPS satellite is interrupted, the synchronization acquisition and the synchronization hold must be executed again in an integrated manner, thereby presenting a problem that it takes long time until restarting the synchronization acquisition and the synchronization hold.

Further, with the related-art technique, since the synchronization acquisition and synchronization hold of the PN code and the carrier are executed in an integrated manner by use of the sliding correlation accompanying frequency search and DLL and Costas loop, an attempt to increase the sensitivity of the GPS receiver makes the processing time for the synchronization acquisition and the synchronization hold fairly long in principle, thereby presenting a problem that it is difficult to increase the sensitivity of the GPS receiver.

The GPS receiver practiced as one embodiment of the invention is configured so as to overcome the above-mentioned problems involved in the related-art techniques.

[Overall Configuration of the GPS Receiver of the Embodiment]

Figure 1:
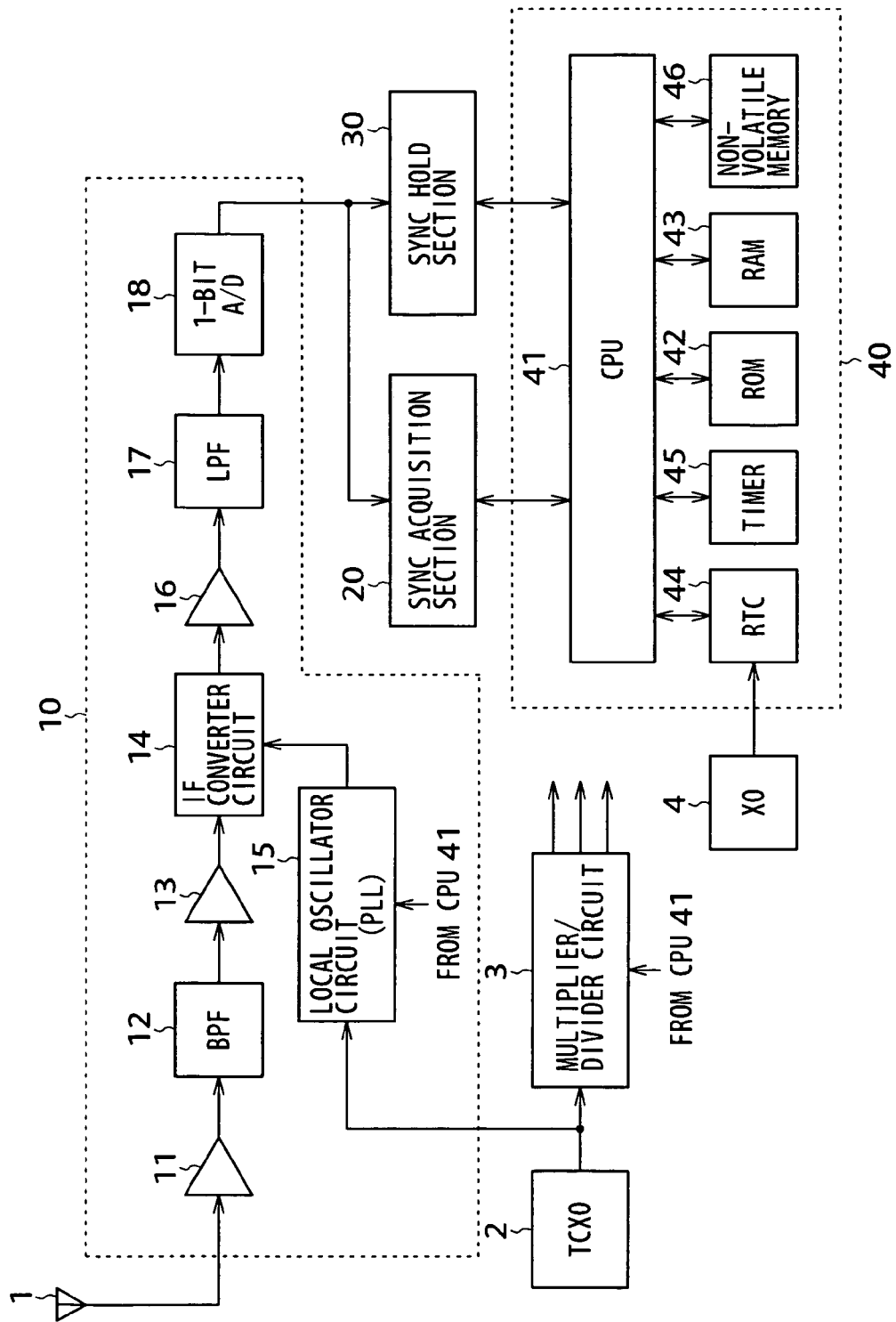
FIG. 1 is a block diagram illustrating an exemplary configuration of a GPS receiver according to the invention.

Now, referring to FIG. 1, there is shown a block diagram illustrating an exemplary configuration of the GPS receiver of the present embodiment. The GPS receiver has a frequency converter section 10, a sync acquisition section 20, a sync hold section 30, a control section 40, a GPS antenna 1, a reference oscillator circuit (TCXO) 2 based on a crystal oscillator circuit having temperature compensation, a timing signal generator circuit (multiplier/divider circuit) 3, and a crystal oscillator circuit (XO) 4.

The control section 40 has a CPU (Central Processing Unit) 41, a program ROM (Read Only Memory) 42, a RAM (Random Access Memory) 43 for work area, a clock circuit 44 for counting real time (RTC: Real Time Clock), a timer 45, and a nonvolatile memory 46 which are interconnected with each other.

The timer 45 is used for generating various timing signals necessary for the operations of the above-mentioned components and for time reference. The nonvolatile memory 46 stores the orbit information including the almanac information and the ephemeris information extracted from the GPS satellite signal and the positional information and IF carrier error ΔfIF of the GPS receiver obtained when the power thereto was on before it was turned off. In the nonvolatile memory 46, the ephemeris information is updated very two hours for example as will be described later and the almanac information is updated every few days for example when the GPS receiver is updated. It should be noted that the nonvolatile memory 46 may be a battery-backed up RAM.

The reference clock signal from the reference oscillator circuit 2 is supplied to the multiplier/divider circuit 3 and, as will be described later, to the local oscillator circuit (PLL) 15 for the frequency conversion of the frequency converter section 10. The multiplier/divider circuit 3 multiplies or divides the reference clock to generate the clock signal to be supplied to the sync acquisition section 20, the sync hold section 30, and the control section 40. The multiplier/divider circuit 3 is controlled in multiplication and division by the CPU 41 of the control section 40.

It should be noted that the clock signal from the crystal oscillator circuit 4 is for the clock circuit 44 of the control section 40. The clock signal from sections other than the clock circuit 44 of the control section 40 is from the multiplier/divider circuit 3.

[Configuration of the Frequency Converter Section 10]

As described above, the GPS satellite signal is transmitted from each GPS satellite and obtained by BPSK-modulating the carrier having a frequency of 1575.42 MHz by a signal obtained by spectrum-spreading the transmission data of 50 bps by the satellite PN code (C/A code) having a pattern determined for each GPS satellite with the transmission signal velocity being 1.023 MHz and the code length being 1023.

The 1575.42 MHz GPS satellite signal received at the GPS antenna 1 is supplied to the frequency converter section 10. In the frequency converter section 10, the GPS satellite signal received at the GPS antenna 1 is amplified by a low-noise amplifier circuit 11 to be supplied to a bandpass filter (BPF) 12 in which the unwanted band component is removed. The resultant signal from the bandpass filter 12 is supplied to an intermediate frequency (IF) converter circuit 14 via a high-frequency amplifier circuit 13.

The output of the reference oscillator circuit 2 is supplied to a local oscillator circuit (PLL) 15 based on PLL synthesizer, from which a local oscillation output with the frequency ratio to the output frequency of the reference oscillator circuit 2 fixed is obtained. This local oscillation output is supplied to the intermediate frequency converter circuit 14, in which the carrier frequency of the GPS satellite signal is low-frequency-converted into an easy-to-process intermediate frequency, 1.023 MHz for example, an intermediate frequency signal being outputted from the intermediate frequency converter circuit 14. In what follows, the carrier of this intermediate frequency signal, namely the intermediate frequency carrier, is referred to as an IF carrier.

The intermediate frequency signal outputted from the intermediate frequency converter circuit 14 is amplified by an amplifier circuit 16 and band-limited by a lowpass filter (LPF) 17, the resultant signal being converted by a 1-bit A/D converter 18 into a 1-bit digital signal (hereafter referred to as IF data). This IF data is supplied to the sync acquisition section 20 and the sync hold section 30.

Namely, in the present embodiment, the IF data is not supplied to an integrated circuit consisting of a synchronization acquisition and synchronization hold functions like the related-art sliding correlation and Costas loop+DLL, but to the sync acquisition section 20 and the sync hold section 30 that are functionally separated from each other.

In the present embodiment, the sync acquisition section 20 executes the synchronization acquisition for the GPS satellite signal, namely detects the phase of the satellite PN code and the frequency of the IF carrier of the GPS satellite signal. The sync hold section 30 executes the synchronization hold of the satellite PN code and IF carrier of the GPS satellite signal acquired by the sync acquisition section 20.

[Configurations of the Sync Acquisition Section 20 and the Sync Hold Section 30]

In the present embodiment, as will be described later, the sync acquisition section 20 captures, in its memory, the IF data from the frequency converter section 10 in an amount equivalent to a predetermined period of time and computes, for the IF data captured in the memory, the correlation between the satellite PN code of the GPS satellite signal and the replica PN code of the GPS receiver corresponding to the satellite PN code of each GPS satellite, thereby executing spread code phase synchronization acquisition.

Spread code phase synchronization acquisition may be executed by means of a matched filter for the high-speed synchronization acquisition of spread spectrum signals without resorting to the above-mentioned sliding correlation method.

The matched filter can be digitally implemented by a transversal filter. Recently, a technique of synchronizing spread codes at high speeds is available in which FFT (Fast Fourier Transform) is used, which is supported by the enhancement of hardware performance represented by DSP (Digital Signal Processor). However, the digital matched filter itself has no capability of holding the synchronization of spread codes.

The latter FFT-based method is based on a technique of speed up a computation method known from long ago, in which, if a correlation is found between the replica PN code of the receiver and the satellite PN code, the peak of the correlation like FIG. 4, which will be described later, is detected, the detected peak being indicative of the start phase of the satellite PN code. Therefore, the detection of this correlation peak allows the acquisition of the synchronization of the satellite PN code, or the phase of the satellite PN code in the received signal from the GPS satellite.

The carrier (the intermediate frequency) of the received signal from the GPS satellite can be detected along with the phase of the satellite PN code by executing an operation in the FFT frequency range in the FFT-based method. The phase of the satellite PN code is converted into a pseudo range. When the detection has been made for four or more satellites, the position of the GPS receiver can be computed. Also, the detection of the carrier frequency reveals a Doppler shift, on the basis of which the velocity of the GPS receiver can be computed.

On the basis of the above-mentioned knowledge, the present embodiment computes the correlation between the PN codes by means of the FFT-based digital matched filter, thereby executing high-speed synchronization hold processing on the basis of the obtained correlation.

The GPS satellite signal received at the GPS antenna 1 contains the signals from a plurality of GPS satellites. The sync acquisition section 20 prepares the information about the replica PN codes for all GPS satellites. By use of this prepared information, the correlation with the replica PN codes of the plurality of GPS satellites available for the GPS receiver can be computed, thereby executing the synchronization acquisition of the plurality of GPS satellite signals.

On the basis of the synchronization acquisition executed by use of the replica PN code information for a particular GPS satellite, the sync acquisition section 20 detects the synchronization acquisition of the signal from that particular GPS satellite. For the identifier of the sync-acquired GPS satellite, the GPS satellite number is used, for example.

Then, the sync acquisition section 20 passes the satellite number information of the sync-acquired GPS satellite, the phase information of the satellite PN code detected by synchronization acquisition, the IF carrier frequency information, and, if required, the information about a signal intensity consisting of a correlation detection signal indicative of the degree of correlation to the sync hold section 30.

The information including the satellite number, the phase of the satellite PN signal, the IF carrier frequency, and the signal intensity detected by the sync acquisition section 20 is passed to the sync hold section 30 in the following methods: in one method, the data format and the interrupt method are determined beforehand and the above-mentioned information is passed directly to the sync hold section 30 accordingly; and, in the other method, the information is passed to the sync hold section 30 via the control section 40.

In the former method, a DSP 23 of the sync acquisition section 20 generates the information to be passed to the sync hold section 30. Alternatively, a control section based on DSP for example may be arranged in the sync hold section 30, thereby generating the information necessary for the sync hold section 30 on the basis of the information received from the sync acquisition section 20.

In the latter method, the passing of the information can be controlled by the CPU 41 of the control section 40 and the sync acquisition section 20 and the sync hold section 30 can be controlled by the CPU 41, thereby facilitating the phase correction of the satellite PN code to be described later and the setting of various synchronization procedures in accordance with the situations of the sync acquisition section 20 and the sync hold section 30 to be described later.

An embodiment described below uses the method in which the information including the satellite number, the satellite PN code phase, the IF carrier frequency, and signal intensity is passed from the sync acquisition section 20 to the sync hold section 30 through the control section 40.

[Configuration of the Sync Acquisition Section 20]

Figure 2:
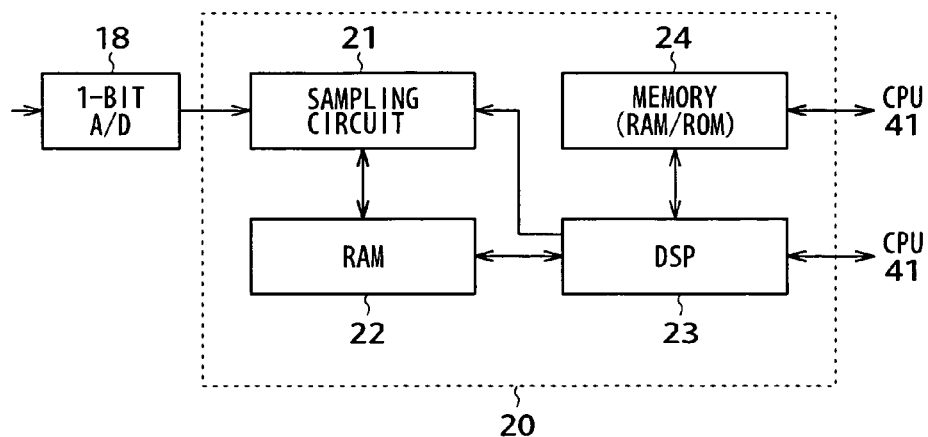
FIG. 2 is a block diagram illustrating an exemplary configuration of a synchronization acquisition section of a part of FIG. 1.

Referring to FIG. 2, there is shown an exemplary configuration of the sync acquisition section 20. In this example, the sync acquisition section 20 has a sampling circuit 21, a RAM 22 for data buffering, a DSP 23, and a memory (RAM/ROM) 24 having both program ROM and work area RAM for use by the DSP 23. The DSP 23 and the memory (RAM/ROM) 24 are connected to the CPU 41 of the control section 40.

The sampling circuit 21 samples the IF data of 1.023 MHz from the frequency converter section 10 by a predetermined frequency more than twice as high as 1.023 MHz and writes each sampling value to the RAM 22. The RAM 22 has a storage size enough for storing the IF data for a predetermined period of time. The DSP 23 executes synchronization acquisition processing in units of the IF data for a time length equivalent to the size of the RAM 22.

To be more specific, in this example, the DSP 23 executes the high-speed synchronization acquisition of the satellite PN code of the IF data stored in the RAM 22, by means of the digital matched filter based on FFT. Then, as a result of the synchronization acquisition processing, the DSP 23 detects the sync-acquired GPS satellite number, the phase of the satellite PN code of the sync-acquired GPS satellite signal, and its IF carrier frequency.

The sampling frequency of the sampling circuit 21 determines the detection accuracy of the phase of the satellite PN code. This sampling frequency needs to be more than twice as high as the maximum frequency and is desired to be a frequency that is an integral multiple of the IF carrier.

The time length of the unit of processing in the DSP 23 determined by the storage size of the RAM 22 determines the detection accuracy of the IF carrier frequency. It is desired for the time length of the unit of processing in the DSP 23 to be an integral multiple of one period of the PN code, especially a power of 2 as will be described later.

Now, let the sampling frequency in the sampling circuit 21 be the chip rage of spread code times $\alpha$ and the time length of the IF data to be stored in the RAM 22 be one period of PN code times $\beta$ ($\beta$ milliseconds), then the DSP 23 can detect the phase of the satellite PN code with an accuracy of $1/\alpha$ chip and the IF carrier frequency with an accuracy of $1/\beta$ kHz ($\pm \frac{1}{2}\beta$ kHz) by an operation in the FFT frequency range.

The following details some examples of the synchronization acquisition processing based on the FFT matched filter in the DSP 23.

EXAMPLE 1 (BASIC CONFIGURATION EXAMPLE) OF SYNCHRONIZATION ACQUISITION BASED ON THE DIGITAL MATCHED FILTER

In the example, the sampling frequency in the sampling circuit 21 is 4.096 MHz, which is approximately four times as high as the chip rate of spread code. The RAM 22 stores the data of 4096 sampling points that are equivalent to one period (one millisecond) of the PN code. With respect to this data in units of one millisecond stored in the RAM 22, the DSP 23 computes a correlation between the satellite PN code of the GPS satellite and the replica PN code of the GPS receiver by means of the correlation computation based on FFT, thereby executing synchronization acquisition processing. Because one period of the PN code is equivalent to 1023 chips, the phase of the satellite PN code can be detected with an accuracy of ¼ chip. The detection accuracy for the IF carrier frequency is 1 kHz because the FFT processing is executed on one millisecond basis.

Figure 3:
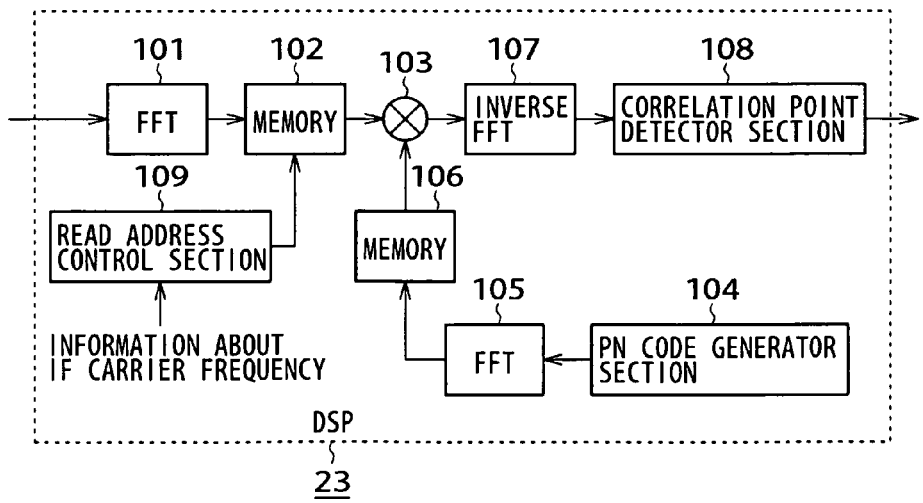
FIG. 3 is a block diagram illustrating an exemplary internal configuration of a DSP forming a part of the synchronization acquisition section shown in FIG. 2.

In this example, as shown in FIG. 3, the DSP 23 reads the IF data in units of one millisecond from the RAM 22 and executes FFT processing on the IF data through an FFT processing section 101, writing a result thereof to a memory 102. Then, the FFT processing result is supplied from the memory 102 to a multiplier section 103.

On the other hand, a PN code generator section 104 generates a replica PN code that is considered in the same line with the PN code used in the received signal from the GPS satellite. Actually, the PN code generator section 104 selectively sequentially outputs the prepared replica PN codes corresponding to a plurality of GPS satellites.

The replica PN code for one period (1023 chips) from the PN code generator section 104 is supplied to an FFT processing section 105 to be FFT-processed, the processing results being supplied to a memory 106. As with the normal case, the FFT results are sequentially read from the memory 106 in the ascending order of frequencies to be supplied to the multiplier section 103.

The multiplier section 103 multiplies the FFT result of the received signal read from the memory 102 by the FFT result of the replica PN code read from the memory 106 to compute the degree of the correlation between the satellite PN code of the received signal and the replica PN code in the frequency domain. It should be noted that the multiplication in the multiplier section 103 is made between the complex conjugate of one of the discrete Fourier transform result of the received signal and the discrete Fourier transform result of the replica PN code and another. The result of this multiplication is supplied to an inverse FFT processing section 107, in which the signal of the frequency domain is returned to the signal in the time domain.

The inverse FFT result obtained from the inverse FFT processing section 107 presents a correlation detection signal in the time domain between satellite PN code of the received signal and the replica PN code. This correlation detection signal is supplied to a correlation point detector section 108.

This correlation detection signal is indicative of a correlation value in each of the chip phases for one period of the spread code. In the phase (for one period of the spread code) where the spread code in the received signal having an intensity higher than a predetermined intensity is in synchronization with the spread code from the PN code generator section 104, a correlation waveform is obtained that indicates a peak value in which the correlation value in one phase in 1023 chip phases exceeds a predetermined threshold value as shown in FIG. 4. The chip phase in which peak value stands is the phase of the correlation point, which is the start phase of one period of the satellite PN code of the GPS satellite signal for the replica PN code of the GPS receiver.

On the other hand, if the received signal is lower in intensity than a predetermined level, the synchronization, if any, between the spread code in the received signal and the spread code from the PN code generator section 104 will not result in the correlation waveform in which the peak value as shown in FIG. 4 stands; therefore, no peak value that exceeds the predetermined threshold value will stand in any chip phases.

The correlation point detector section 108 detects the synchronization between the satellite PN code of the received signal and the replica PN code by checking whether the peak value exceeding the predetermined value is found in the correlation detection signal to be supplied to the correlation point detector section 108, for example.

If the correlation point detector section 108 has found the correlation, the correlation point detector section 108 detects the phase of the above-mentioned peak value as the correlation point, namely as the phase of the satellite PN code of the GPS satellite signal. Next, DSP 23 recognizes the GPS satellite number by checking to which GPS satellite of the replica PN code from the PN code generator section 104 corresponds.

The correlation detection signal shown in FIG. 4 is of the time domain. Its correlation peak is detected only when the carrier component in the intermediate frequency received signal is correctly removed by the processing to be described later.

The frequency of the removed carrier component provides the IF carrier frequency including a Doppler shift corresponding to the correlation point at which the peak value exceeding the predetermined value stands. Therefore, this IF carrier frequency including a Doppler shift is detected by the DSP 23 as a result of the correlation point detection.

When the synchronization acquisition has been completed for one GPS satellite as described above, the above-mentioned processing is repeated in this example by replacing the replica PN code generated by the PN code generator section 104 with another that corresponds to the satellite PN code of another GPS satellite. If no synchronization has been acquired, the DSP 23 replaces the replica PN code generated by the PN code generator section 104 with another corresponding to the satellite PN code of another GPS satellite, thereby repeating the above-mentioned processing.

When the synchronization acquisition processing has been completed for all GPS satellites subject to search or the synchronization with the PN codes of four or more GPS satellites has been acquired for example as known from the information from the CPU 41 of the control section 40, the DSP 23 ends the above-mentioned synchronization acquisition processing.

The DSP 23 supplies the information consisting of the sync-acquired GPS satellite number, the phase of the satellite PN code of the sync-acquired GPS satellite signal, and its IF carrier frequency detected as a result of the synchronization acquisition processing to the control section 40. In this example, the DSP 23 also supplies the peak value of the correlation point of each sync-acquired GPS satellite signal to the control section 40.

In the above description, the processing of the carrier of the received signal is not considered; actually, however, received signal r(n) contains the carrier as shown in equation (3) of FIG. 35. In equation (3), A denotes amplitude, d(n) denotes data, $f_0(=f_{IF})$ denotes carrier angular frequency in the intermediate frequency signal, and n(n) denotes noise.

Let the sampling frequency in the sampling circuit 21 be fs and the sampling count for one period of the PN code be N (therefore $0 \leq n < N$), then the relationship between discrete frequency k ($0 \leq k < N$) after discrete Fourier transform and real frequency f is $f = k \cdot fs/N$ when $0 \leq k \leq N/2$, $f = (k-N) \cdot fs/N (f < 0)$ when $N/2 < k < N$.

It should be noted that, because of the characteristic of discrete Fourier transform, R(k) and C(k) denote cyclicity when k<0 and k≧N.

In order to obtain data d(n) from received signal r(n), synchronization must be acquired between PN code c(n) and carrier cos $2\pi n f_0$ to remove the carrier component. Namely, if the carrier component is included only in R(k) in equation (2) shown in FIG. 35, the correlation waveform as shown in FIG. 4 cannot be obtained.

In this embodiment, a simple configuration in which only the processing in the frequency domain by FFT is executed can remove the carrier component by acquiring synchronization between PN code c(n) and carrier (IF carrier) cos $2\pi n f_0$.

Namely, in the normal case, the FFT result of the received signal from the GPS satellite obtained by the FFT processing section 101 is read from the memory 102 in the ascending order of the frequencies of the frequency component of the received signal to be supplied to the multiplier section 103. In the present embodiment, the read addresses are shift-controlled by a read address control section 109 to sequentially read the FFT result of the received signal from the memory 102.

If an amount of Doppler shift of the GPS satellite from which the received signal has been received can be correctly estimated and the information about the carrier frequency of the received signal detected with the oscillation frequency and time information inside the GPS receiver correctly calibrated can be obtained, the information about the carrier frequency (IF carrier frequency) is supplied to the read address control section 109.

The information about this IF carrier frequency is almost correctly obtained along with the computation of receiver velocity when the received signals from four or more GPS satellites are in the sync hold state and the receiver position is being measured with stability as described above, so that the information about the computed IF carrier is used. Also, the information about the IF carrier may be obtained from the outside of the GPS receiver.

Next, on the basis of the information about the carrier frequency generated in the GPS receiver or obtained from the outside, the read address control section 109 shifts the read addresses by the carrier frequency to sequentially read the FFT result of the received signal from the memory 102, supplying the FFT result to the multiplier section 103.

Reading the FFT result of received signal r(n) from the memory 102 by shifting the read addresses by the carrier frequency of the received signal can obtain an FFT result equivalent to the FFT result of the received signal with the carrier component removed as will be described later. The FFT result with the carrier component removed is multiplied by the FFT result for one period of the PN code. The result of this multiplication is despread to obtain an correlation detection output in which the peak surely stands at the correlation point as shown in FIG. 4.

It should be noted that, instead of controlling the read address of the FFT result read from the memory 102, the read address of the FFT result of the replica PN code read from the memory 106 may be controlled to add the carrier component of received signal r(n) to the FFT result of the replica PN code and execute the multiplication in the multiplier section 103, thereby substantially removing more carrier component, as also will be described later.

The following will detail the removal of the carrier component by the synchronization of the carrier of the received signal and the satellite PN code by controlling the addresses read from the memory 102 or the memory 106, along with the processing of the digital matched filter in the DSP 23.

In the present embodiment, the processing of the digital matched filter is executed in the DSP 23. The principle of the digital matched filter processing is based on the theorem that the convolution Fourier transform in the time domain becomes a multiplication in the frequency domain as indicated by equation (1) shown in FIG. 35.

In equation (1), r(n) denotes the received signal in the time domain and R(k) denotes its discrete Fourier transform. In this equation, c(n) denotes the replica PN code supplied from the PN code generator section and C(k) denotes its discrete Fourier transform. n denotes discrete time and k denotes discrete frequency. F[k] denotes Fourier transform of f(n).

Now, let the correlation function between two signals r(n) and c(n) be f(n), then discrete Fourier transform F(k) of f(n) presents a relationship as defined in equation (2) shown in FIG. 35. Therefore, let r(n) be the signal from the frequency converter section 10 and c(n) be the replica PN code from the PN code generator section 104, then correlation function f(n) between r(n) and c(n) can be computed in the following procedure on the basis of equation (2) without using the normal definitional equation.

Compute discrete Fourier transform R(k) of received signal r(n).

Compute the complex conjugate of discrete Fourier transform C(k) of replica PN code c(n).

Compute F(k) of equation (2) by the complex conjugate of R(k) and C(k).

Compute correlation function f(n) by the inverse Fourier transform of F(k).

As described above, if the satellite PN code included in received signal r(n) matches replica PN code c(n) supplied from the PN code generator section 104, then correlation function f(n) obtained by the above-mentioned procedure becomes a time waveform in which the peak stands at the correlation point shown in FIG. 4. As described above, in the present embodiment, FFT and inverse FFT high-speed algorithms are applied to discrete Fourier transform and inverse Fourier transform, so that the computation can be executed fairly faster than the computation of the correlation on the basis of definitions.

The following describes the synchronization between the carrier included in received signal r(n) and the satellite PN code.

As described above, received signal r(n) contains the carrier as indicated by equation (3) of FIG. 35. Obtaining data d(n) from received signal r(n) requires to remove the carrier by acquiring synchronization between replica PN code c(n) and carrier cos $2\pi n f_0$. Namely, if the carrier is contained only in R(k) in equation (2) shown in FIG. 45 described above, then the correlation waveform as shown in FIG. 4 is not obtained.

As described above, if an amount of Doppler shift is correctly estimated and the oscillation frequency and time information in the GPS receiver is correct, then carrier frequency (IF carrier frequency) $f_0(=f_{IF})$ of received signal r(n) is known. In this case, as shown in FIG. 5, the carrier component can be removed from received signal r(n) before executing FFT by arranging a multiplier section 121 in front of the FFT processing section 101 and executing frequency conversion by multiplying, in the multiplier section 121, received signal r(n) by the carrier having frequency $f_0$ supplied from a signal generator section 122.

In this case, the FFT result of received signal r(n) with the carrier component removed is obtained from the memory 102 and this FFT result is multiplied by the FFT result of replica PN code c(n) in the multiplier section 103, so that a time waveform in which the peak stands at the correlation point as shown in FIG. 4 can surely be obtained as the output from the inverse FFT processing section 107.

It should be noted that, as noted in parentheses in FIG. 5, the same effect can be obtained by arranging the multiplier section 121 in front of the FFT processing section 105 for processing replica PN code c(n) and executing frequency conversion by multiplying, in the multiplier section 121, replica PN code c(n) by the carrier having frequency $f_0(=f_{IF})$ supplied from the signal generator section 122 to add the carrier component to the replica PN code, instead of removing the carrier component from received signal r(n).

Namely, in this case, because the carrier component contained in the FFT result of the received signal read from the memory 102 is in synchronization with the added carrier component contained in the FFT result of the replica PN code read from the memory 106, the correlation detection output in which the peak stands at the correlation point as shown in FIG. 4 is obtained from the inverse FFT processing section 107.

However, the method in which the signal in the time domain is multiplied by the signal of the carrier frequency as shown in FIG. 5 requires a special multiplier section for removing the carrier component as described above, resulting in a complicated configuration and a lowered processing speed by multiplications.

Meanwhile, the characteristic of FFT can express the above-mentioned frequency multiplications as shown in equation (4) of FIG. 35. In equation (4), F[k] denotes the discrete Fourier transform of f(n), $\phi_0$ denotes the phase difference with the carrier, and $k_0$ denotes k corresponding to $f_0$ where $f_0=k_0 \cdot fs/N$. From equation (4), the FFT of the signal with received signal r(n) frequency-converted as shown in FIG. 5 becomes the FFT with R(k), which is the FFT of r(n), shifted by carrier frequency $k_0$.

Thus, the configuration shown in FIG. 5 is replaceable with a configuration shown in FIG. 6. Namely, in the configuration shown in FIG. 6, the addresses to be accessed when reading the FFT result of the received signal or the FFT result of the replica PN code from the memory 102 or the memory 106 are shifted by the carrier frequency, instead of multiplying received signal r(n) and replica PN code c(n) by the carrier frequency.

In this case, received signal r(n) is shifted by down conversion where $k_0>0$ and replica PN code c(n) is shifted by up conversion where $k_0<0$.

As described above, use of the FFT characteristic shown in equation (4) allows eliminates the necessity for the signal generator section 122 shown in FIG. 5, so that the phase of the address in the memory from which the FFT result is read may only be shifted, thereby providing a simplified configuration and high-speed processing.

It should be noted that, because phase difference $\phi_0$ in equation (4) is unknown, so that it is ignored in FIG. 6. For example, correlation function $f'(n)(0 \leq n < N)$ obtained as a result of the computation of inverse FFT of $F'(k)$ computed from equation (5) shown in FIG. 35 becomes a complex number. Here, let its real part be $f_R'(n)$ and its imaginary part be $f_I'$, then amplitude $|f'(n)|$ of the correlation peak is obtained as shown in equation (6) of FIG. 35 and phase $\phi$ is obtained as shown in equation (7) of FIG. 35, so that the multiplication of $\exp(j\phi_0)$ of the right term of equation (4) may be omitted. It should be noted that phase $\phi$ takes a value in which $\phi_0$ of equation (7) is added to two values that are different from each other by $\pi$ corresponding to the satellite PN code of data $d(n)$ in equation (3).

Figure 7:
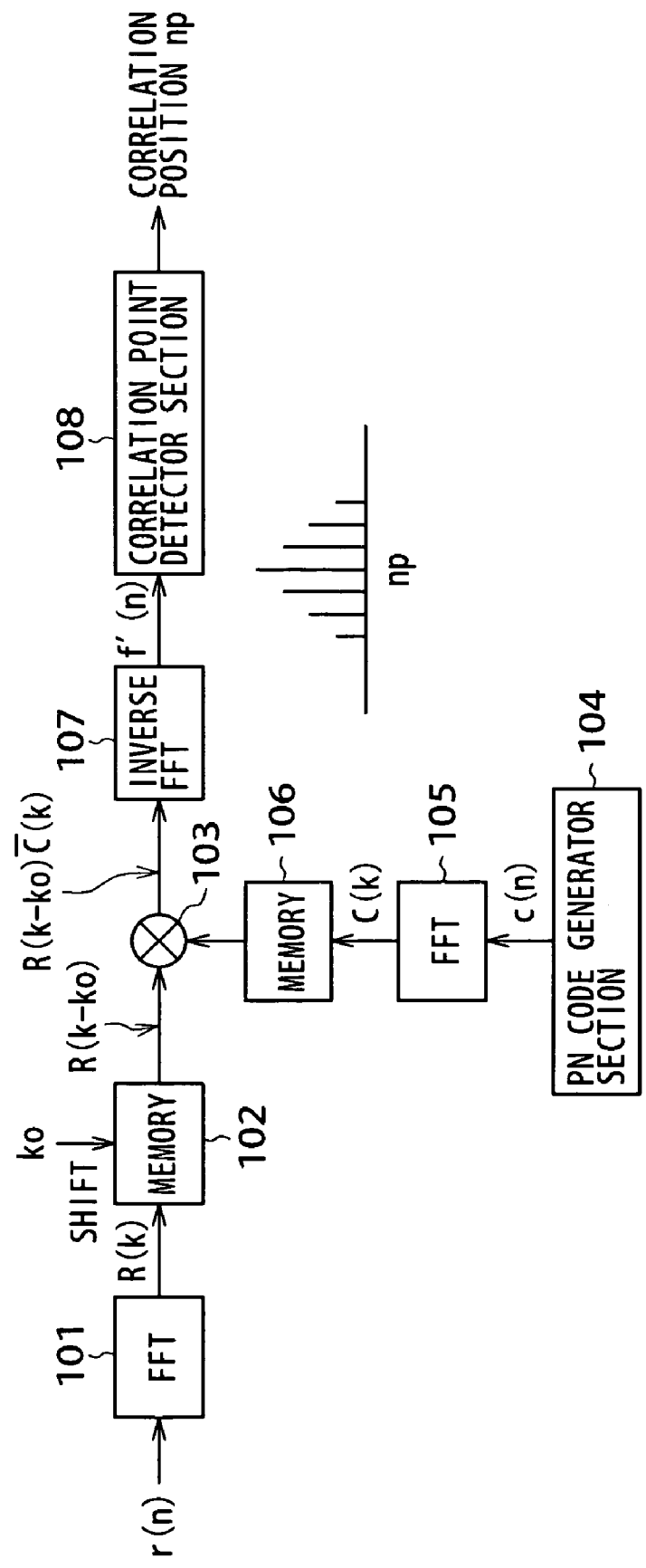
FIG. 7 illustrates a configuration of a main portion with an operation of the first example of the synchronization acquisition method considered.

Referring to FIG. 7, there is shown a configuration diagram in which the operation of example 1 of the synchronization acquisition processing in the DSP 23 is reflected to the block diagram shown in FIG. 3. The outputs of the component blocks of this configuration, the above-mentioned signal outputs $r(n)$ and $c(n)$ and computation results $R(k)$, $C(k)$, and $f'(n)$ are indicated.

As described above and according to example 1 of the synchronization acquisition processing of the DSP 23, in configuring a digital matched filter on the basis of FFT in the GPS receiver, the FFT result of the received signal is multiplied by the replica PN code by shifting the addresses of the memory by the carrier frequency as shown in FIG. 7 to get correlation point np in the waveform as shown in FIG. 7 for example, so that, if correlation point np is found for four GPS satellites, namely four kinds of replica PN codes $c(n)$, the computation of GPS receiver position is enabled.

Namely, according to example 1, in execution FFT-based digital matched filter processing, no multiplication is executed in the time domain in order to acquire synchronization between the carrier of the received signal and the replica PN code, but, in the multiplication between the FFT result of the received signal and the FFT result of the replica PN code in the frequency domain, a simple method is used in which one of the FFT result of the received signal and the FFT result of the replica PN code is shifted, thereby removing the carrier component of the received signal.

In the example shown in FIG. 7, the memory read address of FFT result $R(k)$ of the received signal is shifted; it is also practicable to shift the memory read address of FFT result $C(k)$ of the replica PN code in the direction reverse to the shift direction of FFT result $R(k)$ of the received signal (namely, the up conversion in the multiplier).

In the above-mentioned example 1, the PN code generator section 104 and the FFT processing section 105 are separately arranged; it is also practicable to omit the FFT computation of replica PN code $c(n)$ at reception of a satellite signal by storing the FFT-processed replica PN codes corresponding to the GPS satellites in the memory.

EXAMPLE 2 OF SYNCHRONIZATION ACQUISITION BY THE DIGITAL MATCHED FILTER

The above-mentioned example 1 of synchronization acquisition is employed when the carrier frequency of the signal received from the GPS satellite is correctly given. In example 2, however, the carrier frequency is unknown. As with example 1, the sampling frequency in the sampling circuit 21 is 4.096 MHz and the storage size of the RAM 22 is equivalent to one millisecond of data from the sampling circuit 21 in example 2.

Figure 8:
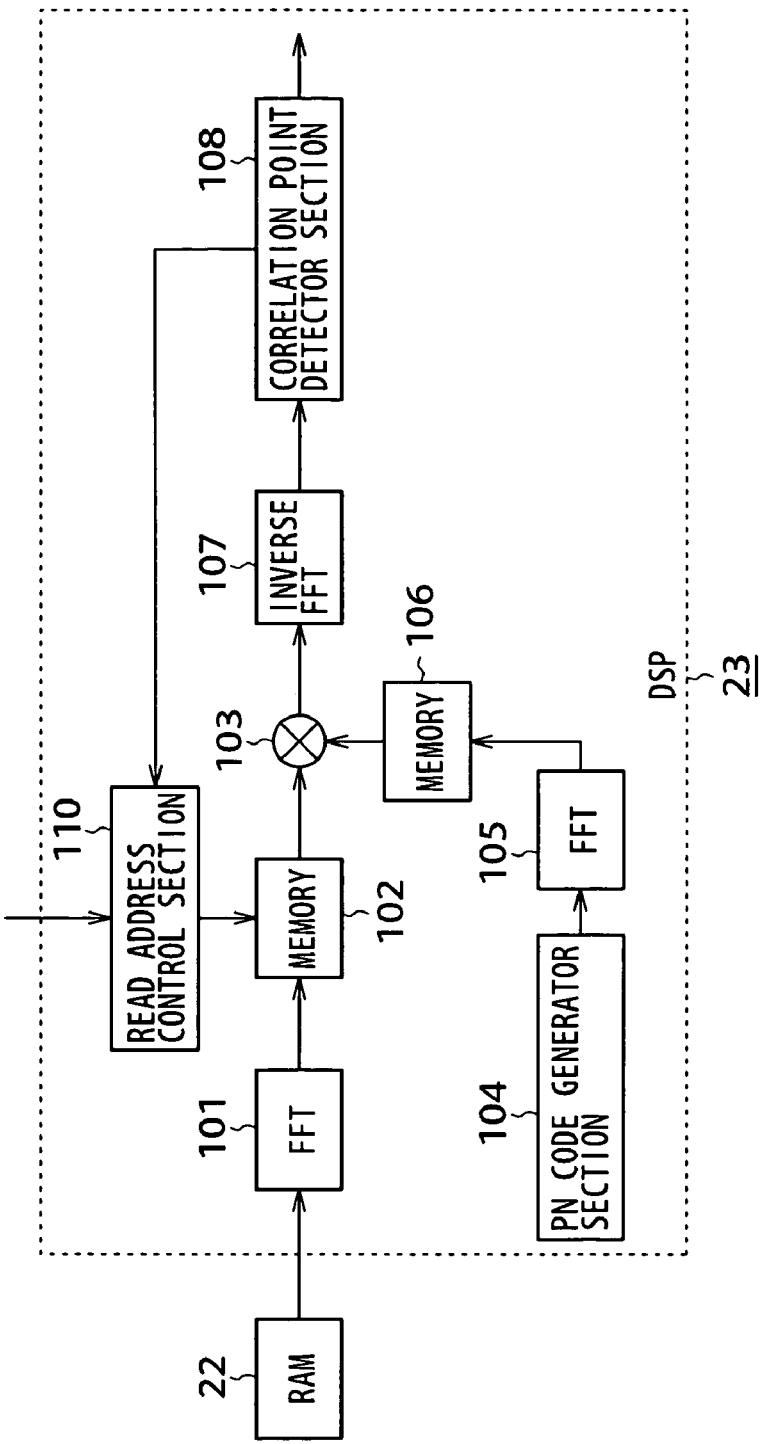
FIG. 8 illustrates a second example of the synchronization acquisition method.

Referring to FIG. 8, there is shown a block diagram illustrating an exemplary configuration of the DSP 23 as example 2. With reference to FIG. 8, components similar to those previously described with reference to FIG. 3 showing the DSP 23 are denoted by the same reference numerals.

In example 2 of synchronization acquisition, the correlation detection output of the correlation point detector section 108 is supplied to a read address control section 110. The read address control section 110 changeably controls the above-mentioned shift of the read address of the FFT result of received signal $r(n)$ from the memory 102 on the basis of the correlation detection output of the correlation point detector section 108 and around the predictive address corresponding to the information (or the initial value) of the IF carrier frequency computed by use of the IF carrier error stored in the nonvolatile memory 46 of the frequency converter section 10, thereby getting the peak as shown in the FIG. 4 in the correlation point detector section 108. If the peak as shown in FIG. 4 has been obtained in the correlation point detector section 108, the read address control section 110 stops the read address shift control at the shift level at that moment.

If synchronization hold has not been executed on the received signal of even one GPS satellite in the power-on sequence for example, the control section 40 uses, as the initial value to be supplied to the read address control section 110, the IF carrier frequency approximately obtained from past IF carrier error $\Delta f_{IF}$ stored in the nonvolatile memory 46 of the GPS receiver and Doppler shift fD obtained on the basis of the orbit information and GPS receiver position stored in the nonvolatile memory 46 at the time of the last power-off sequence.

If synchronization hold has been not executed on the received signals from all of four GPS satellites but synchronization hold has been executed on the received signal from at least one GPS satellite and therefore the intermediate carrier frequency of this received signal is known and the orbit information of the GPS satellite in the synchronization hold state is stored in the storage section and the current position and time of the GPS satellite are known, then the control section 40 obtains the IF carrier frequency from Doppler shift fD approximately obtained as described above and IF carrier error $\Delta f_{IF}$ to be obtained as will be described later. The control section 40 uses the IF carrier frequency thus obtained as the initial value of the IF carrier frequency to be supplied to the read address control section 110.

Next, when it becomes ready for synchronization hold to be executed on all four GPS satellites with stability and GPS receiver velocity computation has been executed to obtain correct IF carrier error $\Delta f_{IF}$, then the control section 40 uses this correct IF carrier error $\Delta f_{IF}$ as the initial value of the IF carrier frequency to be supplied to the read address control section 110.

It should be noted that, for IF carrier error $\Delta f_{IF}$ in the nonvolatile memory 46, the value IF carrier error $\Delta f_{IF}$ used at that time is stored. Therefore, a power-on sequence is executed again after power-off sequence, IF carrier frequency error $\Delta f_{IF}$ stored immediately stored immediately before the power-off sequence is stored in the nonvolatile memory 46.

<Computation of the IF Carrier Error for Determining the Initial Value of IF Carrier Frequency>

For example, in the synchronization acquisition of a GPS satellite signal starting with a power-on sequence, the present embodiment starts a synchronization acquisition operation by using, as the initial value, the IF carrier frequency approximated obtained IF carrier error $\Delta f_{IF}$ immediately before the power-off sequence stored in the nonvolatile memory 46 and the Doppler shift to be obtained by computation, thereby executing the synchronization hold of the signal received from at least one GPS satellite.

In the related-art techniques, IF carrier error $\Delta f_{IF}$ stored in the nonvolatile memory 46 immediately before the last power-off sequence is not updated until synchronization hold has been executed on the signals received from four or more GPS satellites and the GPS receiver velocity computation has been executed to compute IF carrier error $\Delta f_{IF}$.

In contrast, in the present embodiment, IF carrier error IF carrier error $\Delta f_{IF}$ is updated, as will be described above, when synchronization hold has been executed on the signal received from at least one GPS satellite and on the basis of the information obtained from that synchronization hold processing.

There is a relationship as shown in equation (9) shown in FIG. 36 among three-dimensional coordinates $x_0$ of the GPS satellite, three-dimensional velocity $v_0$, three dimensional coordinates p of the GPS satellite, three-dimensional velocity v of the GPS satellite, Doppler shift fD of the GPS satellite, carrier frequency $f_{RF}$ (=1575.42 MHz), and light velocity c in vacuum. It should be noted that, in equation (9), a·b denotes an inner product between vector a and vector b.

Here, the orbit information of the GPS satellite and the approximate position and current time of the GPS receiver are known from the information stored in the nonvolatile memory 46 and three-dimensional position p and three-dimensional velocity v of the GPS satellite are obtained from the orbit information of that GPS satellite and the time of the internal clock of the GPS receiver. Therefore, if three-dimensional velocity $v_0$ be 0, then equation (9) can be deformed to equation (10) shown in FIG. 36. Namely, Doppler shift fD of the GPS satellite can be approximately obtained from the above-mentioned prerequisite.

Next, if synchronization acquisition has been executed on the signal received from at least one GPS satellite in the same manner as the related-art technique described above and this received signal has been put in the synchronization hold state, the IF carrier frequency of the signal received from that GPS satellite can be obtained. At this moment, let the satellite number of the GPS satellite in the synchronization hold state be i and the IF carrier frequency obtained from the sync hold section be $f_{IF}i$, then from equation a described in the beginning and equation (10) described above, IF carrier error $\Delta f_{IF}i$ can be expressed as shown in equation (11) of FIG. 36.

Equation (11) shows that IF carrier $\Delta f_{IF}$ can be approximately obtained by use of the information (IF carrier frequency) about the GPS satellite already put in the synchronization hold state and the satellite position and satellite velocity which are computed from the orbit information of that GPS satellite.

It is considered that IF carrier error $\Delta f_{IF}$ thus approximately computed has better accuracy suitable for the current environment than past IF carrier error $\Delta f_{IF}$ immediately before the last power-off sequence. This approximately obtained IF carrier error $\Delta f_{IF}$ is used for the IF carrier frequency for the synchronization acquisition of the signal received from the next GPS satellite until correct IF carrier error $\Delta f_{IF}$ is obtained along with the reception velocity with the signals received from the four GPS satellites put in the synchronization hold state.

Namely, in the present embodiment, the IF carrier frequency is approximately obtained from above-mentioned equation a on the basis of IF carrier error $\Delta f_{IF}$ approximately obtained as described above and Doppler shift fD approximately obtained as described above. This approximately computed IF carrier frequency is used as the initial value of the IF carrier frequency to be supplied to the read address control section 110 when executing the synchronization acquisition of the signal received from another GPS satellite.

Figure 9:
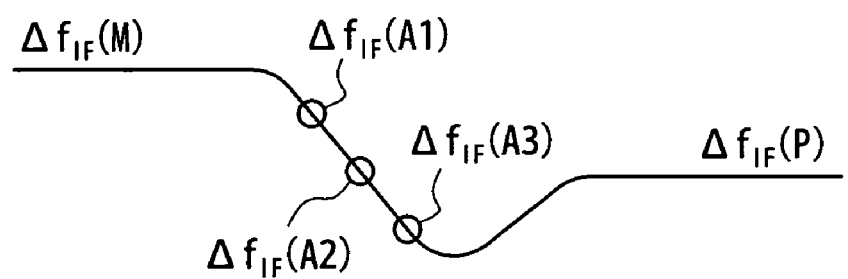
FIG. 9 illustrates a main portion of the synchronization acquisition method in the embodiment of the invention.
Figure 10:
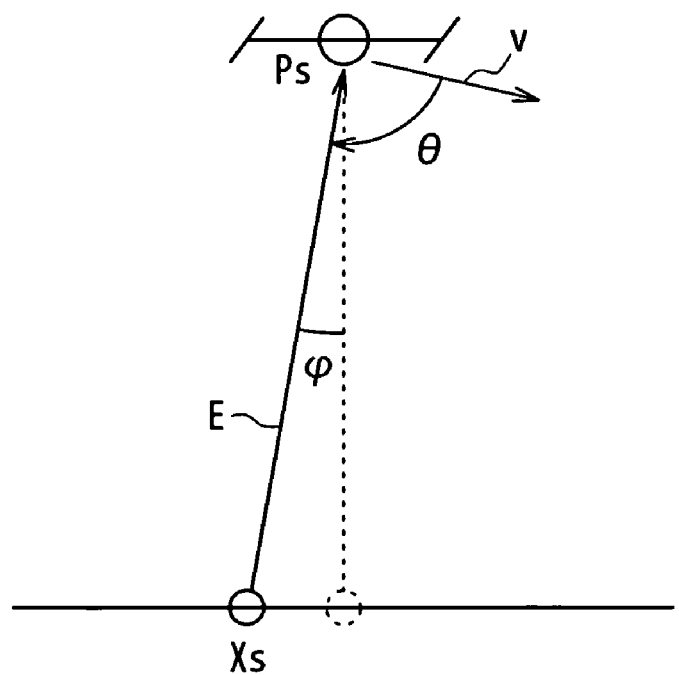
FIG. 10 illustrates another main portion of the synchronization acquisition method in the embodiment of the invention.

Referring to FIG. 9, there is shown a diagram illustrating the difference between the synchronization acquisition method according to the present embodiment and the related-art method that is executed at the time of a power-on sequence. Namely, in the related-art method, IF carrier error $\Delta f_{IF}$ (M) immediately before the last power-off sequence stored in a nonvolatile memory is kept used until the signals from the four GPS satellites have been put in the synchronization hold state and correct IF carrier error $\Delta f_{IF}$ (A) along with the reception velocity has been obtained. Therefore, the frequency difference affects TTFF from the power-on sequence to the synchronization acquisition to the first positioning, thereby delaying this TTFF.

In contrast, according to the present embodiment, when synchronization acquisition has been executed on the signal from at least one GPS satellite to put this satellite in the synchronization hold state, IF carrier errors $\Delta f_{IF}$ (A1), $\Delta f_{IF}$ (A2), $\Delta f_{IF}$ (A3) and so on approximately computed as described above are used to execute synchronization hold, thereby shortening the TTFF from the power-on sequence to the positioning.

Meanwhile, if synchronization acquisition has been executed as described above, a plurality of IF carrier errors $\Delta f_{IF}$ are obtained by the time the signal received from the four GPS satellites are put in the synchronization hold state. In this case, let the GPS satellite from which IF carrier error $\Delta f_{IF}$ is obtained be called "IF carrier error computable satellite", then a GPS satellite can become this "IF carrier error computable satellite" if the following two conditions are satisfied:

(1) The GPS satellite is in the synchronization hold state and its IF carrier frequency can be obtained from the sync hold section (let the satellite number be i).

(2) There is the orbit information of GPS satellite i and the GPS satellite position and velocity can be obtained from the current time.

If there are two or more "IF carrier error computable satellites" and therefore there are a plurality of $\Delta f_{IF}$, newly obtained IF carrier error $\Delta f_{IF}$ may be used every time it is obtained; but it is better practice to execute the following computation by use of these two or more IF carrier errors $\Delta f_{IF}$ and use resultant IF carrier error $\Delta f_{IF}$:

(1) Obtain an average of a plurality of IF carrier errors $\Delta f_{IF}$ is obtained and use the resultant average value as IF carrier error $\Delta f_{IF}$ for obtaining the IF carrier frequency.

(2) Under the assumed premise that the higher the signal level in the sync hold section a GPS satellite have, the better the accuracy of its IF carrier, IF carrier error $\Delta f_{IF}$ obtained from the signal from the GPS satellite having the highest signal level among a plurality of IF carrier errors $\Delta f_{IF}$ is used as IF carrier error $\Delta f_{IF}$ for obtaining the IF carrier frequency.

(3) Under the assumed premise that the higher the signal level in the sync hold section a GPS satellite have, the better the accuracy of its IF carrier, an average of IF carrier errors $\Delta f_{IF}$ obtained from the signals from the GPS satellites having higher signal levels than a predetermined threshold and this average is used as IF carrier error $\Delta f_{IF}$ for obtaining the IF carrier frequency.

In the above-mentioned approximate computation of IF carrier error $\Delta f_{IF}$, approximate values that the receiver's velocity is assumed 0 for example are used. Use of such approximation in the method of the present embodiment even produces better results than the related-art method as will be described below.

Namely, if equation (11) shown in FIG. 36 is geometrically considered, the carrier frequency error is obtained by multiplying an inner product between the unit vector in the same direction as the eye gaze direction vector from GPS receiver position Xs to GPS satellite position Ps and satellite velocity vector v by constant $-f_{RF}/C$.

Let an angle formed by these two vectors E and v be $\theta$, then Doppler shift fD is as shown in equation (12), which indicates that the receiver position affects only $\cos \theta$.

If is regarded that the receiver be position in the proximity of ground surface, then the distance from the receiver to the GPS satellite is about 20,000 km, so that, if there is a deviation of about several km (assume 10 km for example) in the receiver position, angle $\phi$ of the eye gaze direction vector from the receiver to the satellite that changes accordingly is $$\tan \phi \approx 10/20000$$

namely, $\phi \approx 0.0005[\text{rad}] \approx$ approximately 0.3 degrees.

If this angle directly affects $\theta$, namely if $\theta' = \theta \pm \phi$, then equation (13) of FIG. 36 is obtained.

Here, from $\phi \approx 0$, approximations $\cos \phi \approx 1$, $\sin \phi \approx 0$ are obtained. Consequently, a difference between Doppler shift fD' with GPS receiver position deviated by approximately 10 km and original Doppler shift is as shown in equation (14) of FIG. 36 at a maximum, namely approximately 10 Hz.

In the above equation (14), absolute GPS satellite velocity |v| is assumed to be 4000 m/s at most. Namely, since the receiver velocity is regarded as 0 because it is unknown, if the error in receiver position is approximately 10 km, the Doppler shift can be obtained with an error of approximately 10 Hz at most as compared with the case in which the correct receiver position is given.

This error is directly reflected onto the IF carrier error. On the other hand, as described above, immediately after the power-on sequence on the receiver, the IF carrier error value held in the memory area in the receiver may be shifted by approximately 10 Hz to several 100 Hz until the IF carrier error value is updated, owing to the computation of the receiver velocity after the power-on sequence, even if the power-off period is as short as several seconds to tens of seconds.

Therefore, it is practicable to estimate lower IF carrier error $\Delta f_{IF}$ with IF carrier error $\Delta f_{IF}$ computed by the present embodiment rather than related-art IF carrier error $\Delta f_{IF}$ stored in the memory at the time of power-off.

Figure 11:
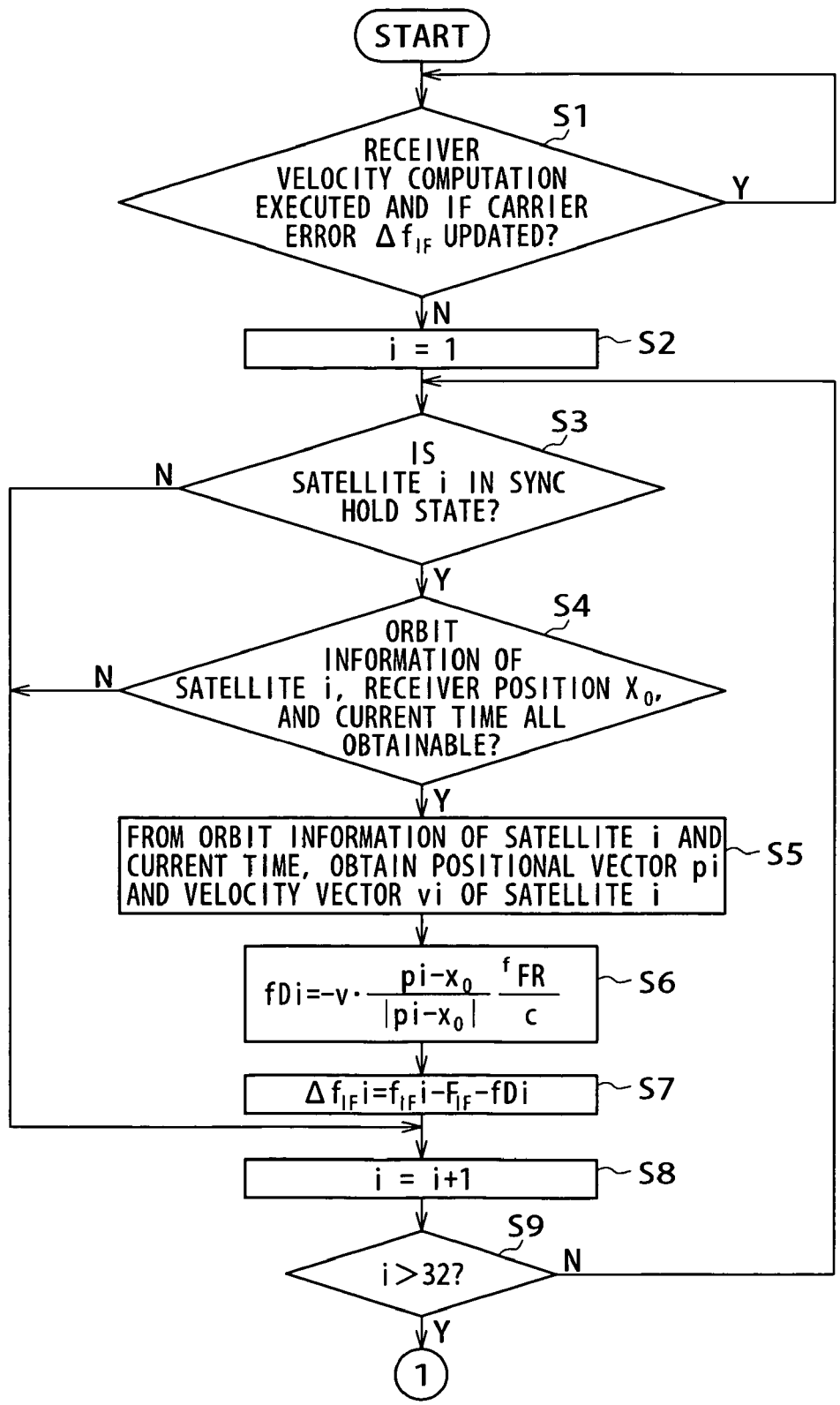
FIG. 11 is a part of a flowchart indicative of an exemplary operation of the main portion in the embodiment of the invention.
Figure 12:
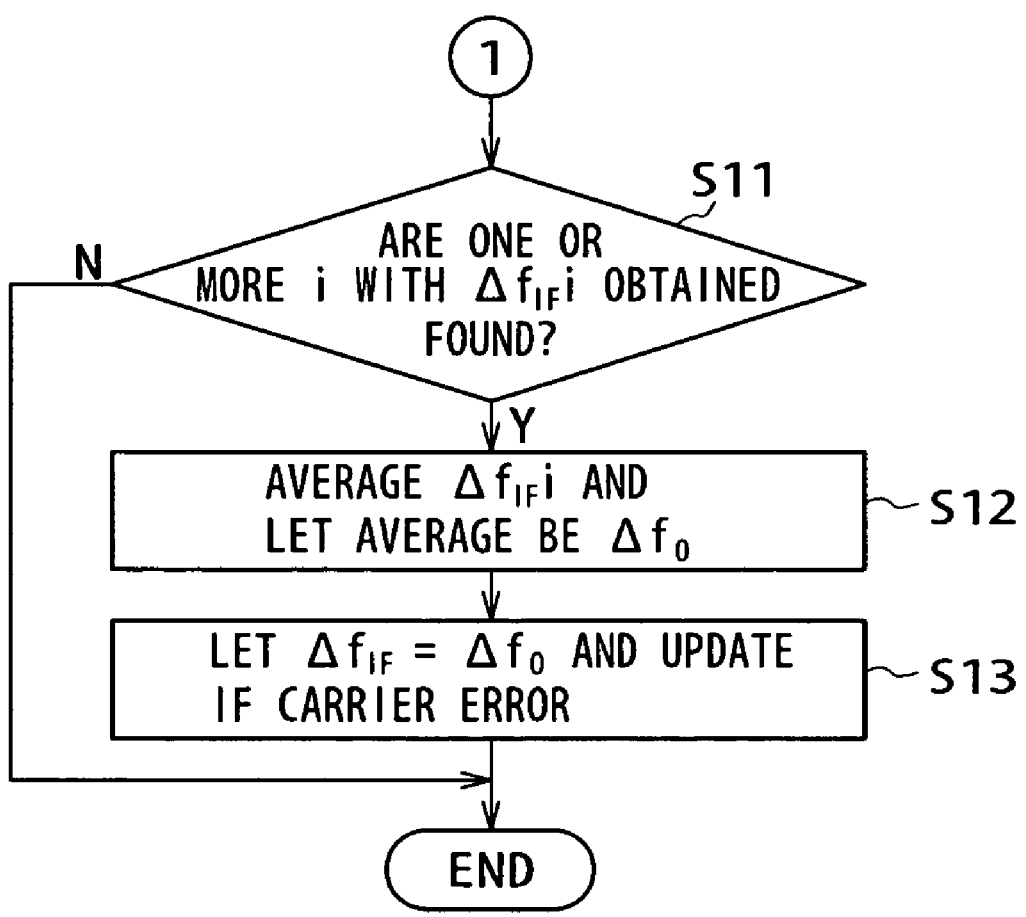
FIG. 12 is another part of the flowchart indicative of the exemplary operation of the main portion in the embodiment of the invention.

FIGS. 11 and 12 are flowcharts indicative of the processing of updating IF carrier error $\Delta f_{IF}$ for determining the initial value of the IF carrier frequency to be supplied to the read address control section 110.

First, the CPU 41 of the control section 40 determines whether the received signals of four or more GPS satellites are in the synchronization hold state, the velocity of this receiver has been computed, and, at the same time, IF carrier error $\Delta f_{IF}$ has been obtained, thereby updating IF carrier error $\Delta f_{IF}$ in the nonvolatile memory 46 to the correct value (step S1) moment by moment.

If IF carrier error $\Delta f_{IF}$ is found updated to the correct value moment by moment, the CPU 41 continues the updating of this IF carrier error $\Delta f_{IF}$, repeating step S1.

On the other hand, if IF carrier error $\Delta f_{IF}$ is found not updated to the correct value moment by moment at the time of power-on sequence for example, the CPU 41 sets satellite number i to be synchronously acquired to the initial value (i=1) (step S2) and determines whether the signal received from the GPS satellite of that satellite number i is in the synchronization hold state or not (step S3).

If the signal from the GPS satellite of this satellite number i is found not in the synchronization hold state in step S3, then the CPU 41 increments satellite number i (step S8) and determines whether the processing operations of step S3 and on have been executed on all GPS satellites, namely 32 GPS satellites (step S9). If there are any GPS satellites left unprocessed, the CPU 41 returns to step S3 to repeat the processing operations therefrom.

If the signal received from the GPS satellite having this satellite number i is found to be in the synchronization hold state, then the CPU 41 determines whether the orbit information of the GPS satellite having this satellite number i is stored in the nonvolatile memory 46 and the condition that three-dimensional position $x_0$ and current time of the GPS receiver are obtainable or not is satisfied (step S4).

If the above-mentioned condition is found not satisfied in step S4, then the CPU 41 goes to step S8 to increment satellite number i.

If the above-mentioned condition is found satisfied in step S4, then positional vector pi and velocity vector vi of the GPS satellite having this satellite number i are obtained from the orbit information and current time of the GPS satellite having satellite number i (step S5).

Next, Doppler shift fDi of the GPS satellite having this satellite number i is obtained from equation (1) shown in FIG. 36 (step S6). Then, using obtained Doppler shift fDi, IF carrier error $\Delta f_{IF}i$ is computed from equation (11) shown in FIG. 36 and the obtained IF carrier error is stored in the buffer memory (step S7).

Next, the CPU 41 goes to step S8 to increment satellite number i. In step S9, the CPU 41 determines whether the processing operations of step S3 and on have been executed on all GPS satellites. If there are any GPS satellites left unprocessed, then the CPU 41 returns to step S3 to repeat the above-mentioned processing operations therefrom.

If the above-mentioned processing operations of step S3 and on are found executed on all GPS satellites, then the CPU 41 determines whether IF carrier error $\Delta f_{IF}i$ has been computed for one or more GPS satellites (step S11 shown in FIG. 12).

If IF carrier error $\Delta f_{IF}i$ is found computed not for one or more GPS satellites in step S11, then the CPU 41 ends this processing routine, starting the processing from step S1 shown in FIG. 11 again. This time, in the synchronization acquisition of the signal from the GPS satellite, the IF carrier error stored in the nonvolatile memory 46 immediately before the power-off sequence is used, setting the initial value of the IF carrier frequency.

If IF carrier error $\Delta f_{IF}i$ is found computed for one or more GPS satellites in step S11, then the CPU 41 averages all obtained IF carrier error $\Delta f_{IF}i$ in this example (step S12). Then, the CPU 41 updates obtained average value $\Delta f_0$ to use as IF carrier error $\Delta f_{IF}$ for setting the initial value of the IF carrier frequency (step S13). The CPU 41 ends this processing routine, starting the above-mentioned processing operations from step S1 shown in FIG. 11.

Thus, synchronization hold processing is executed on the received signals from four GPS satellites, the velocity of the GPS receiver is computed, and, even during a period until the correct IF carrier error is obtained, the processing operations of steps S3 through S13 are executed, thereby sequentially updating the approximate values of IF carrier error $\Delta f_{IF}$, the updated values being used for synchronization acquisition. This novel configuration can shorten TTFF from the power-on sequence to the starting of positioning.

<Synchronization Acquisition Processing>

Figure 13:
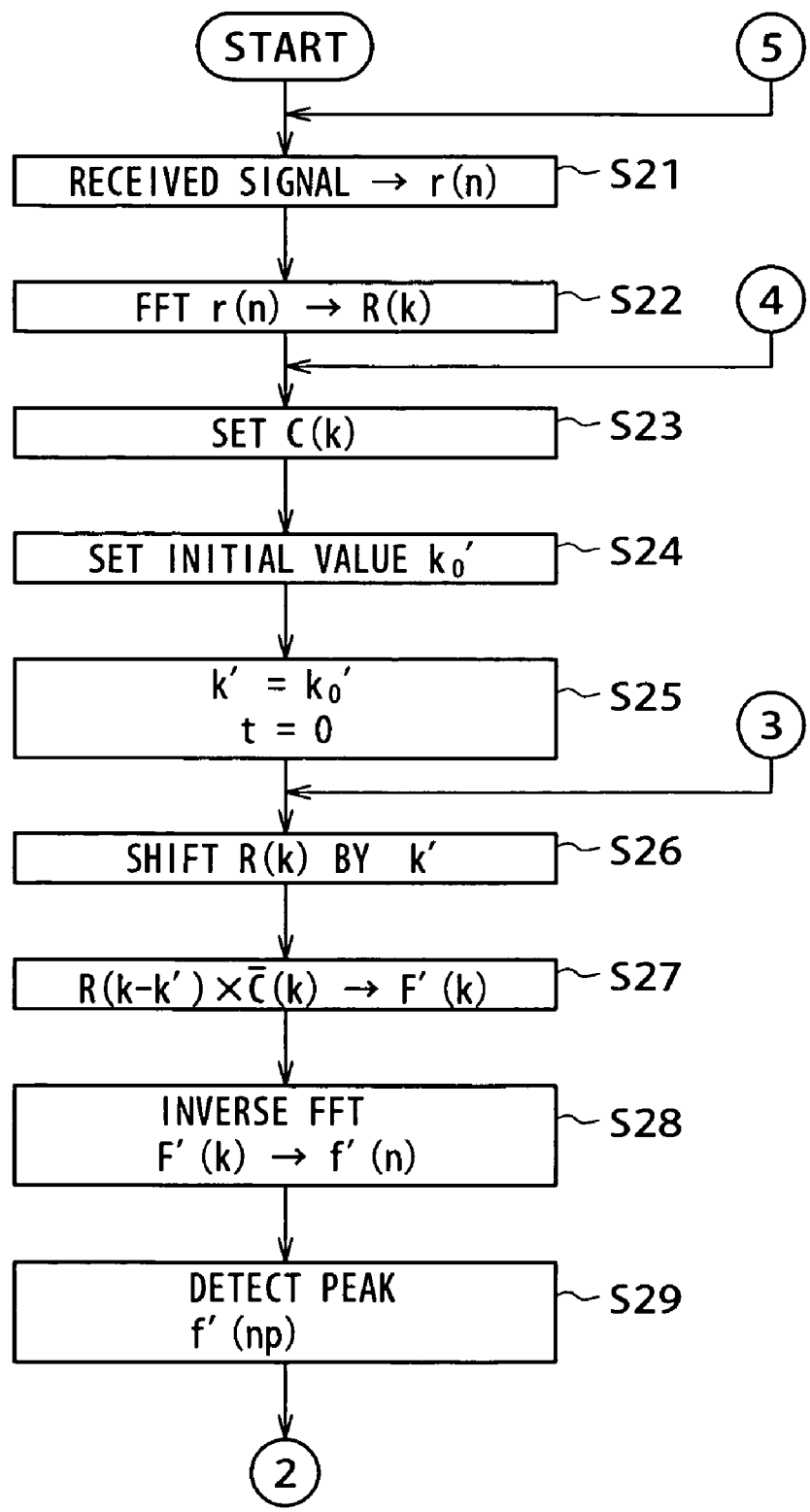
FIG. 13 is a part of a flowchart indicative of an operation of a second example of the synchronization acquisition method.
Figure 14:
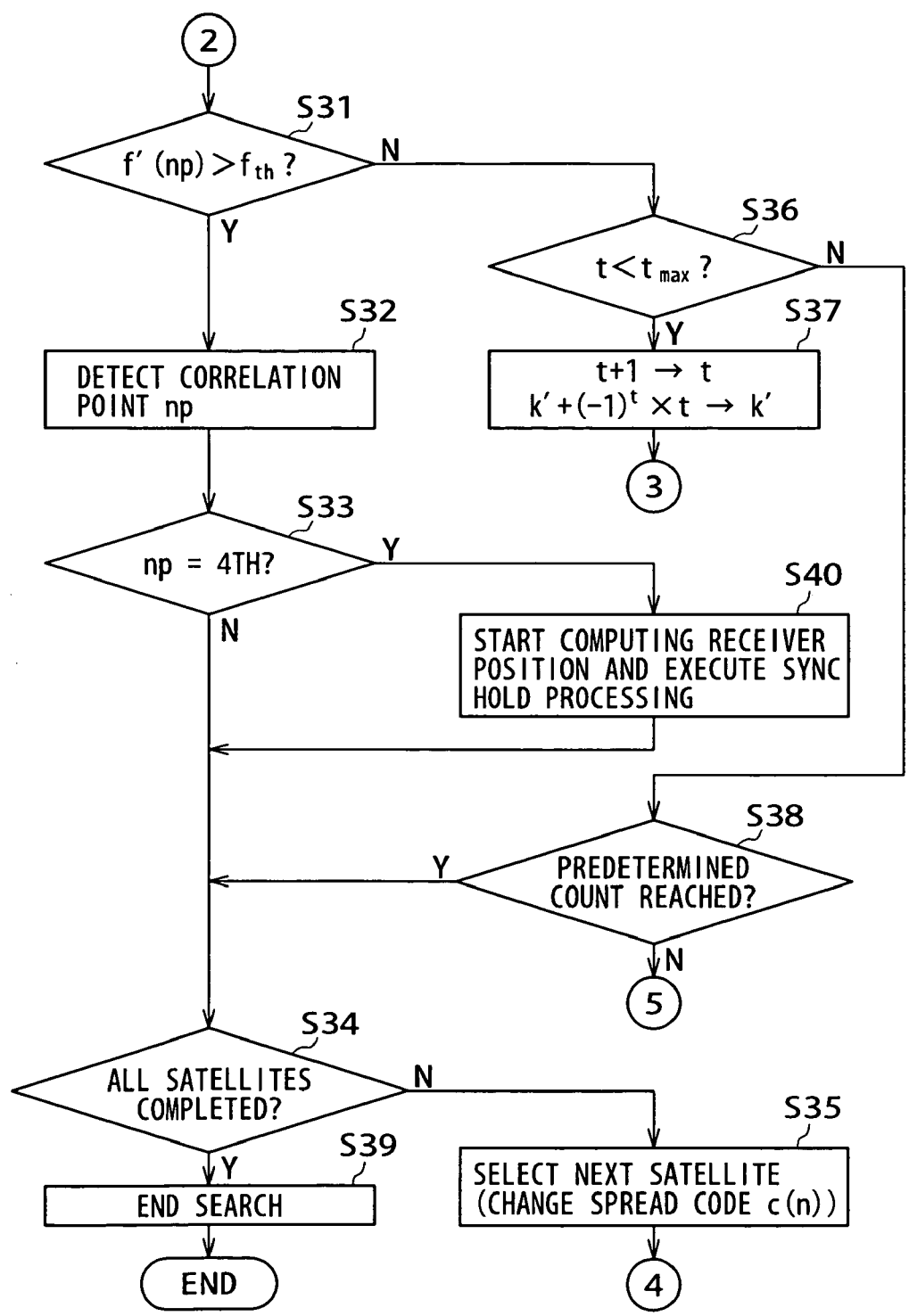
FIG. 14 is another part of the flowchart indicative of the operation of the second example of the synchronization acquisition method.

The following describes a flow of the processing to be executed in the sync acquisition section 20 in example 2 of synchronization acquisition, with reference to FIG. 13 and the flowchart shown in FIG. 14. It should be noted that FIG. 13 and the flowchart of FIG. 14 mainly correspond to the software processing to be executed in the DSP 23.

First, the IF data from the frequency converter section 10 is sampled by the sampling circuit 21 to be stored in the RAM 22 as a signal r(n) (step S21). Next, FFT is executed on the signal r(n) by the FFT processing section 101 and the result R(k) of FFT is stored in memory 102 (step S22). Next, FFT result C(k) of the replica PN code corresponding to the GPS satellite from which the signal has been received is set to the memory 106 (step S23).

Next, initial value $k_0'$ of a shift of the read address of FFT result R(k) of received signal r(n) in the memory 102 is determined (step S24). Namely, the shift of the read address corresponds to the IF carrier frequency as described above. The initial value of the IF carrier frequency computed by use of the IF carrier error and Doppler shift fD computed and determined as described above is obtained in the control section 40. The obtained initial value is supplied to the DSP 23. The DSP 23 determines initial value $k_0'$ of the shift of the read address on the basis of the supplied IF carrier frequency.

As described above, if there is no signal from the GPS satellite kept in the synchronization hold state in the GPS receiver immediately after its power-on sequence, the IF carrier error stored at the last power-off sequence is used to compute the initial value of the IF carrier frequency. On the basis of the computed initial value of the IF carrier frequency, initial value $k_0'$ of the shift of the read address is determined.

If the signals from one or more GPS satellites are put in the synchronization hold state, average value $\Delta f_0$ of the approximately computed IF carrier frequency is used to compute the initial value of the IF carrier frequency. From the computed IF carrier frequency, initial value $k_0'$ of the shift amount of the read address is determined.

Further, when the signals received from four or more GPS satellites have been put in the synchronization hold state and the correct IF carrier error can be obtained along with the computation of the velocity of the GPS receiver, this correct IF carrier error is used to compute the initial value of the IF carrier frequency and, on the basis of the computed IF carrier frequency, initial value $k_0'$ of the shift amount of the read address is determined.

Next, initial value k0' determined as above is set as shift amount k' of the read address of the FFT result from the memory 102 and change count t of shift control is set to initial value t=0 (step S25).

Next, FFT result R(k) of received signal r(n) is read from the memory 102 by shifting the read address by k' (step S26). Then, a complex conjugate between read FFT result R(k−k') is multiplied by the complex conjugate of FFT result C(k) of the replica PN code to obtain correlation function F'(k) (step S27).

Next, inverse FFT is executed on this correlation function F'(k) to obtain function f'(n) in the time domain (step S28). Then, peak value f'(np) is obtained for this peak value f'(n) (step S29) to determine whether obtained peak value f'(np) is greater than preset threshold value fth (step S31 shown in FIG. 14).

If peak value f'(np) is found smaller than preset threshold value fth in step S31, then it is determined that no correlation point has been detected and determines whether change count t of shift control is smaller than preset maximum value $t_{max}$ (step S36). This maximum value $t_{max}$ is equivalent to 1 kHz in conversion to frequency.

If change count t of shift control is found smaller than above-mentioned preset maximum value $t_{max}$, then change count t of shift control is incremented by 1 (t=t+1) and new shift amount k' is set as k'=k'+(−1)$^t$×t (step S37), upon which the procedure returns to step S26 to repeat the above-mentioned processing operations therefrom.

If change count t of shift control is found greater than above-mentioned preset maximum value $t_{max}$ in step S36, it is determined whether the count thus determined has exceeded a predetermined count for the data currently stored in the RAM 22 (step S38). If the count is not exceeding the predetermined count, then the procedure returns to step S21 to store new data into the RAM 22, thereby repeating the above-mentioned processing operations therefrom.

If the count is found exceeding the predetermined count in step S38, then it is determined whether the above-mentioned spread code synchronization search processing has been executed on all satellites to be searched (step S34). If the spread code synchronization search processing is found executed on all satellites to be searched, then the search operation is ended (step S39).

If, in step S34, there still remain any satellites to be searched, then the satellite to be searched next is selected and replica PN code c(n) is changed to the PN code that is used by the selected satellite (step S35). Then, back in step S23, the above-mentioned processing operations are repeated therefrom.

If peak value f'(np) is found greater than preset threshold value fth in step S31, then discrete time (the phase of PN code) that takes that peak value f'(np) is detected as the correlation point (step S32).

Next, it is determined whether or not detected correlation point np is the fourth one (step S33). If the detected correlation point is found to be the fourth one, then receiver position computation processing starts, thereby executing the synchronization hold processing in the sync hold section 30 (step S40). Then, the procedure goes to step S34. The processing of step S40 may be executed on the fourth or thereafter.

It should be noted that the amount of Doppler shift of the GPS satellite being received and the oscillation frequency error of the GPS receiver can be estimated from read address shift amount k' at the time correlation point np detected in step S32 is obtained. Namely, the carrier frequency of the received signal can be detected.

If detected correlation point np is found not to be the fourth one in step S33, then it is determined whether or not the above-mentioned spread code synchronization search processing has been completed on all GPS satellites to be searched (step S34). If this processing is found completed on all satellites to be searched, then the search operation is ended (step S39).

If there still remain any satellites on which the spread code synchronization search processing has not been completed in step S34, then the satellite to be searched next is selected and replica PN code c(n) is changed to the PN code to be used by the selected satellite (step S35). Then, the procedure returns to step S23 to repeat the above-mentioned processing operations therefrom.

Figure 15:
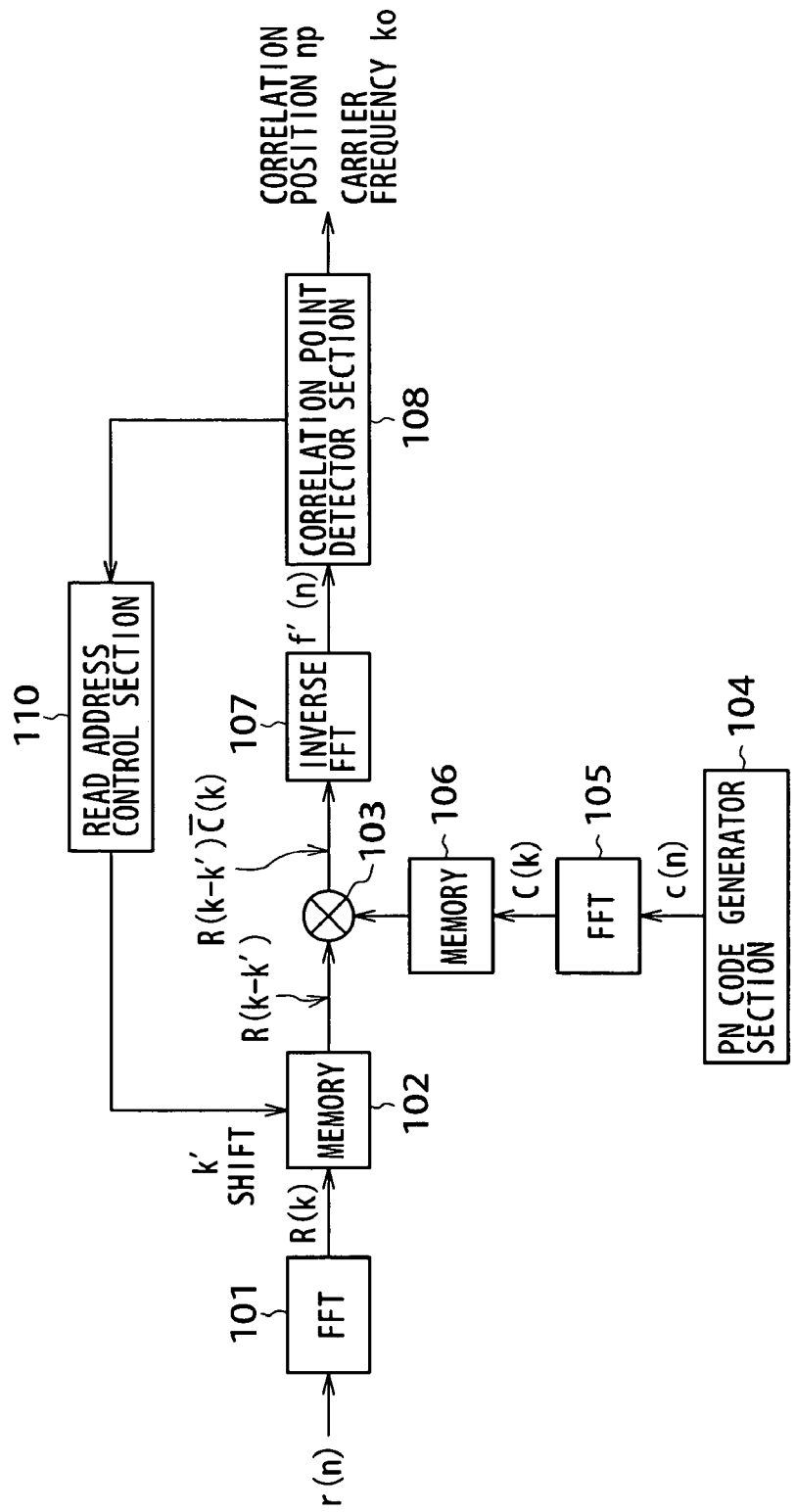
FIG. 15 illustrates a main portion with the operation of the second example of the synchronization acquisition method considered.

Referring to FIG. 15, there is shown a configuration diagram illustrating the above-mentioned processing of example 2 of synchronization acquisition as reflected onto the block diagram illustrating the internal configuration of the DSP 23 shown in FIG. 8. For the outputs of the component blocks shown in FIG. 15, the above-mentioned signal outputs and computation results are shown.

As described, according to example 2 of synchronization acquisition, even if the carrier frequency of the signal received from the GPS satellite is unknown, the synchronization detection of the carrier of the received signal and the satellite PN code can be executed by positive use of the processing in the frequency domain by FFT, thereby removing the carrier component. Therefore, the present embodiment can realize the detection of the correlation point between the satellite PN code of the GPS received signal and the replica PN code through the FFT-based digital matched filter at high speeds and with a simplified configuration. In addition, the IF carrier frequency can be detected from the read address shift in the memory 102.

It should be noted that, also in the case of example 2, the FFT computation of replica PN code c(n) at the time of satellite signal reception can be omitted by storing the FFT-processed replica PN codes corresponding to satellites into the memory in advance.

EXAMPLE 3 OF SYNCHRONIZATION ACQUISITION BY THE DIGITAL MATCHED FILTER

As described above, in the detection of the correlation point between the reception signal and the replica PN code through the digital matched filter, the unit data length in which the correlation point detection is made is normally one period length of the PN code.

However, with the signal received from the GPS satellite, 1 bit of data is equivalent to 20 periods of the PN code as described above and therefore, for these 20 periods, the code has the same bit pattern. Utilizing this characteristic in example 3 of synchronization acquisition, the unit data length in which the correlation point between the received signal and the replica PN code is detected through the digital matched filter is two or more periodical length of the PN code. The sampling frequency in the sampling circuit 21 is the same as that used in the above-mentioned examples.

The received signal is FFT-processed in units equivalent to two or more periods of the PN code, so that, in example 3, the accuracy of the detection of the IF carrier frequency goes up and, at the same time, the reception sensitivity is enhanced, thereby facilitating the synchronization acquisition of the PN code and the search for the IF carrier frequency as compared with the method in which the signals in the same time domain are cumulatively added. The following further describes example 3 of synchronization acquisition.

There is a prior example in which the correlation point is detected on the data of one period length cumulatively added over M period (M being two or more integer) of PN code in the time domain (refer to U.S. Pat. No. 4,998,111 or "An Introduction to Snap Track® Server-Aided GPS Technology, ION GPS-98 Proceedings", for example).

Figure 16:
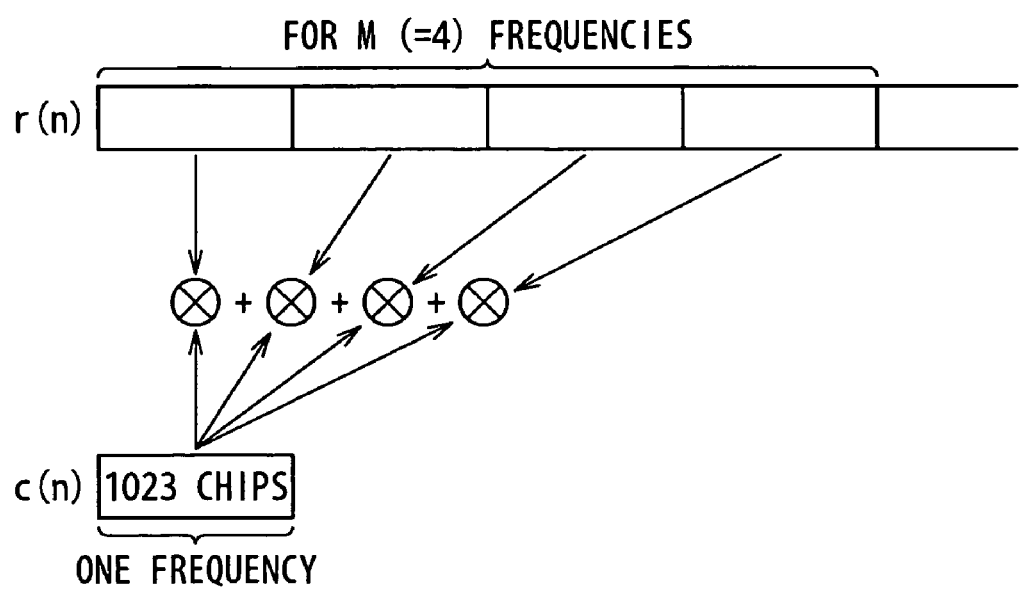
FIG. 16 illustrates a third example of the synchronization acquisition method.

Namely, as shown in FIG. 16, in the above-mentioned prior examples, the results obtained by multiplying received signal r(n) by replica PN code are cumulatively added over M period. In these prior methods, C/N is enhanced by use of the periodicity and noise of the signal received from the GPS satellite. If the synchronization between the carrier of the received signal and the satellite PN code has been already acquired, C/N is improved by a multiple of M, which enhances the reception sensitivity (the correlation point detection sensitivity) by a multiple of M. Consequently, the detection accuracy of the carrier frequency is enhanced by a multiple of M.

However, if there is no synchronization between the carrier of the received signal and the satellite PN code, M carriers having different phases are additively combined, so that the crucial GPS signal is set off in the result of the cumulative addition, disabling the detection of the correlation peak.

Therefore, if the carrier frequency of the received signal is unknown, it is required to search for the carrier frequency, which in turn requires to execute an inefficient operation of executing cumulative addition for each of the frequencies subject to search.

In contrast, in example 1 and example 2 described above, a simple method is used in which the read addresses of FFT results in the memory are shifted in the frequency domain as described above to acquire synchronization between the carrier of the received signal and the satellite PN code, thereby making the most of the effect of the cumulative addition.

Like example 2, example 3 of synchronization acquisition searches for carrier frequencies with the carrier frequency of the signal received from the GPS satellite unknown; in this case, FFT is executed on received signal r(n) for each M period of PN code. For each M period of PN code, received signal carrier frequency search is executed by controlling the shift of the read addresses of the received signal FFT results in the memory.

Given $M \leq 20$, data d(n) in equation (3) shown in FIG. 35 becomes a fixed value of 1 or −1 during M period of PN code, so that this data may be ignored. Then, equation (3) becomes $r(n)=A \cdot c(n)\cos 2\pi n f_0 + n(n)$. Because number of data items is M×N (N being the number of data items for one period of spread code), when discrete Fourier transform is executed on this with M period length, the relationship between k obtained after discrete Fourier transform and real frequency f is $f = kfs/MN$ if $0 \leq k \leq MN/2$ or $f = (k-MN)fs/MN$ (where $f<0$) if $MN/2 < k < MN$, thereby multiplying the resolution by M.

Figure 17:
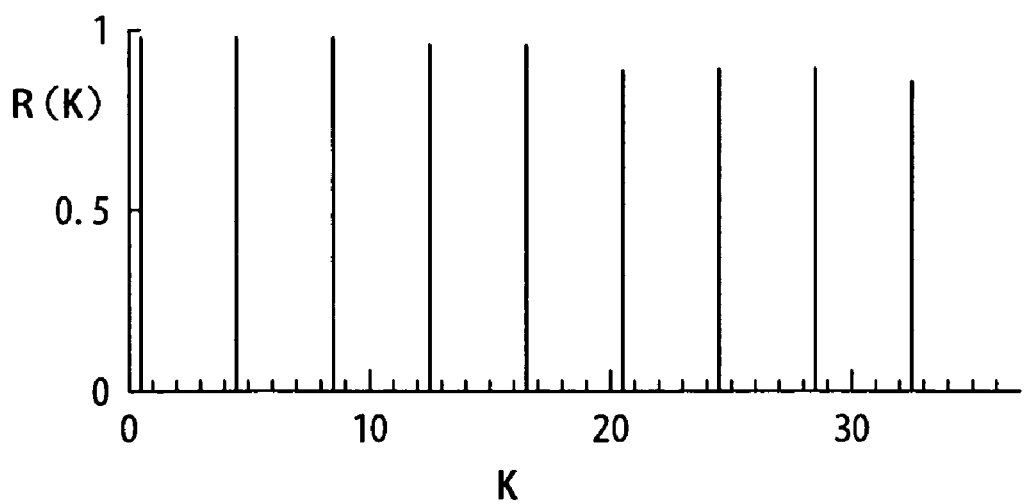
FIG. 17 further illustrates the third example of the synchronization acquisition method.

However, PN code c(n) is a frequency signal and let the time of one period length be T (T=1 millisecond with C/A code of GPS), then there is no frequency component having accuracy not more than f=1/T. Therefore, the frequency component of PN code c(n) in FFT result R(K) (where $0 \leq K < MN$) after discrete Fourier transform of received signal r(n) concentrates on every M points, namely N points in MN data items and its amplitude is M times as high as the same frequency component in one period length because M frequency components are cumulatively added. FIG. 17 shows a spectrum example with M=4 for the brevity of description.

In the example shown in FIG. 17, the signal spectra appear at M=4 and there is no signal component in between. Outside N points, the frequency component of PN code c(n) is 0. On the other hand, noise n(n) is a non-periodic signal in many cases, so that the energy is distributed over all MN frequency components. Consequently, in a sum of N frequency components of PN code c(n) in FFT result R(K) of received signal r(n), C/N is enhanced by a multiple of M like the cumulative addition in the time domain.

If carrier component cos $2\pi n f_0$ shown in equation (3) is not found in received signal r(n), the frequency component of PN code c(n) in FFT result R(k) concentrates on K=i×M (where $0 \leq i < N$). But because the carrier component exists, the read addresses of FFT results R(K) in the memory are cyclically shifted by $k_0$ of the carrier frequency with K=(i×M)−$k_0$ for each period of PN code in example 3.

Figure 18:
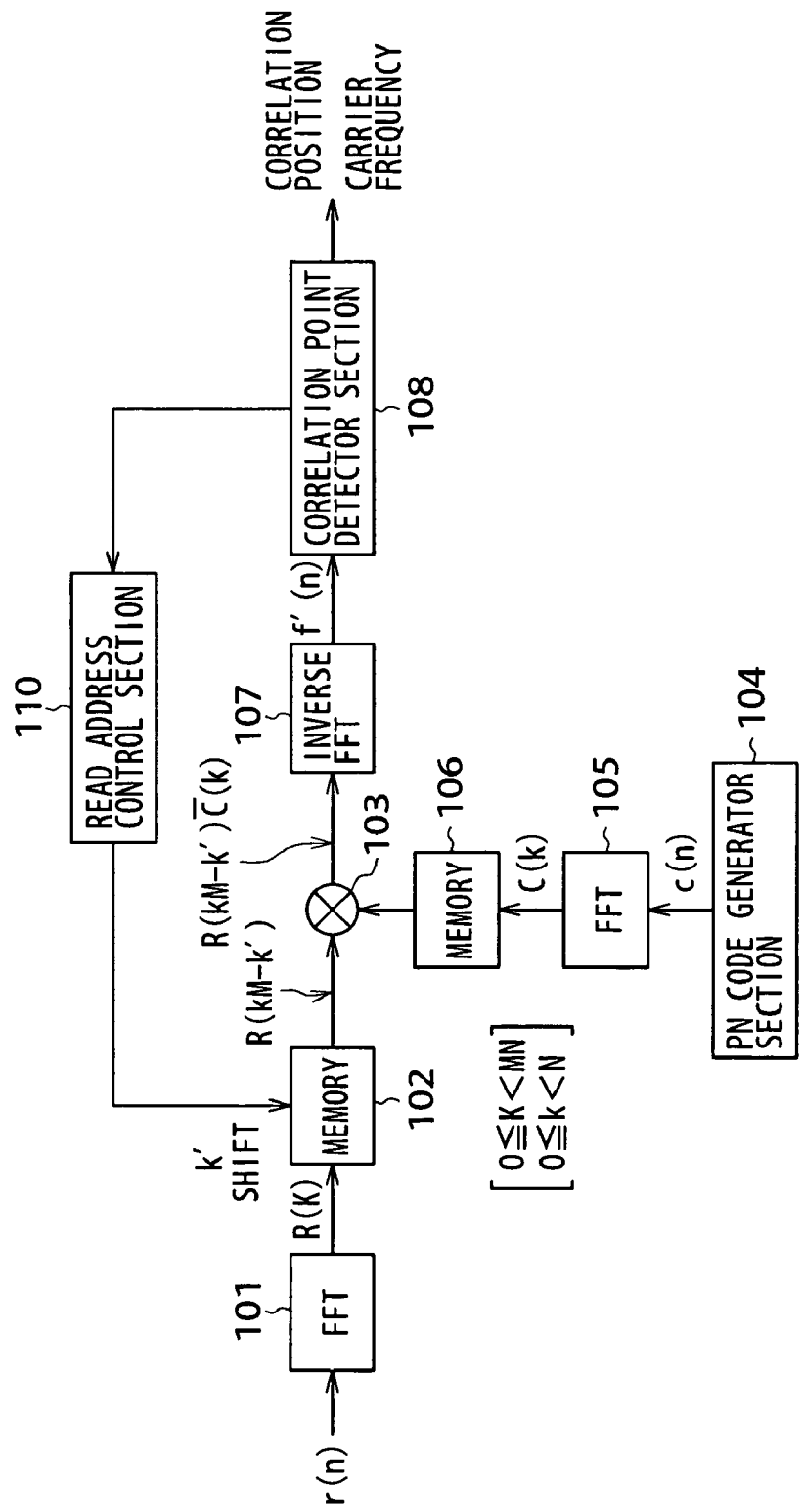
FIG. 18 illustrates a main portion with an operation of the third example of the synchronization acquisition method considered.
Figure 19:
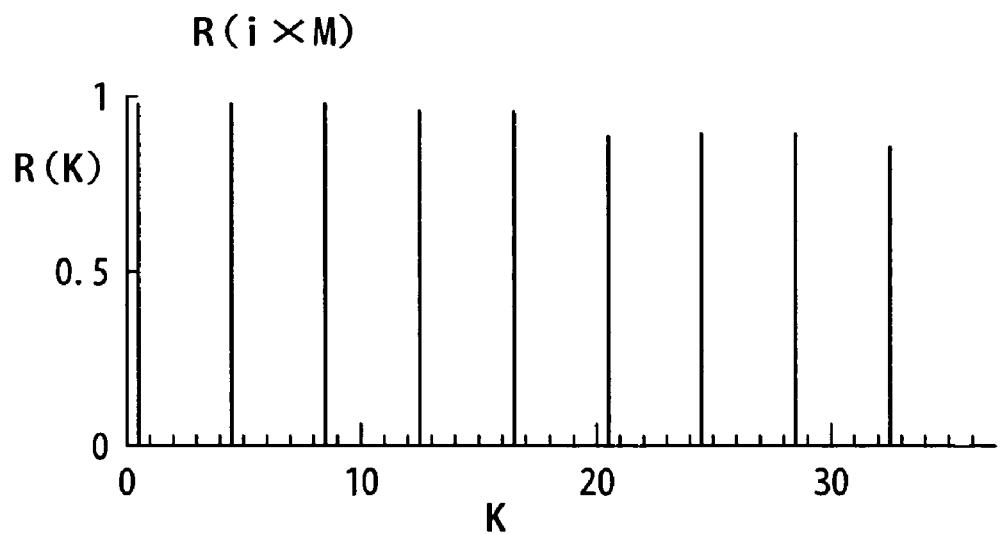
FIG. 19 illustrates a fourth example of the synchronization acquisition method.
Figure 20:
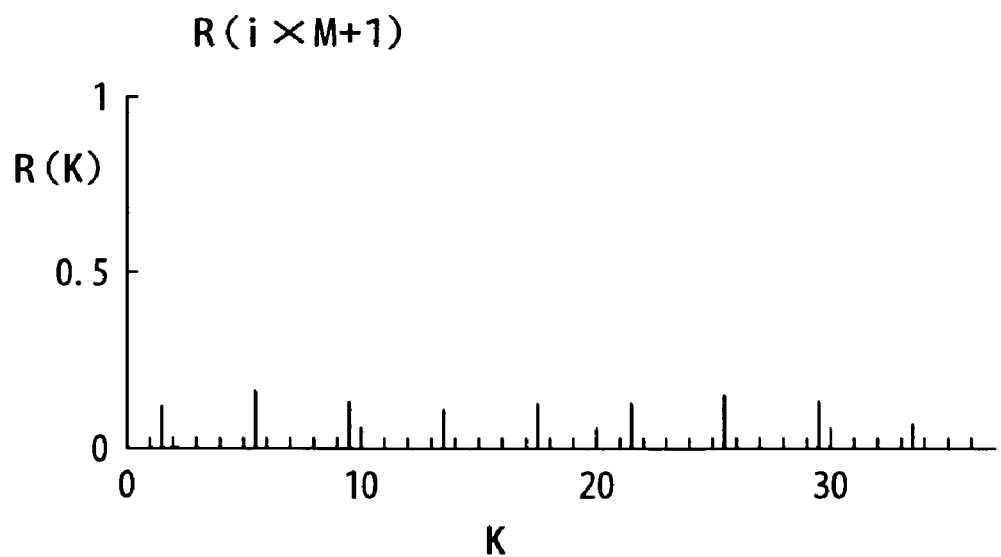
FIG. 20 further illustrates the fourth example of the synchronization acquisition method.
Figure 21:
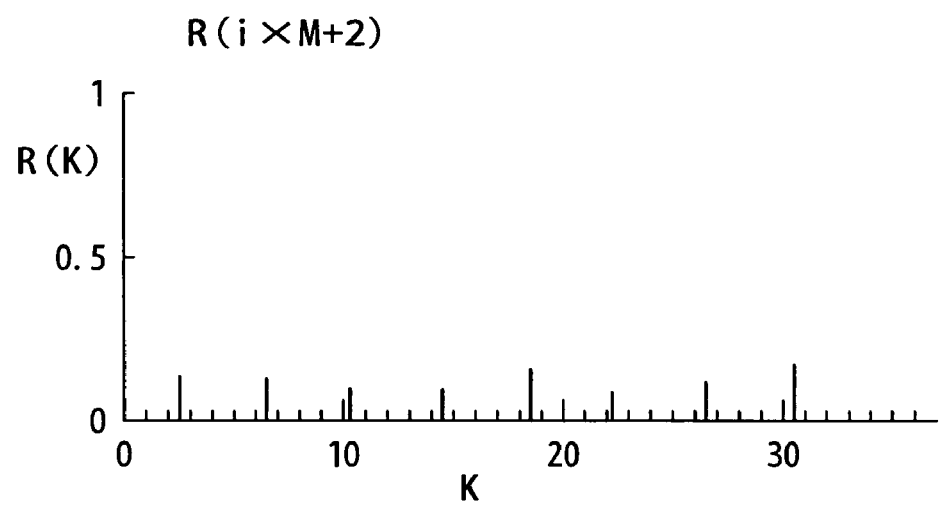
FIG. 21 still further illustrates the fourth example of the synchronization acquisition method.
Figure 22:
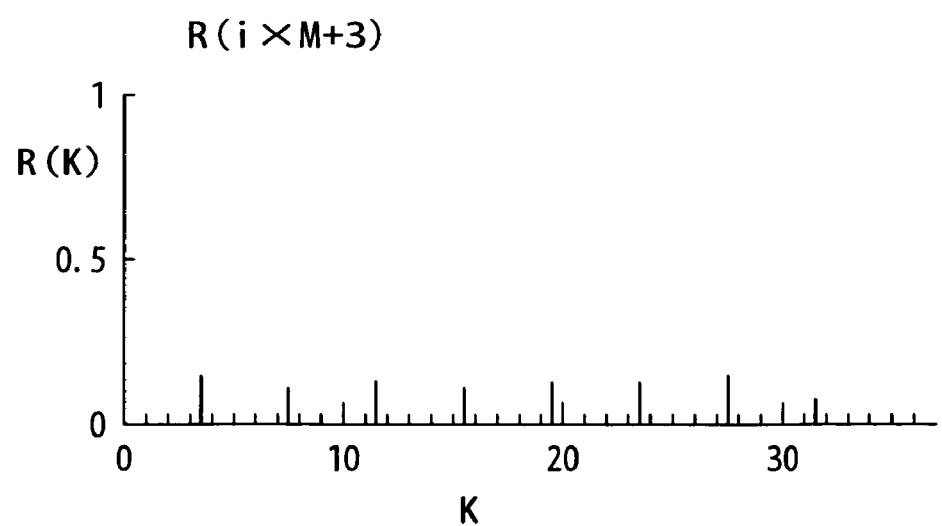
FIG. 22 separately illustrates the fourth example of the synchronization acquisition method.

The configuration of the DSP 23 in example 3 described above is generally the same as with example 2 shown in FIG. 8. In example 3, however, the storage capacity of the RAM 22 is equivalent to M period of PN code, 16 periods (16 milliseconds) for example. The DSP 23 executes an acquisition processing operation in a data basis equivalent to the M period of PN code. FIG. 18 shows a configuration diagram in which the above-mentioned acquisition processing operation reflected onto the internal configuration of the DSP 23.

Namely, from the FFT processing section 101, FFT result R(K) with FFT computation unit being M period of PN code is obtained to be written to the memory 102. In FIG. 18, $0 \leq k < N$, $0 \leq K < MN$.

Next, the read addresses are shift-controlled and the FFT result is read from the memory 102 to be supplied to the multiplier section 103, in which the FFT result is multiplied by the complex conjugate of FFT result C(k) of replica PN code c(n) read from the memory 106.

In the case of example 3, correlation function F(k) obtained from the multiplier section 103 is as shown in equation (8) of FIG. 35. It should be noted that, in equation (8), k is k in the complex conjugate of FFT result C(k) of PN code and $k_0$ is that of $f_0 = k_0 \cdot fs/MN$.

This time, in FIG. 18, the peak of correlation function f'(n) obtained from the inverse FFT processing section 107 includes the PN code with R(K) being M period, so that M peaks appear in a range of $0 \leq n < MN$. However, because only one correlation point may be detected for one period of PN code, the computation by the inverse FFT processing section 107 may be only within a range of $0 \leq n < N$ as with the above-mentioned first and second embodiments, requiring no computation in $N \leq n < MN$.

Thus, according to example 3, the correlation point detection sensitivity and therefore the reception sensitivity can be enhanced by multiplying the FFT of received signal r(n) by M of PN code. In this case, as M increases, the reception sensitivity goes up. Therefore, controlling the M value can control the reception sensitivity.

It should be noted that, also in example 3, the FFT computation of replica PN code c(n) at the time of satellite signal reception can be omitted by storing the FFT-processed replica PN codes corresponding to satellites into the memory in advance.

EXAMPLE 4 OF SYNCHRONIZATION ACQUISITION BY THE DIGITAL MATCHED FILTER

In the above-mentioned third embodiment, received signal r(n) including M period (M>1) of PN code is FFT-processed to enable the search for unknown carrier frequencies and the enhancement of the reception sensitivity. However, because the number of data samples increases from N in the case of one period of PN code to a multiple of M=MN, the FFT computation time becomes long and the storage capacity of the memory 102 gets large. Example 4 of synchronization acquisition is intended to improve these problems.

As shown in FIG. 17, the frequency component in FFT result R(K) with M period (M>1) of PN code used as FFT processing unit exists only every M components, so that the component between every M frequencies is not needed.

Now, FFT result R(K) (where $0 \leq K < NM$) is divided into M sets of R(i×M), R(i×M+1), R(i×M+2), . . . , R(i×M+M−1)($0 \leq i < N$). For the brevity of description, divided spectrum examples to be obtained when M=4 sets are shown in FIGS. 19 through 22. The carrier frequency is unknown and one of the M sets has the energy of the GPS signal in which the correlation is detected. In the examples shown in FIGS. 19 through 22, the set of R(i×M) shown in FIG. 19 includes the frequency component of received signal r(n) and the other 3 divided spectra have only noise.

It should be noted that carrier frequency $k_0$ of an actual signal is not $k'=k_0$ to be correct, so that, if $k_0$ is between $k_0'$ and $k_0+1$, namely $k_0' \leq k_0 < k_0'+1$, for example, correlations are detected in both $k'=k_0'$ and $k'=k_0'+1$, the one nearer to $k_0$ being greater than the other.

If M is a power of 2 with FFT result R(K) divided into M sets as described above, each set can be computed independently of each other due to the property of the FFT computation procedure.

Figure 23:
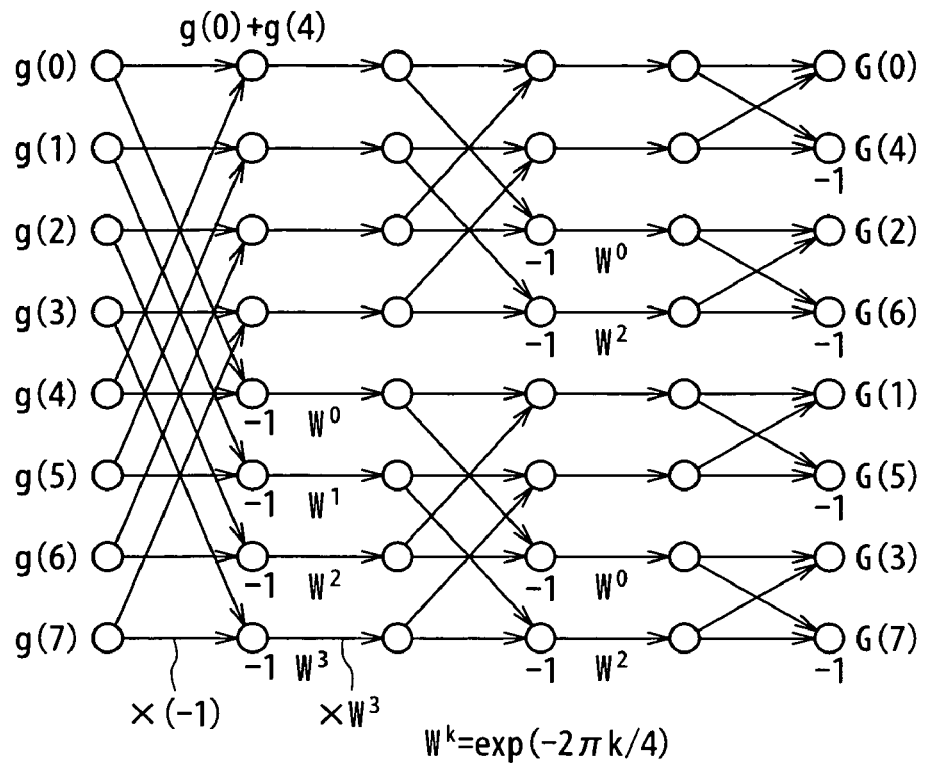
FIG. 23 still separately illustrates the fourth example of the synchronization acquisition method.
Figure 24:
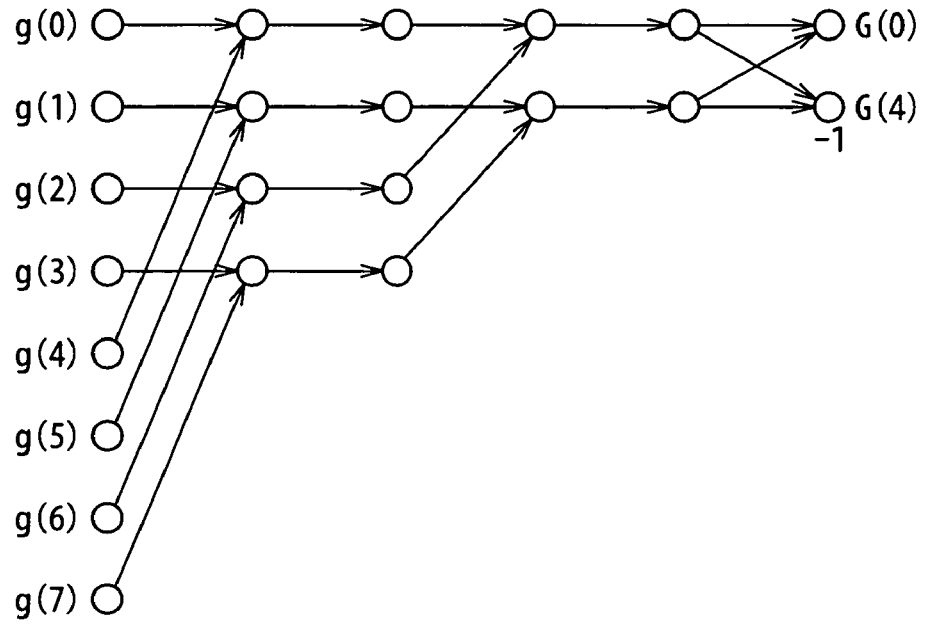
FIG. 24 yet separately illustrates the fourth example of the synchronization acquisition method.

FIG. 23 shows the flows of signals for FFT computations 8 items of data g(0) through g(7). If FFT result G(K) shown in FIG. 23 is divided into 4 sets of data, (G(0), G(4)), (G(1), G(5)), (G(2), G(6)), and (G(3), G(7)) are obtained. For (G(O), G(4)), the computation only in the portion shown in FIG. 24 may be executed. The structure of this computation also applies to the other sets (G(1), G(5)), (G(2), G(6)), and (G(3), G7)).

These four sets are checked one by one as follows. First, (G(0), G(4)) is computed. After the computation is completed, the memory in which (G(0), G(4)) is stored is freed, upon which the computation of the next set starts. When the computations of (G(1), G(5)), (G(2), G(6)), and (G(3), G(7) have been completed in this order, their memories are freed. Therefore, only ¼ of memory capacity is required as compared with the computation of FFT of G(0) through G(7) in a batch manner. The number of multiplications in the FFT computation by dividing FFT result into M is the same as that in the FFT computation of the entire FFT result in a batch manner.

The above-mentioned example is also applicable to R(i×M), R(i×M+1), R(i×M+2), . . . , R(i×M+M−1) by raising M to a power of 2, so that the storage capacity of the memory in which the FFT result is stored may only be 1/M of MN, namely N. If the correlation point is detected halfway in the detection of R(i×M), R(i×M+1), R(i×M+2), . . . , R(i×M+M−1) in this order, then the sets subsequent to the one in which the correlation point has been detected need not be checked, so that a shorter processing time can be expected than detecting the correlation point by FFT processing the received signals for the M periods of PN code in a batch manner.

Figure 26:
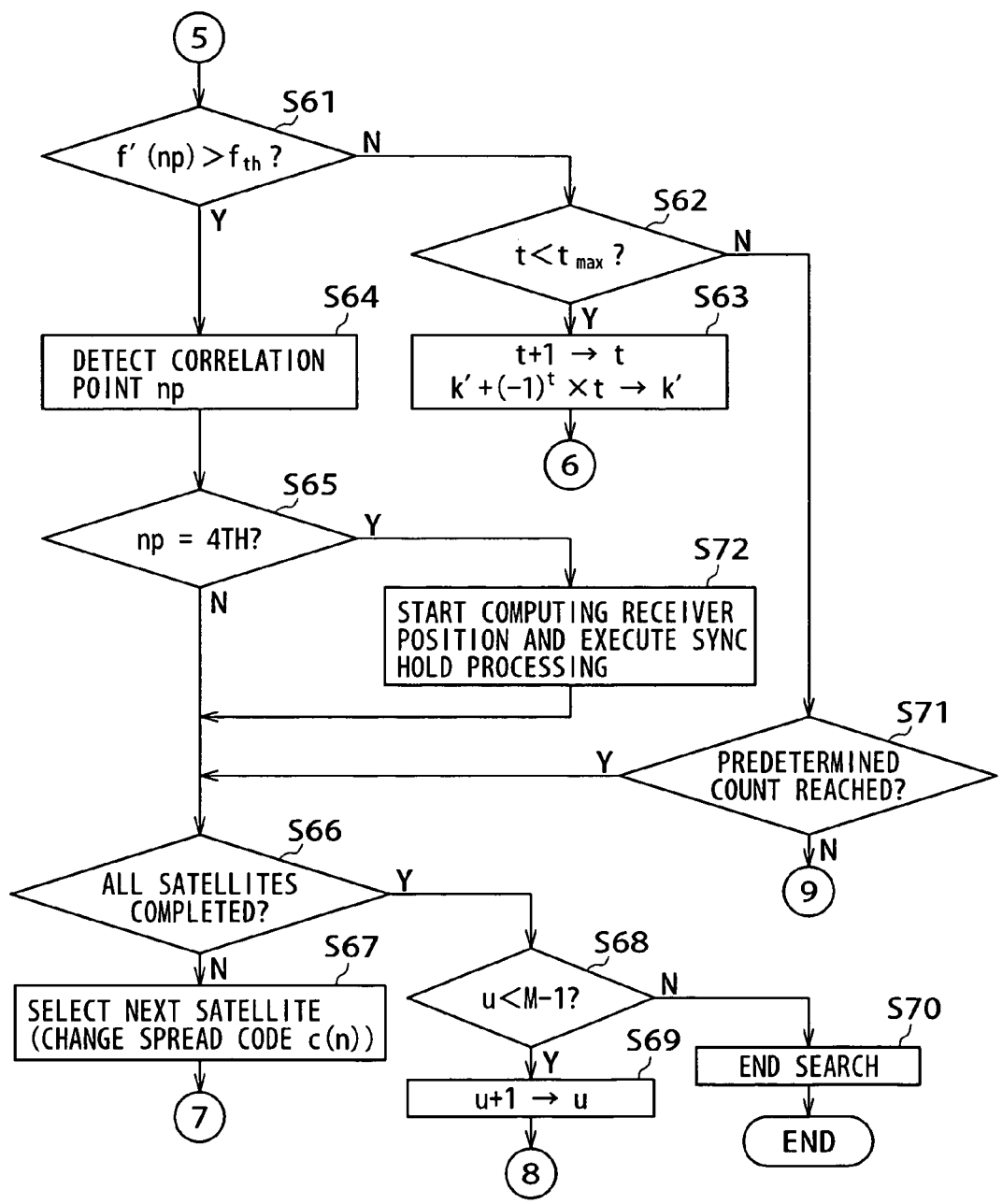
FIG. 26 is another part of the flowchart indicative of the operation of the fourth example of the synchronization acquisition method.

The following describes the processing by the sync acquisition section 20 in example 4 of synchronization acquisition described above with reference to the flowcharts shown in FIGS. 25 and 26. In the examples shown in FIGS. 25 and 26, in order to minimize the number of times FFT processing is executed, carrier frequency search is executed for each set of FFT for all subject satellites for correlation detection. It should be noted that the flowcharts shown in FIGS. 25 and 26 mainly correspond to the software processing in the DSP 23.

First, variable u ($0 \leq u < M$) for the number of divided sets of R(K) (where $0 \leq K < NM$ and $K = i \times M + u$) is initialized (step S51). Next, the IF data from the frequency converter section 10 is sampled by the sampling circuit 21 and the resultant sampling data is stored in the RAM 22 as signal r(n) (where $0 \leq n \leq MN$) for the M periods of PN code, 16 periods (16 milliseconds) for example (step S52). Next, this signal r(n) is FFT-processed in the FFT processing section 101 and FFT result R(K) is written to the memory 102 (step S53). Next, FFT result C(k) of PN code corresponding to the GPS satellite from which the signal has been received is set to the memory 106 (step S54).

Next, initial value $k_0'$ of the shift of the read address of FFT result R(K) of received signal r(n) in the memory 102 is determined in the same manner as above-mentioned step S24 (step S55). Then, determined initial value $k_0'$ is set as shift k' of the read address of the FFT result in the memory 102 and change count t of shift control is set to initial value t=0 (step S56).

Next, FFT result R(K) of received signal r(n) is read from the memory 102 by shifting its read address by k' (step S57). Then, read FFT result R(K−k') is multiplied by the complex conjugate of FFT result C(k) of replica PN code to obtain correlation function F'(k) (step S58).

Inverse FFT is executed on this correlation function F'(k) to obtain function f'(n) in the time domain (step S59) Then, peak value f'(np) of this function f'(n) is obtained (step S60) to determine whether obtained peak value f'(np) is greater than preset threshold value fth (step S61 shown in FIG. 26).

If peak value f'(np) is found smaller than preset threshold value fth in step S61, then it is regarded that no correlation point has been detected. Then, it is determined whether change count t of shift control is smaller than preset maximum value $t_{max}$ (step S62). This maximum value $t_{max}$ is equivalent to 1 kHz in frequency conversion.

If change count t of shift control is found smaller than preset maximum value $t_{max}$, then change count t of shift control is incremented by 1 (t=t+1) and new shift k' is set to $k'=k'+(-1)^t \times t$ (step S63), upon which the procedure returns to step S57 to repeat the above-mentioned processing operations therefrom.

If change count t of shift control is found greater than preset maximum value $t_{max}$ in step S62, then it is determined whether the count found greater has exceeded a predetermined count for the data currently stored in the RAM 22 (step S71). If the change count is found not exceeding the predetermined count, then the procedure returns to step S52 and stores new data into the RAM 22 to repeat the above-mentioned processing operations therefrom.

If the change count is not less than the predetermined count in step S71, then it is determined whether the above-mentioned spread code synchronization search processing has been completed for all satellites (step S66). If the spread code synchronization search operation is found completed for all satellites, it is determined whether variable u is smaller than M−1 (step S68). If variable u is found smaller, then variable u is incremented (step S69), upon which the procedure returns to step S53 to repeat the above-mentioned processing operations therefrom.

If variable u is found equal to or greater than M−1 in step S68, then the search operation is ended (step S70).

If the spread code synchronization search processing is found not completed in step S66, then a satellite to be processed next is selected and replica PN code c(n) is changed to the PN code that is used by the selected satellite (step S67). Then, the procedure returns to step S54 to repeat the processing operations therefrom.

If peak value f'(np) is found greater than preset threshold value fth in step S61, then discrete time (phase of PN code) taking this peak value f'(np) as the correlation point and initial value $k_0'$ of the shift of the read address of the above-mentioned FFT result R(K) in the memory 102 is reset to shift k' of the read address at that moment (step S64).

Next, it is determined whether detected correlation point np is the fourth one (step S65). If it is the fourth one, then the CPU 41 starts receiver position computation processing, thereby executing synchronization hold processing in the sync hold section 30 (step S72). Then, the procedure goes to step S66. It should be noted that the process of step S72 may be also executed on correlation points subsequent to the fourth correlation point.

It should be noted that the Doppler shift of the GPS satellite from which the signal is being received and oscillation frequency error can be estimated from shift k' at the time correlation point np detected in step S64 is obtained variable u for the number of divided sets.

If the detected correlation point np is found not the fourth one in step S65, then the procedure goes to step S66 to execute the above-mentioned processing operations of step S66 and on.

It should be noted that, if the carrier frequency is known as with example 1 of synchronization acquisition described above, only corresponding one of R(i×M), R(i×M+1), R(i×M+2), . . . , R(i×M+M−1) may be computed, thereby making the method of executing FFT on the received signal in units of the time including plural periods of PN code applicable in the same manner.

Unlike the related-art methods in which the sliding correlator takes time in principle, the above-mentioned synchronization acquisition methods of examples 1 through 4 according to the invention execute the processing by the FFT-based digital matched filter by use of a high-seed DSP, thereby significantly shortening the processing time. Especially, in the methods of examples 3 and 4, FFT processing is executed in units of M period of PN code, thereby providing synchronization acquisition with high sensitivity.

Further, in the case of example 4, FFT processing can be executed faster in units of M period of PN code.

If the synchronization acquisition of the signals from four or more GPS satellites can be executed by the sync acquisition section 20 by use of any of the above-mentioned novel methods, the GPS receiver can compute the position and velocity of the GPS receiver from the phase of PN code and the IF carrier frequency. Namely, the computation of positioning can be made without the arrangement of the sync hold section 30.

However, the execution of the computation of positioning and velocity with an accuracy enough for the GPS receiver requires the detection of the phase of PN code and the IF carrier frequency with high precision, for which it is required to raise the sampling frequency in the sampling circuit 21 or increase the time length of the IF data to be stored in the RAM 22 for example.

If a digital matched filter is used in the sync acquisition section 20, it must be considered that the digital matched filter itself has no synchronization hold capability.

If a configuration is used in which no navigation message is obtained from outside of the GPS receiver, then the sync acquisition section 20 must demodulate the navigation messages from four or more GPS satellites every 20 ms, so that the DSP 23 must always execute the detection of synchronization and the demodulation of navigation message at fairly high speeds.

However, if the computations of GPS receiver position and velocity are executed with highly enough accuracy only by the sync acquisition section 20 as described above, the hardware size increases to push up the cost and power dissipation, presenting serious problems in actually manufacturing the GPS receiver.

In order to overcome these problems, the embodiments of the invention execute the coarse synchronization acquisition by use of the dedicated sync acquisition section 20 and the synchronization hold of a plurality of GPS satellites and the demodulation of navigation messages by use of the sync hold section 30. The sync acquisition section 20 passes the information such as the detected GPS satellite number, the phase of PN code of that satellite, the IF carrier frequency, and the signal intensity of correlation detected signal to the sync hold section 30 via the control section 40 as data. The sync hold section 30 starts operating with the supplied data used as the initial values.

[Configuration of the Sync Hold Section 30]

In order to execute the synchronization hold of a plurality of GPS satellite signals in parallel, the sync hold section 30 has a plurality of channels each allocated to one GPS satellite signal.

Figure 27:
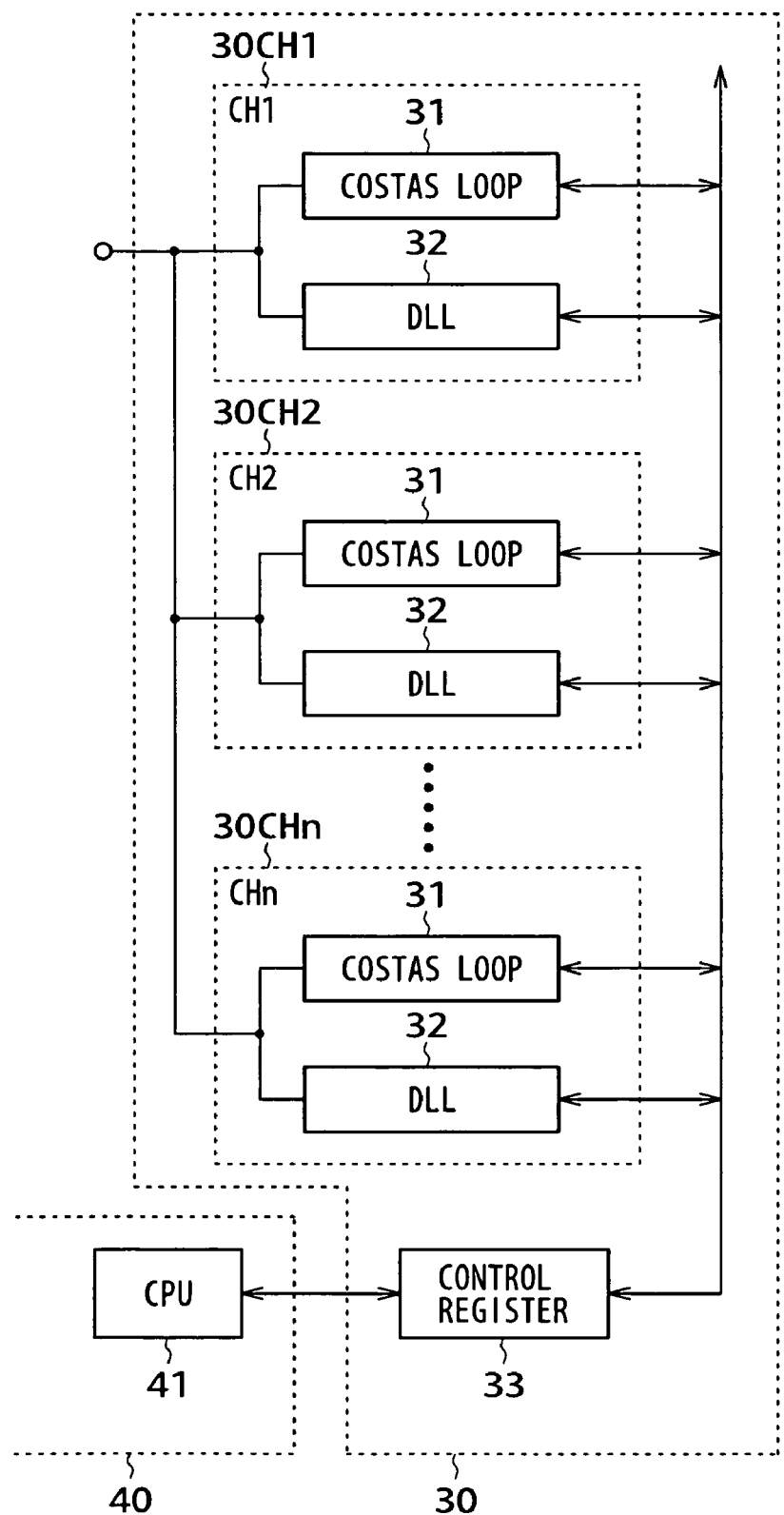
FIG. 27 is a block diagram illustrating an exemplary configuration of a synchronization hold section of a part of FIG. 1.

FIG. 27 shows an exemplary configuration of the sync hold section 30 in the present embodiment. The sync hold section 30 has sync hold sections 30CH1, 30CH2, . . . , 30CHn for n channels and a control register 33. Each of the channel sync hold section 30CH1, 30CH2, . . . , 30CHn has a Costas loop 31 and a DLL (Delay Locked Loop) 32.

The control register 33, connected to the CPU 41 of the control section 40, receives the parameters of the Costas loop 31 and the DLL 32 and the data for defining the filter characteristics and sets the received data to a portion indicated by the CPU 41 of a channel indicated by the CPU 41. The control register 33 also receives the correlation value information and frequency information from the Costas loop 31 and the DLL 32 and passes the received information to the CPU 41 when accessed thereby.

[Configurations of the Costas Loop 31 and the DLL 32]

Figure 28:
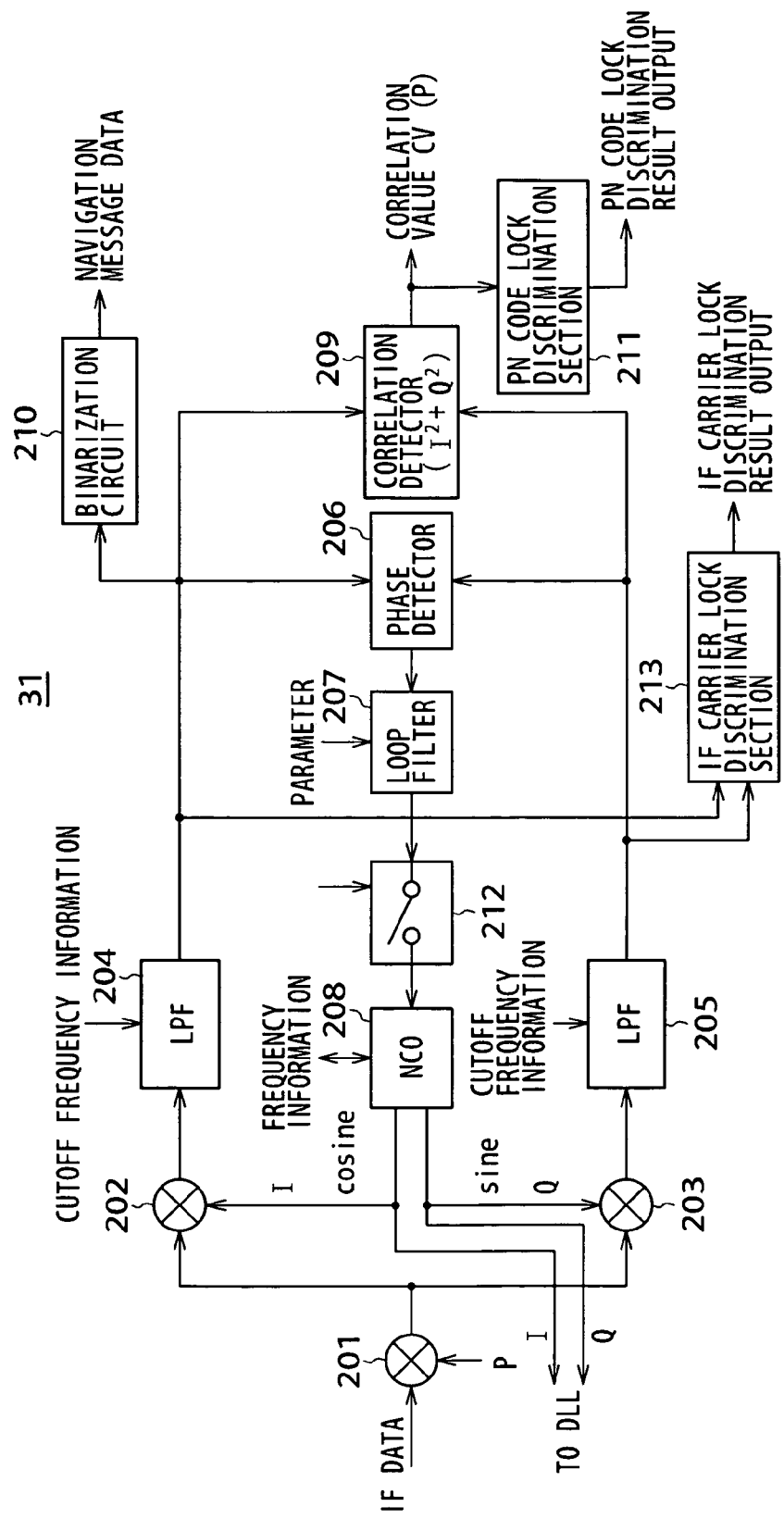
FIG. 28 is a block diagram illustrating an exemplary configuration of a Costas loop forming a part of the synchronization hold section shown in FIG. 27.
Figure 29:
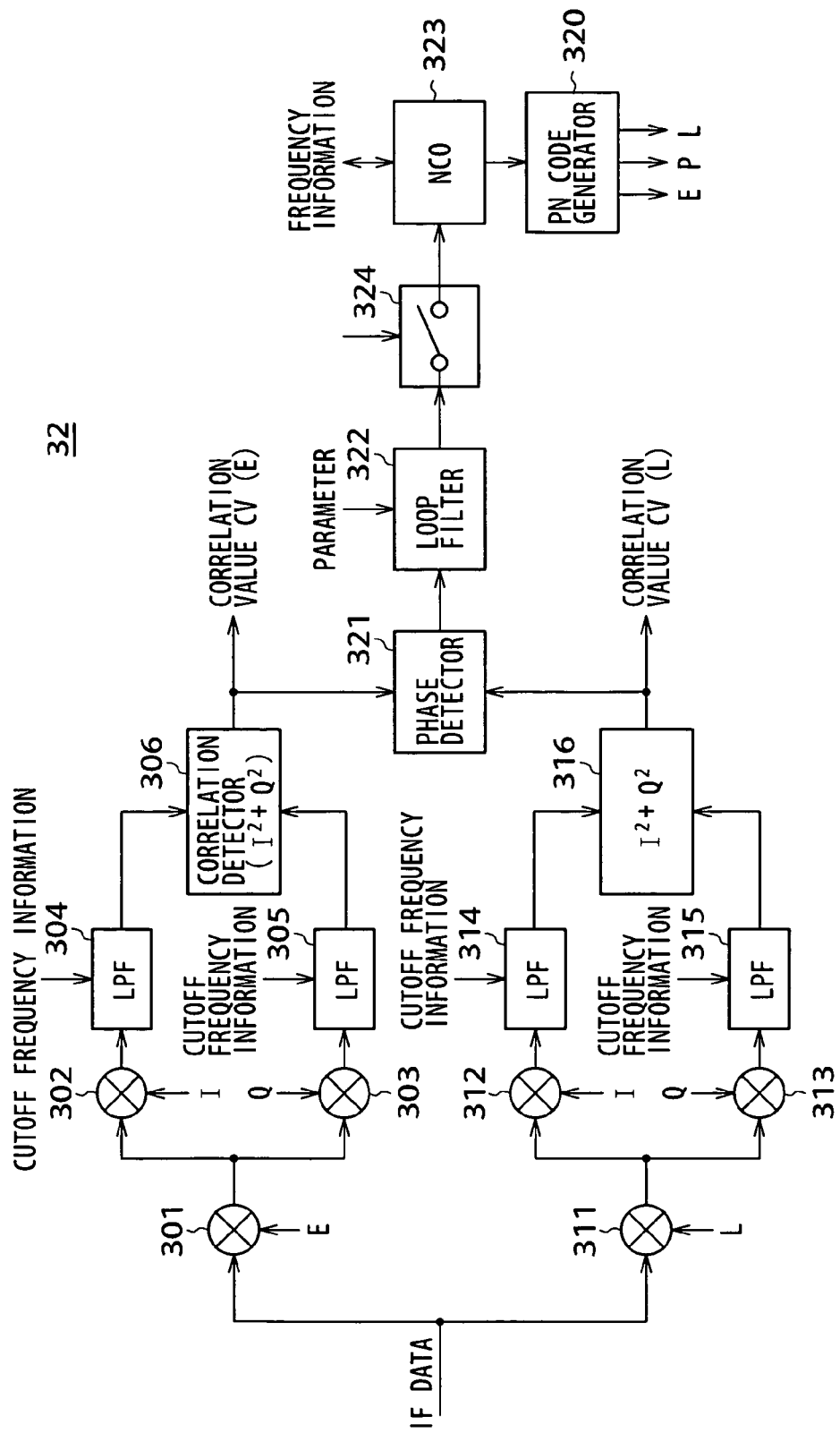
FIG. 29 is a block diagram illustrating an exemplary configuration of a DLL forming a part of the synchronization hold section shown in FIG. 27.

FIG. 28 shows a block diagram illustrating an exemplary configuration of the Costas loop 31 and FIG. 29 shows an exemplary configuration of the DLL 32.

The Costas loop 31 executes the synchronization hold of the IF carrier frequency and extracts navigation messages that are transmission data. The DLL 32 executes the synchronization hold of the phase of satellite PN code. The Costas loop 31 and the DLL 32 cooperate to spectrum-despread the GPS satellite signal to get the signal before it was spectrum-spread and demodulates this signal to get a navigation message, supplying the navigation message to the CPU 41 of the control section 40. The following specifically describes the operations of the Costas loop 31 and the DLL 32.

[Costas Loop 31]

The IF data from the frequency converter section 10 is supplied to a multiplier 201. To this multiplier 201, the replica PN code is supplied from a PN code generator 320 of the DLL 32 shown in FIG. 29.

The PN code generator 320 of the DLL 32 generates replica PN codes of three phases of prompt PN code P, early PN code E, and late PN code L. As will be described later, the DLL 32 computes the correlations between early PN code E, later PN code L, and IF data and controls the generated phases of the replica PN codes from the PN code generator 320 such that these correlation values become equal to each other. Consequently, the phase of the prompt PN code P becomes equal to the phase of the satellite PN code of the GPS satellite signal.

To the multiplier 201 for despreading of the Costas loop 31, the prompt PN code P is supplied from the PN code generator 320 to be despread. The despread IF data from the multiplier 201 is supplied to multipliers 202 and 203.

The Costas loop 31 has the multipliers 202 and 203, lowpass filters 204 and 205, a phase detector 206, a loop filter 207, a NCO (Numerically Controlled Oscillator) 208, a correlation detector 209, a binarization circuit 210, a PN code lock discrimination section 211, a switch circuit 212, and an IF carrier lock discrimination section 213 as shown in FIG. 28.

The cutoff frequency information of the lowpass filters 204 and 205, the parameter for defining the filter characteristic of the loop filter 207, and the frequency information for defining the oscillation center frequency of the NCO 208 are set through the control register 33 from the CPU 41 on the basis of the synchronization acquisition result in the sync acquisition section 20.

The switch circuit 212 controls the open/close of the Costas loop 31 and is turned on/off by the switching control signal from the CPU 41. It should be noted that, in the initial state before a synchronization hold operation starts, the switch circuit 212 is off and the loop open state is provided. When, after starting a synchronization hold operation, the correlation output of the correlation detector 209 of the Costas loop has reached a significant level, the switch circuit 212 is turned on, providing the loop close state.

The signal despread in the multiplier 201 is supplied to the multipliers 202 and 203. To these multipliers 202 and 203, I (Cosine) signal and Q (Sine) signal of quadrature phase are supplied from the NCO 208 which are made approximately the IF carrier on the basis of the frequency information from the CPU 41 of the control section 40.

The results of these multipliers 202 and 203 are supplied to the phase detector 206 via the lowpass filters 204 and 205. The lowpass filters 204 and 205 receives the cutoff frequency information from the CPU 41 of the control section 40 to remove the out-of-band noise from the supplied signal.

The phase detector 206 detects the phase difference between the IF carrier and the frequency signal from the NCO 208 on the basis of the signals from the lowpass filters 204 and 205 and supplies the detected phase difference to the NCO 208 via the loop filter 207. Consequently, the NCO 208 is controlled accordingly to synchronize the phase of the output frequency signal from the NCO 208 with the IF carrier component.

It should be noted that the loop filter 207 integrates the phase error information from the phase detector 206 in accordance with the parameter supplied from the CPU 41 of the control section 40 to form an NCO control signal for controlling the NCO 208. With the NCO 208, the phase of the output frequency signal from the NCO 208 is synchronized with the IF carrier component by the NCO control signal from the loop filter 207 as described above.

The outputs of the lowpass filters 204 and 205 of the Costas loop 31 are supplied to the correlation detector 209. The correlation detector 209 multiplies each of the received output signals from the lowpass filters 204 and 205 by itself and adds the results of the multiplication, outputting the result of the addition. The output of the correlation detector 209 is indicative of correlation value CV(P) between the IF data and prompt PN code P from the PN code generator 320. This correlation value CV(P) is passed to the CPU 41 of the control section 40 via the control register 33.

At the same time, the output of the lowpass filter 204 is supplied to the binarization circuit 210, from which navigation message data is outputted.

Correlation value CV(P) output from the correlation detector 209 is supplied to the PN code lock discrimination section 211. The PN code lock discrimination section 211 compares correlation value CV(P) output with a predetermined threshold value. If correlation value CV(P) output is found greater than the threshold value, it is indicative that synchronization hold is locked; if correlation value CV(P) output is found smaller than the threshold value, it is indicative that synchronization hold is unlocked, these states being indicated by PN code lock discrimination output signals.

In the present embodiment, this PN code lock discrimination output signal is transmitted to the CPU 41 of the control section 40, upon which the CPU 41 recognizes that the PN code in the sync hold section 30 is in the locked or unlocked state. From this PN code lock discrimination output signal, the CPU 41 only determines that the PN code is in the synchronization hold state. Therefore, the CPU 41 does not execute the detection of the IF carrier unlocked state from this PN code lock discrimination output signal, although the synchronization of the PN code has been acquired. The CPU 41 determines from the output of the IF carrier lock discrimination section 213 whether the frequency of the IF carrier has been locked or unlocked.

To the IF carrier lock discrimination section 213, the outputs of the lowpass filters 204 and 205 are supplied. The IF carrier lock discrimination section 213 obtains a ratio of the absolute value of the output of the lowpass filter 204 and that of the lowpass filter 205. If the obtained ratio is found not less than a predetermined threshold value, it is indicative that the synchronization of the IF carrier is locked; otherwise, it is indicative that the synchronization of the IF carrier is unlocked, which are indicated by the IF carrier lock discrimination output signal.

Namely, let the output of the lowpass filter 204 be Io and the output of the lowpass filter 205 be Qo and the above-mentioned predetermined threshold value be th, then the locked state is indicated if |Io|/|Qo|>th; otherwise, the unlocked state is indicated.

In the present embodiment, this IF carrier lock discrimination output is transmitted to the CPU 41 of the control section 40. From the received IF carrier lock discrimination output, the CPU 41 recognizes the locked or unlocked state of the IF carrier.

[DLL 32]

As shown in FIG. 29, in the DLL 32, the IF data from the frequency converter section 10 is supplied to the multiplier 301 and the multiplier 311. To the multiplier 301, early PN code E is supplied from the PN code generator 320. To the multiplier 311, late PN code L is supplied from the PN code generator 320.

The multiplier 301 multiplies the IF data by the early PN code E to execute spectrum despread processing, and supplies the despread signal to the multipliers 302 and 303. To the multipliers 302, I signal is supplied from the NCO 208 of the above-described Costas loop 31. To the multiplier 303, Q signal is supplied from the NCO 208.

The multiplier 302 multiplies the despread IF data by I signal from the NCO 208 and supplies the result to a correlation detector 306 via a lowpass filter 304. Likewise, the multiplier 303 multiplies the despread IF data by Q signal from the NCO 208 and supplies the result to the correlation detector 306 via a lowpass filter 305.

It should be noted that, like the lowpass filters 204 and 205 of the Costas loop 31, the lowpass filters 304 and 305 receive the cutoff frequency information from the CPU 41 of the control section 40 to remove the out-of-band noise from these signals.

The correlation detector 306 multiplies each of the received output signals from the lowpass filters 304 and 305 by itself and adds the results of the multiplication, outputting the result of the addition. The output of the correlation detector 306 is indicative of correlation value CV(E) between the IF data and early PN code E from the PN code generator 320. This correlation value CV(E) is supplied to a phase detector 321 and stored in the control register 33 for the CPU 41 of the control section 40 to use.

Likewise, a multiplier 311 multiplies the IF data by delay PN code L to execute spectrum despread processing and supplies the despread signal to multipliers 312 and 313. To the multiplier 312, I signal is supplied from the NCO 208 and, to the multiplier 313, Q signal is supplied from the NCO 208, as described above.

The multiplier 312 multiplies the despread IF data by I signal from the NCO 208 and supplies the result to a correlation detector 316 via a lowpass filter 314. Likewise, the multiplier 313 multiplies the despread IF data by Q signal from the NCO 208 and supplies the result to the correlation detector 316 via a lowpass filter 315. Like the lowpass filters 304 and 305 described above, the lowpass filters 314 and 315 receive the cutoff frequency information from the CPU 41 of the control section 40 to remove the out-of-band noise from the supplied signal.

The correlation detector 316 multiplies each of the received output signals from the lowpass filters 314 and 315 by itself and adds the results of the multiplication, outputting the result of the addition. The output of the correlation detector 316 is indicative of correlation value CV(L) between the IF data and late PN code L from the PN code generator 320. This correlation value CV(L) is supplied to the phase detector 321 and stored in the control register 33 for the CPU 41 of the 40 to use.

The phase detector 321 detects the phase difference between prompt PN code P and the satellite PN code of the GPS satellite as a difference between correlation value CV(E) from the correlation detector 306 and correlation value CV(L) from the correlation detector 316 and supplies a signal corresponding to the detected phase difference as a numerically controlled signal of the NCO 323 via a loop filter 322.

To the PN code generator 320, an output signal of this NCO 323 is supplied. By controlling the output frequency of the NCO 323, the generated phase of the PN code from the PN code generator 320 is controlled.

It should be noted that the NCO 323 is supplied with the frequency information for controlling the initial oscillation frequency from the CPU 41 of the control section 40 in accordance with the synchronization acquisition result of the sync acquisition section 20 as will be described later.

By the above-mentioned loop control in the DLL 32, the NCO 323 is controlled and the PN code generator 320 controls the generated phases of PN codes P, E, and L such that correlation value CV(E) and correlation value CV(L) reach the same level. Consequently, prompt PN code P generated by the PN code generator 320 phase-synchronizes the IF data with the despread PN code. As a result, the IF data is correctly spectrum-despread by prompt PN code P, causing the binarization circuit 210 to demodulate and output navigation data in the Costas loop 31.

Next, the demodulated output of the navigation message data is supplied to a data demodulator circuit, not shown, to be demodulated into data available to the control section 40, the demodulated data being supplied to the control section 40. The control section 40 uses the navigation message data for positioning computation and extracts orbit information (almanac information and ephemeris information) from time to time, the extracted information being stored in the nonvolatile memory 46.

It should be noted that the loop filter 322 of the DLL 32 integrates the phase error information from the phase detector 321 on the basis of the parameter supplied from the CPU 41 of the control section 40 to form an NCO control signal for controlling the NCO 323, like the above-mentioned loop filter 207 of the Costas loop 31.

Also in the DLL 32, a switch circuit 324 for loop on/off control is arranged between the loop filter 322 and the NCO 323, which is turned on/off by a switching signal from the CPU 41.

It should be noted that, in the initial state before a synchronization hold operation starts, the switch circuit 324 is off and the loop open state is provided. When, after starting a synchronization hold operation, the correlation output of the correlation detector 209 of the Costas loop has reached a significant level, the switch circuit 324 is turned on, providing the loop close state.

Transition from synchronization acquisition to synchronization hold:

As described above, in the present embodiment, the sync acquisition section 20 passes the information such as detected GPS satellite number, phase of that satellite PN code, IF carrier frequency, and signal intensity to the CPU 41 of the control section 40 as data. It should be noted that the signal intensity is not essential for the transition to synchronization hold processing.

On the basis of the above-mentioned obtained information, the CPU 41 of the control section 40 generates the data to be supplied to the sync hold section 30 and passes the generated data thereto. The sync hold section 30 starts a synchronization hold operation by use of the received data as initial values.

The data to be passed from the CPU 41 of the control section 40 to the sync hold section 30 includes numerical information for determining the initial oscillation frequency (the oscillation center frequency) of the NCO 323 for controlling the generated phase of the replica PN code from the PN code generator 320 of the DLL 32, numerical information for determining the initial oscillation frequency (the oscillation center frequency) of the NCO 208 of the Costas loop 31, parameters for determining the filter characteristics of the loop filter 207 and the loop filter 322, and coefficient information for determining the cutoff frequencies of the lowpass filters 204, 205, 304, 305, 314, and 315 to determine the scale of the frequency band.

This time, the information to be supplied to the sync hold section 30 from the CPU 41 includes the phase and frequency for the sync hold section 30 to start the synchronization hold of PN code and the synchronization hold of the IF carrier and the initial value data for defining the filter characteristics. The CPU 41 generates the above-mentioned initial value data such that synchronization hold processing starts from the proximity of the phase of the PN code detected as a result of the synchronization acquisition processing in the sync acquisition section 20 and from the proximity of the IF carrier frequency.

Consequently, the sync hold section 30 starts a synchronization hold operation from the proximity of the phase of the PN code detected by the sync acquisition section 20 and the proximity of the detected IF carrier frequency, thereby quickly providing the synchronization hold locked state.

Meanwhile, the computation of the position and velocity of the GPS receiver, it is necessary for the GPS receiver to establish synchronization on four or more GPS satellites from the start of synchronization acquisition and holds the established synchronization. A plurality of methods are available for the sync acquisition section 20, the sync hold section 30, and the CPU 41 for controlling these sections to execute the processing for acquiring and holding the synchronization of the signals from four or more GPS satellites (in what follows, this processing is referred to as a synchronization acquisition and synchronization hold process). The following describes several examples of the synchronization acquisition and synchronization hold process.

EXAMPLE 1 OF SYNCHRONIZATION ACQUISITION AND SYNCHRONIZATION HOLD PROCESS

In example 1, having acquired the synchronization of one of the GPS satellites, the sync acquisition section 20 immediately transmits an interrupt command for starting a synchronization hold operation, the GPS satellite number obtained as a result of synchronization acquisition, the phase of that satellite PN code, the IF carrier frequency, and the signal intensity indicative of correlation detection level to the CPU 41. When this transmission is completed, the sync acquisition section 20 starts acquiring the synchronization of a next GPS satellite.

Every time the interrupt command comes from the sync acquisition section 20, the CPU 41 allocates an independent channel to the sync hold section 30 and sets the initial values, causing the sync hold section 30 to start a synchronization hold operation.

Figure 30:
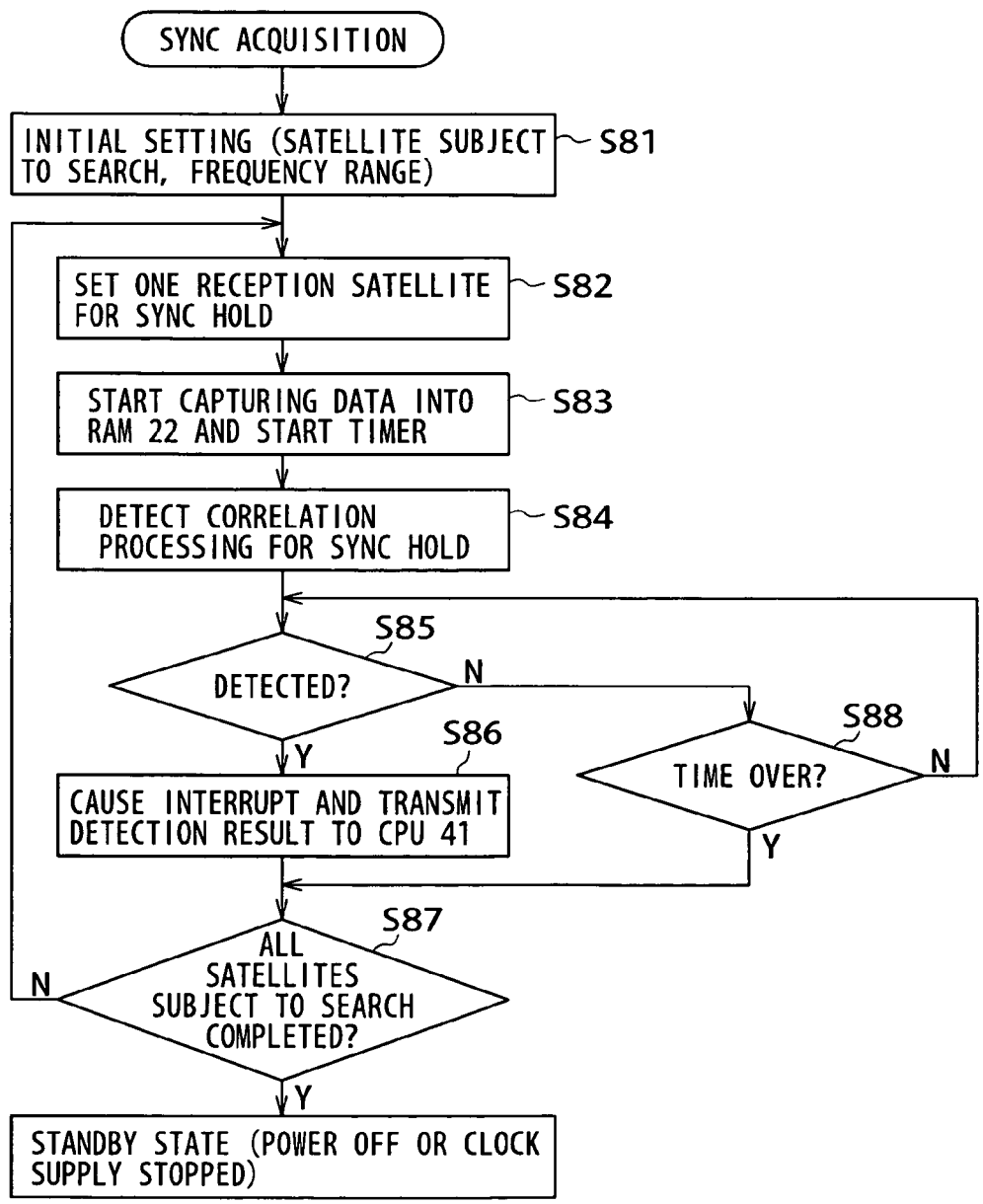
FIG. 30 is a flowchart indicative of an exemplary flow of synchronization acquisition processing.

FIG. 30 is a flowchart for describing the synchronization acquisition by the sync acquisition section 20 in example 1 of synchronization acquisition and synchronization hold process.

First, the initial setting is executed for synchronization acquisition (step S81). In this initial setting, the GPS satellites subject to search for synchronization acquisition and the sequence of the search are set on the basis of the valid orbit information stored by the GPS receiver into its non-volatile memory 46. From this orbit information, the carrier frequency is computed with Doppler shift considered, thereby setting the center and range of the IF carrier frequency subject to search.

If an approximate oscillator error obtained by the past operation before the power-on sequence is known in the GPS receiver, then it is assumed that the position of the GPS receiver be the position stored at the power-on sequence, namely the position immediately before the last power-off sequence and the center and range of the IF carrier frequency subject to search are determined in accordance with the Doppler shift computed from the orbit information, thereby further shortening the time required to reach the synchronization hold.

When the initial setting has been completed, one GPS satellite to be synchronously acquired is set in accordance with the search sequence (step S82). Consequently, the satellite number subject to synchronization acquisition is determined and the PN code for correlation detection is determined.

Next, the sync acquisition section 20 starts storing the IF data sampled by the sampling circuit 21 into the RAM 22, starting the timer at the same time (steps S83). For this timer, the timer 45 of the control section 40 is used. The timer 45 is also used to set synchronization hold processing start timing as will be described later.

Next, the correlation of the satellite PN code of the GPS satellite set in step S82 is detected in the DSP 23 by use of any one synchronization hold methods using the digital matched filter described above (step S84).

It is determined whether the correlation of the satellite PN code of the GPS satellite has been detected, namely, the synchronization acquisition of the GPS satellite signal has been made (step S85). If the correlation is found detected, an interrupt command is given to the CPU 41 and the information such as GPS satellite number, phase of satellite PN code, IF carrier frequency, and signal intensity are passed to the CPU 41 as the detection results of the synchronization acquisition (step S86).

Next, it is determined whether the synchronization acquisition search has been completed on all GPS satellites subject to search (step S87). If there still remain any GPS satellites subject to search, then the procedure returns to step S82 and sets a GPS satellite to be searched next, repeating the above-mentioned processing operations therefrom. If the synchronization acquisition is found completed on all GPS satellites subject to search in step S87, then the synchronization acquisition operation is ended, putting the sync acquisition section 20 into the standby state.

If no correlation is found in step S85, then it is determined whether this state has passed over a predetermined period of time (step S88). If this state is found not exceeding a predetermined period of time, then the procedure returns to step S85 to continue the correlation detection processing.

If the predetermined period of time is found passed in step S88, then the procedure goes to step S87 to determined whether the synchronization acquisition search has been completed on all GPS satellite subject to search. If there still remain any GPS satellites subject to search, then the procedure returns to step S82 to set a GPS satellite to be searched next, repeating the above-mentioned processing operations therefrom.

If the synchronization acquisition is found completed on all GPS satellites subject to search, then the synchronization acquisition operation is ended to put the sync acquisition section 20 into the standby state.

In the present embodiment, the CPU 41 is adapted also to control the turn-on/off of the power to the sync acquisition section 20 or the turn-on/off of the supply of the operation clock from the multiplier/divider circuit 3 to the sync acquisition section 20. When the sync acquisition section 20 is in the standby state described above, the power to the sync acquisition section 20 is turned off or the supply of the operation clock is turned off by the sync acquisition section 20, thereby saving the power dissipation.

If the sync acquisition section 20 is configured by a digital matched filter as described above, it is desired to operate the sync acquisition section 20 with a high clock so as to increase the speed of the FFT computation in the DSP 23 and to increase the power dissipation at the operation time. However, when the synchronization acquisition detection of the signals of all initially set GPS satellites is completed, thereby putting four or more GPS satellites in the synchronization hold state in the sync hold section 30, the role of the sync acquisition section 20 comes to an end.

In the present embodiment, when the role of the sync acquisition section 20 comes to an end as described above, the CPU 41 can save the power dissipation because the sync acquisition section 20 is put in the standby state.

It should be noted that, in the above-mentioned example, the CPU 41 puts the sync acquisition section 20 into the standby state after all initially set GPS satellites has been synchronously acquired. It is also practicable for the CPU 41 to put the sync acquisition section 20 into the standby state after checking that the number of GPS satellites that could be synchronously held in the sync hold section 30 has reached 4 or more.

Obviously, the CPU 41 can restore the sync acquisition section 20 from the standby state into the operating state when synchronization acquisition becomes necessary again.

Figure 31:
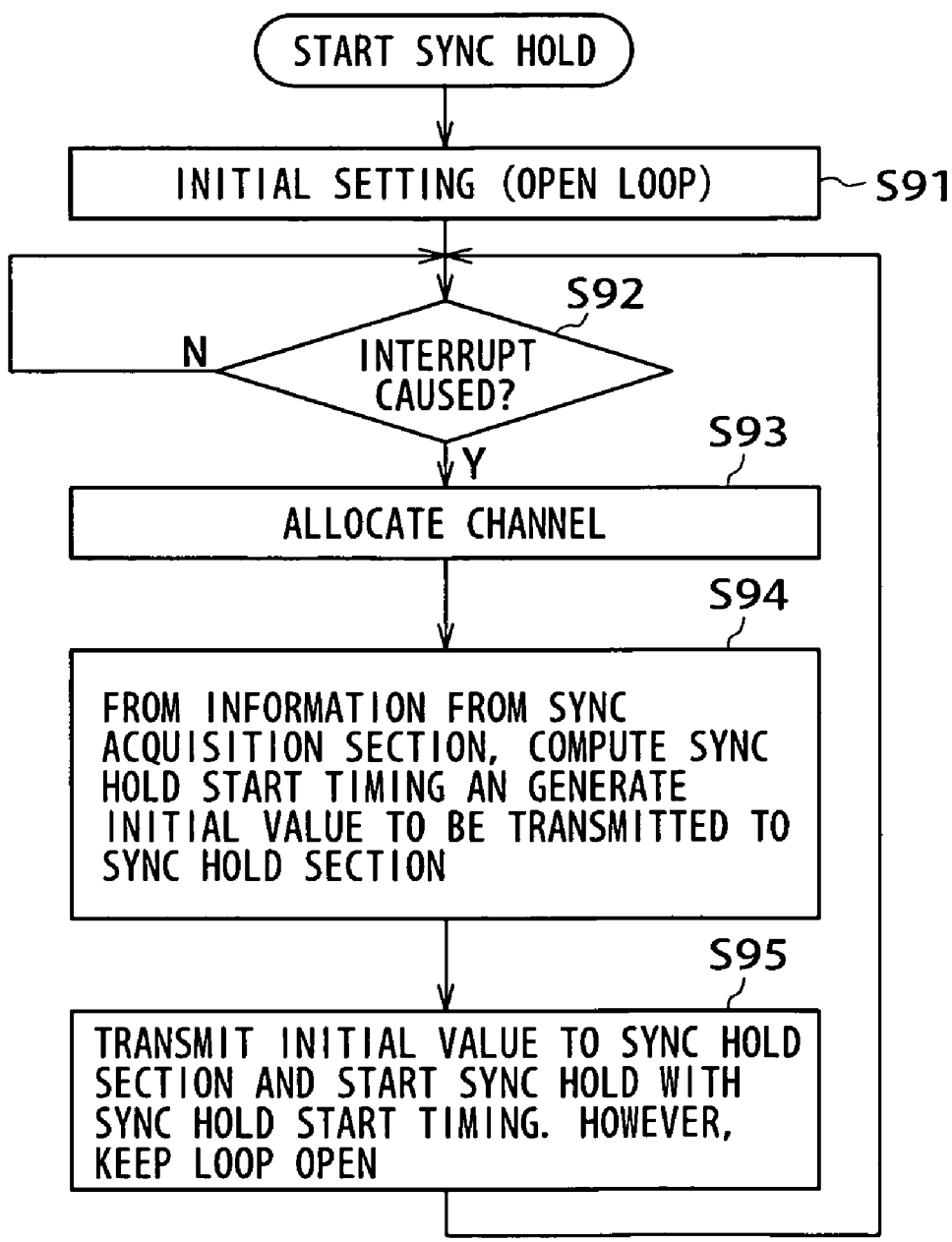
FIG. 31 is a flowchart indicative of a flow of synchronization hold start processing.

The following describes the control processing in the sync hold section 30 by the CPU 41 given an interrupt command from the sync acquisition section 20, with reference to the flowchart shown in FIGS. 31 and 32.

FIG. 31 is the flowchart indicative of the processing in which, when the CPU 41 receives an interrupt command and the information such as phase of satellite PN code, IF carrier frequency, GPS satellite number, and signal intensity as the results of the synchronization acquisition from the sync acquisition section 20, the CPU 41 executes channel allocation in the sync hold section 30 and starts a synchronization hold operation. FIG. 32 is the flowchart indicative of synchronization hold processing control to be executed in each channel in the started sync hold section 30. First, the synchronization hold start processing shown in FIG. 31 will be described.

First, at the power-on sequence of the GPS receiver for example, the CPU 41 initially sets constants to the NCO, the lowpass filters, and the loop filters in the sync hold section 30 (step S91). It should be noted that, in the initial state, both the Costas loop 31 and the DLL 32 are in the loop open state.

Next, the CPU 41 monitors an interrupt command from the sync acquisition section 20 (step S92). When an interrupt command comes, the CPU 41 receives the information such as GPS satellite number, phase of satellite PN code, IF carrier frequency, and signal intensity and sets the sync hold section 30 so as to allocate an independent channel corresponding to the received GPS satellite number (step S93).

Then, the CPU 41 computes a synchronization hold start timing from the phase of the satellite PN code received from the sync acquisition section 20 and generates the initial values to be supplied to each portion in the allocated channel in the sync hold section 30 on the basis of the IF carrier frequency received from the sync acquisition section 20 (step S94).

Next, the CPU 41 supplies the generated initial values to each portion in the channel allocated in step S93 in the sync hold section 30 via the control register 33 and starts a synchronization hold operation by controlling the generated phase of the prompt PN code P from the PN code generator 320 in the channel allocated in step S93 so as to generate the phase when the synchronization hold operation starts (step S95). It should be noted that, at this point of time, both the Costas loop 31 and the DLL 32 are kept in the loop open state.

When the channel allocation for synchronization hold is executed on the synchronously acquired GPS satellite signal, starting the synchronization hold operation, the procedure returns to step S92 to wait for a next interrupt.

The following describes the synchronization hold processing for each channel started as described above, with reference to the flowchart shown in FIG. 32.

First, the CPU 41 determines whether correlation value CV(P) from the sync hold section 30 has reached a significant level (step S101). If correlation value CV(P) is found reaching a significant level, the CPU 41 closes the Costas loop 31 and the DLL 32 to execute a synchronization hold operation (step S102).

Next, the CPU 41 monitors the lock discrimination output of the PN code discrimination section 211 of the Costas loop 31 of the sync hold section 30 (step S103). When the sync hold section 30 is found in the locked state, the CPU 41 increments the number of synchronously held GPS satellites by 1 (step S104), continuing the synchronization hold state (step S105).

During the synchronization hold operation, the CPU 41 monitors the lock discrimination output from the PN code discrimination section 211 of the Costas loop 31 (step S106). If the lock of synchronization hold has been recognized, the procedure returns to step S105 to continue the synchronization hold state. If the synchronization hold is found unlocked in step S106, then the CPU 41 decrements the number of synchronously held GPS satellites by 1 (step S107), thereby executing the processing to be executed when synchronization hold is unlocked. The description about this processing is skipped.

If four or more GPS satellite signals are found in the synchronization hold state in the sync hold section 30, then the CPU 41 computes the position and velocity of the GPS receiver.

If correlation value CV(P) is found not reaching a significant level in step S101, then the CPU 41 determines whether this state has passed over a predetermined period of time (step S109). If this state is found passing a predetermined period of time, the CPU 41 returns the channel allocated in the sync hold section 30 in step S93 to a free channel, thereby stopping the synchronization hold of that channel (step S110).

If the lock state is not detected by the lock discrimination output in step S103, then the CPU 41 determines whether this state has passed over a predetermined period of time (step Sill). If this state is found passing over a predetermined period of time, then the CPU 41 returns the channel allocated in the sync hold section 30 in step S93 to a free channel, thereby stopping the synchronization hold of that channel (step S110).

Steps 109, 111, and 110 are provided for the following reasons. Namely, even if the correlation detected by the sync acquisition section 20 is found at a significant level, this synchronization may be false that is accidentally generated by noise. For the false synchronization that is generated accidentally and therefore not persistent, no synchronization is established in the sync hold section 30. Therefore, if synchronization cannot be established within a certain search time in the sync hold section 30, the synchronization hold operation is stopped and the allocated channel is returned to a free channel, waiting for a next interrupt.

Meanwhile, in step S94 shown in FIG. 31, the CPU 41 is required to compute the synchronization hold start timing of the sync hold section 30 so as to match the phase of the replica PN code from the PN code generator 320 of the sync hold section 30 with the phase of the satellite PN code detected by the sync acquisition section 20. This computation must consider that a predetermined period of time has passed until the synchronization acquisition of 1 GPS satellite signal is completed in the sync acquisition section 20 and it is affected by the effects of Doppler shift and the error of the reference oscillator circuit 2 of the GPS receiver.

The latter problem is caused by that the IF carrier frequency includes an error of the reference oscillator circuit 2 that generates the sampling clock for storing the IF data from the frequency converter section 10 into the memory.

It should be noted that, in the present embodiment, both the sync acquisition section 20 and the sync hold section 30 operate on the clock generated by the reference oscillator circuit 2, so that the sync acquisition section 20 and the sync hold section 30 each have strictly the same frequency error. Therefore, as for the synchronization of the IF carrier, there is no problem with the sync hold section 30 starting its operation by use of the IF carrier frequency detected in the sync acquisition section 20 as the initial value.

[Example of a Method of Determining Synchronization Hold Start Timing]

The following describes an exemplary method of determining a synchronization hold start timing in step S94.

The synchronization hold start timing is affected by the error of the reference oscillator circuit 2 of the GPS receiver. Basically, the PN code is repeated in a period of one millisecond, so that the start timing of the PN code in the sync hold section 30 presents no problem if it is deviated by an integral multiple of one millisecond.

In this example, by use of that the sync acquisition section 20 has started the timer 45 with the timing of storing the IF data into the RAM 22 and when the sync acquisition section 20 detects phase difference h between the satellite PN code and the replica PN code for the IF data stored in the RAM 22, the CPU 41 matches, by use of the same timer 45, the phase with the satellite PN code of the received signal by starting the prompt PN code P to be generated in the PN code generator 320 of the sync hold section 30 at the point of time deviated by detected phase difference h from an integral multiple of one millisecond.

FIGS. 33A, 33B, and 33C show the states of the above-mentioned method. FIG. 33A shows IF data, where each PN denotes its satellite PN code. As shown in FIG. 33B, if the IF data is stored in the RAM 22 with a timing with the phase deviated by h as shown relative to the satellite PN code of the IF data, the DSP 23 detects this phase difference h as the phase information (the phase to reset the PN code generator 320 of the DLL 32) of the satellite PN code.

It is assumed here that the point of time at which this phase difference h has been detected by the sync acquisition section 20 be a point of time several milliseconds passed from the point of time at which the timer 45 was started with the timing of storing the IF data into the RAM 22 as shown in FIG. 33C.

If the point of time at which phase difference h for the PN code has been received from the sync acquisition section 20 is a point of time in one-millisecond unit intermediate in the time counted by the timer 45, the CPU 41 waits until that time of one-millisecond unit passes and resets the generated phase of the PN code generator 320 of the sync hold section 30 with a time obtained by adding phase difference h for the PN code used as the synchronization hold start timing.

Consequently, the generated phase of the prompt PN code P of the PN code generator 320 of the sync hold section 30 can be approximately matched with the phase of the satellite PN code of the GPS satellite signal acquired by the sync acquisition section 20, thereby reducing the time necessary for the establishment of phase.

In the related-art role of Costas loop plus DLL, the phase of the satellite PN code of the received signal is unknown, so that the IF carrier frequency generated by the DDL is slightly offset from the period of the replica PN code and, while the phase slides for the satellite PN code of the IF data, the phase in which a significant and intense correlation appears is detected for all phases in the carrier frequencies in a range of several kHz and in PN code length of 1023 chips at worst, requiring a fairly long time until the establishment of synchronization.

In contrast, in the above-mentioned embodiment, the sync hold section 30 which has the same basic configuration in which the Costas loop 31 and the DDL are used as before has the initial value of the phase of the satellite PN code received by the sync hold section 30 and the initial value of the IF carrier frequency that deviate only slightly from the true values, so that the phase having a significant and intense correlation always exists in the proximity of the initial values if the error is taken into account.

The sync hold section 30 first turns off the switch circuits 212 and 324 to put the NCOs 208 and 323 of the Costas loop 31 and the DLL 32 respectively into the state in which control by the loop filters 207 and 322 is disabled, namely the state in the loops are open, and then searches for a significant and intense correlation by controlling the NCOs 208 and 323 in the proximity of the initial values. When such a correlation is found, the sync hold section 30 turns on the switch circuits 212 and 324, thereby effecting the loop control from the loop filters 207 and 322 of the DLL 32 and the Costas loop 31 respectively.

Consequently, the synchronization establishment of the phase of PN code in the DLL 32 and the synchronization establishment of the phase of the IF carrier in the Costas loop 31 are executed in a significantly short time, thereby allowing to hold the synchronization subsequently.

In this case, the initial value of the IF carrier frequency can be set with an accuracy of several tens Hz for example, so that the bandwidths of the lowpass filter and loop filter of the Costas loop 31 and the DLL 32 can be narrowed from the beginning, thereby establishing the synchronization with a high S/N.

If the sync hold section 30 is operated on the clock of 1.023 MHz×16=16.368 MHz for example and the phase of PN code is detected with a time resolution of 1/16.368 MHz in the DLL 32, then the pseudo range between the GPS satellite and the GPS receiver can be computed from the phase of PN code with an accuracy of $\frac{1}{16}$ chip. If the NCO 208 of the Costas loop 31 is configured so as to be controlled on 1 Hz basis, the resolution of the IF carrier frequency becomes 1 MHz, thereby allowing the DLL 32 and the Costas loop 31 to hold their synchronization with this accuracy.

Other Embodiments

In the above-mentioned embodiment, the detection results from the sync acquisition section 20 are passed to the sync hold section 30 via the CPU 41. It is also practicable to pass the detection results from the sync acquisition section 20 directly to the sync hold section 30.

In the above-mentioned embodiment, the digital matched filter is used for the sync acquisition section 20. However, the sync acquisition section 20 is not limited to the digital matched filter because one of the objects of this invention is that the coarse synchronization acquisition is executed by the synchronization acquisition section and the result of the synchronization acquisition is passed to the synchronization hold section to speed up the processing up to the establishment of synchronization.

The digital matched filter is realized by not only the FFT as described in the above-mentioned examples but also the transversal filter as described above.

It should also be noted that the present invention is not limited to the GPS receiver composed of the synchronization acquisition section and the synchronization hold section; the present invention is also applicable to a GPS receiver in which synchronization is detected for the carrier and the spread code by the sliding correlation involving frequency search and synchronization acquisition and synchronization hold operations are executed by means of the DLL and the Costas loop.

While preferred embodiments of the present invention have been described using specific terms, such description is for illustrative purpose only, and it is to be understood that changes and variations may be made without departing from the spirit or scope of the following claims.

What is claimed is:

1. A GPS (Global Positioning System) reception method comprising the steps of;
   if a signal received from at least one GPS satellite is in a synchronization hold state, an intermediate carrier frequency of said signal is known, orbit information about said GPS satellite in the synchronization hold state is stored in a storage section, and a position and a current time of a receiver of said signal are known,
   computing an intermediate frequency carrier error as an error of said intermediate carrier frequency on the basis of an oscillation frequency error of a reference oscillator of said receiver from said intermediate carrier frequency of said signal, a position and a velocity of said GPS satellite in the synchronization hold state obtained from said orbit information and said current time, and said position of said receiver;
   adjusting said intermediate carrier frequency by an amount equal to said computed intermediate frequency carrier error;
   acquiring signals received from other GPS satellites by use of said adjusted intermediate carrier frequency; and
   generating a clock signal via the reference oscillator that produces an equivalent oscillation frequency error for said synchronization hold state and a synchronization acquisition state.

2. The GPS reception method according to claim 1, wherein, if there exist a plurality of GPS satellites of which signals are in a synchronization hold state and said intermediate frequency carrier error is obtained for a plurality of signals received from said plurality of GPS satellites, said plurality of intermediate frequency carrier errors are averaged, said intermediate carrier frequency is adjusted by an amount equal to said average error, and a signal received from another GPS satellite is acquired by use of said corrected intermediate carrier frequency.

3. The GPS reception method according to claim 1, wherein, if there exist a plurality of GPS satellites of which signals are in a synchronization hold state and said intermediate frequency carrier error is obtained for a plurality of signals received from said plurality of GPS satellites, said intermediate carrier frequency is adjusted by an amount equal to said intermediate frequency carrier error obtained for a signal having a highest received signal level among said plurality of signals and a signal received from another GPS satellite is acquired by use of said corrected intermediate carrier frequency.

4. The GPS reception method according to claim 1, wherein, if there exist a plurality of GPS satellites of which signals are in a synchronization hold state and said intermediate frequency earner error is obtained for a plurality of signals received from said plurality of GPS satellites, said intermediate carrier frequency is adjusted by an amount equal to the average value of said intermediate frequency carrier error obtained for a signal having a received signal level greater than a predetermined threshold value among said plurality of signals and a signal from another GPS satellite is acquired by use of said corrected intermediate carrier frequency.

5. The GPS reception method according to claim 1, wherein said intermediate carrier frequency is adjusted by an amount equal to said obtained intermediate frequency carrier error in acquiring a signal received from another GPS satellite if the number of GPS satellites with signals in the synchronization hold state is less than four.

6. A GPS receiver comprising:
synchronization unit for synchronously acquiring a signal received from a GPS satellite by use of a given intermediate carrier frequency and synchronously holding said acquired signal;
error computation unit for computing an intermediate frequency carrier error as an error of said intermediate carrier frequency on the basis of an oscillation frequency error of a reference oscillator of said receiver from said intermediate earner frequency of said signal, a position and a velocity of said GPS satellite in the synchronization hold state obtained from said orbit information and said current time, and said position of said receiver if a signal received from at least one GPS satellite is in a synchronization hold state, an intermediate carrier frequency of said received signal is known, orbit information about said GPS satellite in the synchronization hold state is stored in a storage section, and a position and a current time of a receiver of said signal are known;
correction unit for adjusting said known intermediate carrier frequency by an amount equal to said intermediate frequency carrier error computed by said error computation unit and supplying said adjusted intermediate frequency carrier frequency to said synchronization unit; and a clock signal generated by the reference oscillator that produces an equivalent oscillation frequency error for said synchronization hold state and a synchronization acquisition state.

7. The GPS receiver according to claim 6, wherein, if there exist a plurality of GPS satellites with signals in a synchronization hold state and said intermediate frequency carrier error is obtained for a plurality of signals received from said plurality of GPS satellites, said error computation unit averages said plurality of intermediate frequency earner errors and supplies said averaged intermediate frequency carrier error to said correction unit.

8. The GPS receiver according to claim 6, wherein, if there exist a plurality of GPS satellites with signals in a synchronization hold state and said intermediate frequency carrier error is obtained for a plurality of signals received from said plurality of GPS satellites, said error computation unit supplies said intermediate frequency carrier error obtained for a signal having a highest signal level among said plurality of signals to said correction unit.

9. The GPS receiver according to claim 6, wherein, if there exist a plurality of GPS satellites with signals in a synchronization hold state and said intermediate frequency carrier error is obtained for a plurality of signals received from said plurality of GPS satellites, said error computation unit supplies an average value of said intermediate frequency carrier error obtained for a received signal having a signal level greater than a predetermined threshold value among said plurality of signals to said correction unit.

10. The GPS receiver according to claim 6, wherein said intermediate carrier frequency is adjusted by an amount equal to said obtained intermediate frequency carrier error in acquiring a signal received from another GPS satellite when the number of GPS satellites with signals in the synchronization hold state is less than four.

* * * * *